(12) United States Patent
Shan et al.

(10) Patent No.: US 10,986,602 B2
(45) Date of Patent: *Apr. 20, 2021

(54) TECHNOLOGIES TO AUTHORIZE USER EQUIPMENT USE OF LOCAL AREA DATA NETWORK FEATURES AND CONTROL THE SIZE OF LOCAL AREA DATA NETWORK INFORMATION IN ACCESS AND MOBILITY MANAGEMENT FUNCTION

(71) Applicant: Intel Corporation, Santa Clara, CA (US)

(72) Inventors: Changhong Shan, Portland, OR (US); Alexandre Saso Stojanovski, Paris (FR)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/267,711

(22) Filed: Feb. 5, 2019

(65) Prior Publication Data
US 2019/0174449 A1     Jun. 6, 2019

Related U.S. Application Data

(60) Provisional application No. 62/628,777, filed on Feb. 9, 2018.

(51) Int. Cl.
*H04W 60/04* (2009.01)
*H04W 60/00* (2009.01)
(Continued)

(52) U.S. Cl.
CPC ........... *H04W 60/04* (2013.01); *H04W 60/00* (2013.01); *H04W 76/11* (2018.02); *H04W 8/186* (2013.01);
(Continued)

(58) Field of Classification Search
CPC ..... H04W 76/10; H04W 76/20; H04W 76/11; H04W 8/02; H04W 60/04; H04W 60/00;
(Continued)

(56) References Cited

U.S. PATENT DOCUMENTS

2018/0227873 A1* 8/2018 Vrzic ................... H04W 48/18
2018/0279397 A1* 9/2018 Faccin ................. H04W 76/15
(Continued)

OTHER PUBLICATIONS

3GPP, "Technical Specification Group Services and System Aspects; Procedures for the 5G System; Stage 2 (Release 15)," 3GPP TS 23.502 V15.0.0 (Dec. 2017), 5G, 258 pages.
(Continued)

*Primary Examiner* — Ashley Shivers
(74) *Attorney, Agent, or Firm* — Schwabe, Williamson & Wyatt, P.C.

(57) ABSTRACT

Systems, apparatuses, methods, and computer-readable media are provided for indicating local area data network (LADN) data network names (DNNs). In embodiments, a user equipment (UE) provides a list of configured LADN DNNs in a registration request message during a registration procedure. An Access and Mobility Management Function (AMF) determines LADN information for the UE by looking into configured LADN DNNs in the AMF and/or retrieved LADN authorization/subscription information. The LADN information includes a list of LADN DNNs and corresponding LADN service area(s) that the UE can use, including LADN DNNs that the UE can use in a current registration area. The AMF sends the LADN information to the UE in a registration accept message. Other embodiments may be described and/or claimed.

26 Claims, 12 Drawing Sheets

(51) Int. Cl.
*H04W 76/11* (2018.01)
*H04W 84/04* (2009.01)
*H04W 8/20* (2009.01)
*H04W 48/02* (2009.01)
*H04W 48/00* (2009.01)
*H04W 8/18* (2009.01)

(52) U.S. Cl.
CPC ............ *H04W 8/205* (2013.01); *H04W 48/02* (2013.01); *H04W 48/17* (2013.01); *H04W 84/042* (2013.01)

(58) Field of Classification Search
CPC ..... H04W 8/205; H04W 48/02; H04W 48/17; H04W 8/186; H04W 84/042; H04W 12/06
See application file for complete search history.

(56) References Cited

U.S. PATENT DOCUMENTS

| | | | |
|---|---|---|---|
| 2019/0150081 A1* | 5/2019 | Qiao | H04W 60/005 370/329 |
| 2019/0182788 A1* | 6/2019 | Lee | H04W 60/00 |
| 2019/0182875 A1* | 6/2019 | Talebi Fard | H04W 76/11 |
| 2019/0200264 A1* | 6/2019 | Kim | H04W 36/0033 |
| 2020/0045135 A1* | 2/2020 | Trossen | H04L 41/12 |
| 2020/0120751 A1* | 4/2020 | Sugawara | H04W 48/16 |

OTHER PUBLICATIONS

3GPP, "Technical Specification Group Services and System Aspects; Security architecture and procedures for 5G system (Release 15)," 3GPP TS 33.501 V0.7.0 (Jan. 2018), 5G, 109 pages.

3GPP, "Technical Specification Group Services and System Aspects; System Architecture for the 5G System; Stage 2 (Release 15)," 3GPP TS 23.501 V15.0.0 (Dec. 2017), 5G, 181 pages.

3GPP, "Technical Specification Group Radio Access Network; NG-RAN; NG Application Protocol (NGAP) (Release 15)," 3GPP TS 38.413 V0.6.0 (Jan. 2018), 5G, 94 pages.

Nokia, "TS 38.413 v0.6.0 covering agreements of RAN3 NR AdHoc 1801," 3GPP TSG-RAN WG3 NR AdHoc 1801, R3-180651, Agenda item: 10, Jan. 22-26, 2018, Sophia Antipolis, France, 1 page.

* cited by examiner

TECHNOLOGIES TO AUTHORIZE USER EQUIPMENT USE OF LOCAL AREA DATA NETWORK FEATURES AND CONTROL THE SIZE OF LOCAL AREA DATA NETWORK INFORMATION IN ACCESS AND MOBILITY MANAGEMENT FUNCTION

RELATED APPLICATIONS

The present application claims priority under 35 U.S.C. § 119 to U.S. Provisional App. No. 62/628,777 filed Feb. 9, 2018, the contents of which is hereby incorporated by reference in its entirety.

FIELD

Various embodiments of the present application generally relate to the field of wireless communications, and in particular, to registration procedures for registering user equipment with wireless communications networks.

BACKGROUND

In the fifth generation systems (5GS), a user equipment (UE) needs to register with the network to get authorized to receive services, to enable mobility tracking and to enable reachability. In general, the UE initiates a registration procedure using one of the following registration types: initial registration to the 5GS; mobility registration update upon changing to a new Tracking Area (TA) outside the UE's registration area, or when the UE needs to update its capabilities or protocol parameters that are negotiated in registration procedure with or without changing to a new TA; periodic registration update due to predefined time period of inactivity; and emergency registration. In 5GS, the UE uses the registration procedure to register with an AMF. However, the AMF does not know whether the UE is authorized to use a Local Area Data Network (LADN) feature and does not know the particular LADN Data Network Name (DNN) that will be used by the UE. Consequently, the AMF does not know which of those configured LADN Information in the Registration Area can be provided to the UE during the registration procedure.

BRIEF DESCRIPTION OF THE FIGURES

FIG. 10 depicts an example LADN indication procedure that may be performed by a UE, according to various embodiments; FIG. 11 shows an example registration process that may be may be performed by a RAN node, according to various embodiments; and FIG. 12 depicts an example LADN information process that may be performed by an AMF, according to various embodiments.

DETAILED DESCRIPTION

Embodiments herein provide mechanisms for indicating configured LADN DNN(s) for wireless communication network access. According to various embodiments, the UE indicates one or more configured LADN DNNs during an initial registration procedure. In embodiments, during an initial registration procedure, an AMF retrieves an indication of whether the LADN feature is authorized to be used by a subscriber UE. Later, if there is any changes regarding the UE configured LADN DNN(s), the UE may indicate the update or newly configured LADN DNN(s) to AMF by using a registration procedure. In some embodiments, the UE may provide an indicator to request LADN Information, such as when the UE is not currently configured with an LADN DNN. By looking into the configured LADN information in AMF and LADN authorization information for the subscriber in the subscription profile, the AMF may determine the LADN DNN(s) that the UE can use in a current Registration Area and indicate allowed LADN Information, such as a list of LADN DNN(s) and corresponding LADN service area(s), in a Registration Accept message to the UE. Other embodiments may be described and/or claimed.

Figure 1:
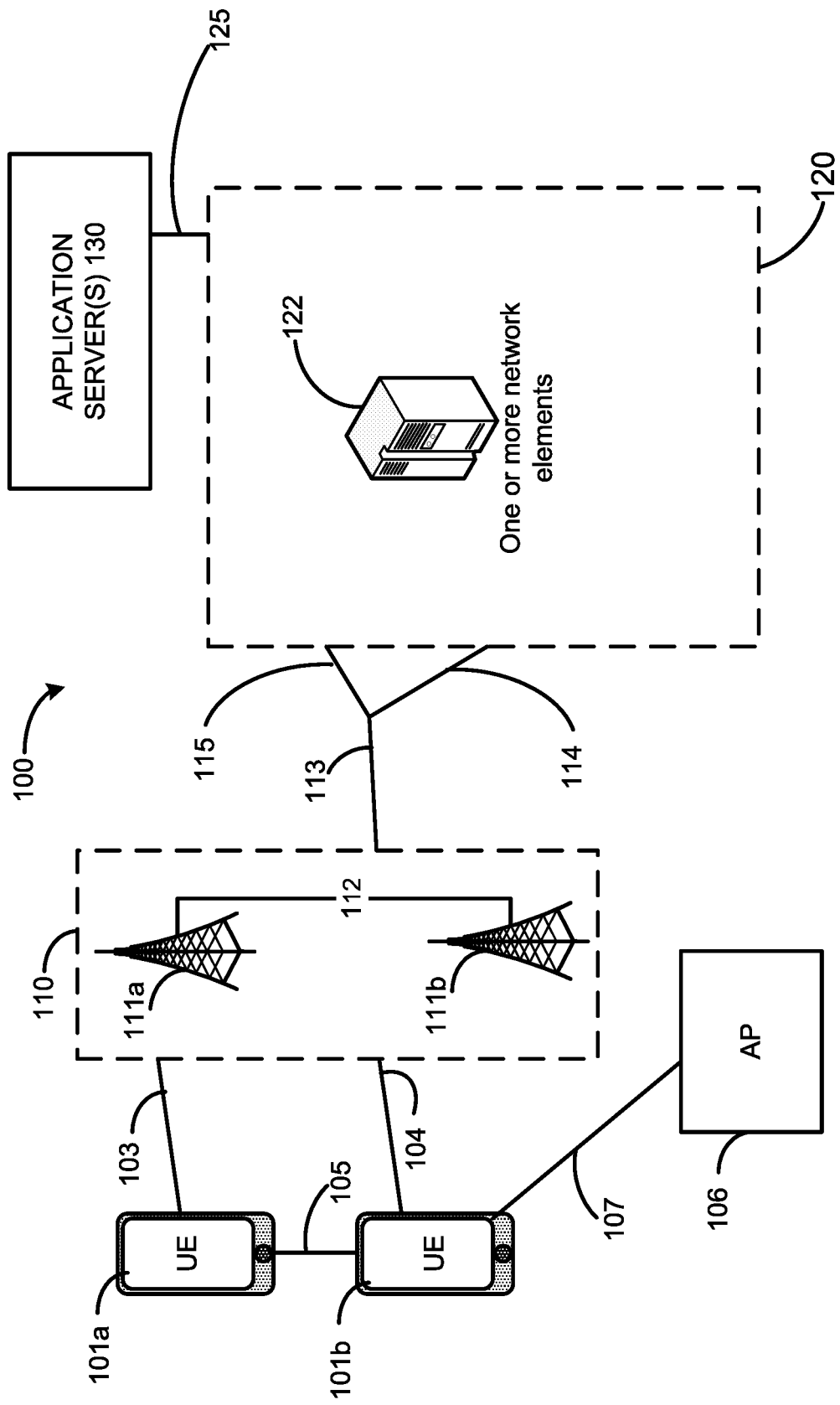
FIG. 1 depicts an architecture of a system of a network in accordance with some embodiments.

Referring now to FIG. 1, in which an example architecture of a system 100 of a network according to various embodiments, is illustrated. The following description is provided for an example system 100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 101a and UE 101b (collectively referred to as "UEs 101" or "UE 101"). In this example, UEs 101 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like. As discussed in more detail infra, the UEs 101 incorporate the LADN DNN embodiments discussed herein. In these embodiments, the UEs 101 are capable of, inter alia, providing an indication of configured LADN DNN(s) (e.g., in a list of LADN DNN(s)) during a registration procedure, such as an initial registration procedure. The indication of LADN DNN(s) may be included in a registration request message, which is send to an AMF (e.g., AMF 321 of FIG. 3) via a RAN node 111. If there are any changes to the configured LADN DNN(s) after the registration procedure, the UE 101 provides an indication of the updated or newly configured LADN DNN(s) to the AMF (e.g., AMF 321 of FIG. 3) using a suitable registration procedure. These and other embodiments are discussed in more detail infra with respect to FIGS. 3-4.

In some embodiments, any of the UEs 101 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 may be configured to connect, for example, communicatively couple, with an or RAN 110. In embodiments, the RAN 110 may be an NG RAN or a 5G RAN, an E-UTRAN, or a legacy RAN, such as a UTRAN or GERAN. As used herein, the term "NG RAN" or the like refers to a RAN 110 that operates in an NR or 5G system 100, and the term "E-UTRAN" or the like refers to a RAN 110 that operates in an LTE or 4G system 100. The UEs 101 utilize connections (or channels) 103 and 104, respectively, each of which comprises a physical communications interface or layer (discussed in further detail below).

In this example, the connections 103 and 104 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 101 may directly exchange communication data via a ProSe interface 105. The ProSe interface 105 may alternatively be referred to as a SL interface 105 and may comprise one or more logical channels, including but not limited to a PSCCH, a PSSCH, a PSDCH, and a PSBCH.

The UE 101b is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a WiFi® router. In this example, the AP 106 is shown to be connected to the Internet without connecting to the core network of the wireless system (described in further detail below). In various embodiments, the UE 101b, RAN 110, and AP 106 may be configured to utilize LWA operation and/or LWIP operation. The LWA operation may involve the UE 101b in RRC_CONNECTED being configured by a RAN node 111a-b to utilize radio resources of LTE and WLAN. LWIP operation may involve the UE 101b using WLAN radio resources (e.g., connection 107) via IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

The RAN 110 can include one or more AN nodes or RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like refers to a RAN node 111 that operates in an NR or 5G system 100 (e.g., a gNB), and the term "E-UTRAN node" or the like refers to a RAN node 111 that operates in an LTE or 4G system 100 (e.g., an eNB). According to various embodiments, the RAN nodes 111 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 111 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 111; a MAC/PHY split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some implementations, an individual RAN node 111 may represent individual gNB-DUs that are connected to a gNB-CU via individual F1 interfaces (not shown by FIG. 1). In these implementations, the gNB-DUs may include one or more remote radio heads or RFEMs (see, e.g., FIG. 5), and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), which are RAN nodes that provide E-UTRA user plane and control plane protocol terminations toward the UEs 101, and are connected to a 5GC (e.g., CN 320 of FIG. 3) via an NG interface (discussed infra).

In V2X scenarios one or more of the RAN nodes 111 may be or act as RSUs. The term "Road Side Unit" or "RSU" refers to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 101 (vUEs 101). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 can be configured to communicate using OFDM communication signals with each other or with any of the RAN nodes 111 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

Downlink and uplink transmissions may be organized into frames with 10 ms durations, where each frame includes ten 1 ms subframes. A slot duration is 14 symbols with Normal CP and 12 symbols with Extended CP, and scales in time as a function of the used sub-carrier spacing so that there is always an integer number of slots in a subframe. In some embodiments, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The PDSCH carries user data and higher-layer signaling to the UEs 101. Typically, downlink scheduling (assigning control and shared channel resource blocks to the UE 101b within a cell) may be performed at any of the RAN nodes 111 based on channel quality information fed back from any of the UEs 101. The downlink resource assignment information may be sent on the PDCCH used for (e.g., assigned to) each of the UEs 101. The PDCCH can be used to schedule DL transmissions on PDSCH and UL transmissions on PUSCH, where the DCI on PDCCH includes, inter alia, downlink assignments containing at least modulation and coding format, resource allocation, and HARQ information related to DL-SCH; and/or uplink scheduling grants containing at least modulation and coding format, resource allocation, and HARQ information related to UL-SCH. In addition to scheduling, the PDCCH can be used to for activation and deactivation of configured PUSCH transmission with configured grant; activation and deactivation of PDSCH semi-persistent transmission; notifying one or more UEs 101 of a slot format; notifying one or more UEs 101 of the PRB(s) and OFDM symbol(s) where a UE 101 may assume no transmission is intended for the UE; transmission of TPC commands for PUCCH and PUSCH; transmission of one or more TPC commands for SRS transmissions by one or more UEs; switching an active BWP for a UE 101; and initiating a random access procedure.

The PDCCH uses CCEs to convey the control information, for example, DCI. Control channels are formed by aggregation of one or more CCEs, where different code rates for the control channels are realized by aggregating different numbers of CCEs. Before being mapped to resource elements, the PDCCH complex-valued symbols may first be organized into quadruplets, which may then be permuted using a sub-block interleaver for rate matching. Each PDCCH is transmitted using one or more of these CCEs, where each CCE may correspond to nine sets of four physical resource elements known as REGs. Four QPSK symbols may be mapped to each REG. The PDCCH can be transmitted using one or more CCEs, depending on the size of the DCI and the channel condition. For example, there can be four or more different PDCCH formats defined in LTE with different numbers of CCEs (e.g., aggregation level, L=1, 2, 4, or 8).

The UEs 101 monitor (or attempt to decode) respective sets of PDCCH candidates in one or more configured monitoring occasions according to the corresponding search space configurations. In NR implementations, the UEs 101 monitor (or attempt to decode) respective sets of PDCCH candidates in one or more configured monitoring occasions in one or more configured CORESETs according to the corresponding search space configurations. A CORESET includes a set of PRBs with a time duration of 1 to 3 OFDM symbols. The REGs and CCEs are defined within a CORESET with each CCE including a set of REGs. Interleaved and non-interleaved CCE-to-REG mapping are supported in a CORESET. Each REG carrying PDCCH carries its own DMRS.

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

Referring back to FIG. 1, the RAN nodes 111 may be configured to communicate with one another via interface 112. In embodiments where the system 100 is an LTE system (e.g., when CN 120 is an EPC 220 as in FIG. 2), the interface 112 may be an X2 interface 112. The X2 interface may be defined between two or more RAN nodes 111 (e.g., two or more eNBs and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 101 from an SeNB for user data; information of PDCP PDUs that were not delivered to a UE 101; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 100 is a 5G or NR system (e.g., when CN 120 is an 5GC 320 as in FIG. 3), the interface 112 may be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support may include context transfer from an old (source) serving RAN node 111 to new (target) serving RAN node 111; and control of user plane tunnels between old (source) serving RAN node 111 to new (target) serving RAN node 111. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 110 is shown to be communicatively coupled to a core network—in this embodiment, core network (CN) 120. The CN 120 may comprise a plurality of network elements 122, which are configured to offer various data and telecommunications services to customers/subscribers (e.g., users of UEs 101) who are connected to the CN 120 via the RAN 110. The components of the CN 120 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

The CN 120 includes one or more servers 122, which may implement various core network elements or application functions (AFs) such as those discussed herein. The CN 120 is shown to be communicatively coupled to application servers 130 via an IP communications interface 125. The application server(s) 130 comprise one or more physical and/or virtualized systems for providing functionality (or services) to one or more clients (e.g., UEs 101) over a network (e.g., network 150). The server(s) 130 may include various computer devices with rack computing architecture component(s), tower computing architecture component(s), blade computing architecture component(s), and/or the like. The server(s) 130 may represent a cluster of servers, a server farm, a cloud computing service, or other grouping or pool of servers, which may be located in one or more datacenters. The server(s) 130 may also be connected to, or otherwise associated with one or more data storage devices (not shown). Moreover, the server(s) 130 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 130 offer applications or services that use IP/network resources. As examples, the server(s) 130 may provide traffic management services, cloud analytics, content streaming services, immersive gaming experiences, social networking and/or microblogging services, and/or other like services. In addition, the various services provided by the server(s) 130 may include initiating and controlling software and/or firmware updates for applications or individual components implemented by the UEs 101. The server(s) 130 can also be configured to support one or more communication services (e.g., Voice-over-Internet Protocol (VoIP) sessions, PTT sessions, group communication sessions, social networking services, etc.) for the UEs 101 via the CN 120.

In embodiments, the CN 120 may be a 5GC (referred to as "5GC 120" or the like), and the RAN 110 may be connected with the CN 120 via an NG interface 113. In embodiments, the NG interface 113 may be split into two parts, an NG user plane (NG-U) interface 114, which carries traffic data between the RAN nodes 111 and a UPF, and the S1 control plane (NG-C) interface 115, which is a signaling interface between the RAN nodes 111 and AMFs. Embodiments where the CN 120 is a 5GC 120 are discussed in more detail with regard to FIG. 3.

In embodiments, the CN 120 may be a 5G CN (referred to as "5GC 120" or the like), while in other embodiments, the CN 120 may be an EPC). Where CN 120 is an EPC (referred to as "EPC 120" or the like), the RAN 110 may be connected with the CN 120 via an S1 interface 113. In embodiments, the S1 interface 113 may be split into two parts, an S1 user plane (S1-U) interface 114, which carries traffic data between the RAN nodes 111 and the S-GW, and the S1-MME interface 115, which is a signaling interface between the RAN nodes 111 and MMEs. An example architecture wherein the CN 120 is an EPC 120 is shown by FIG. 2.

Figure 2:
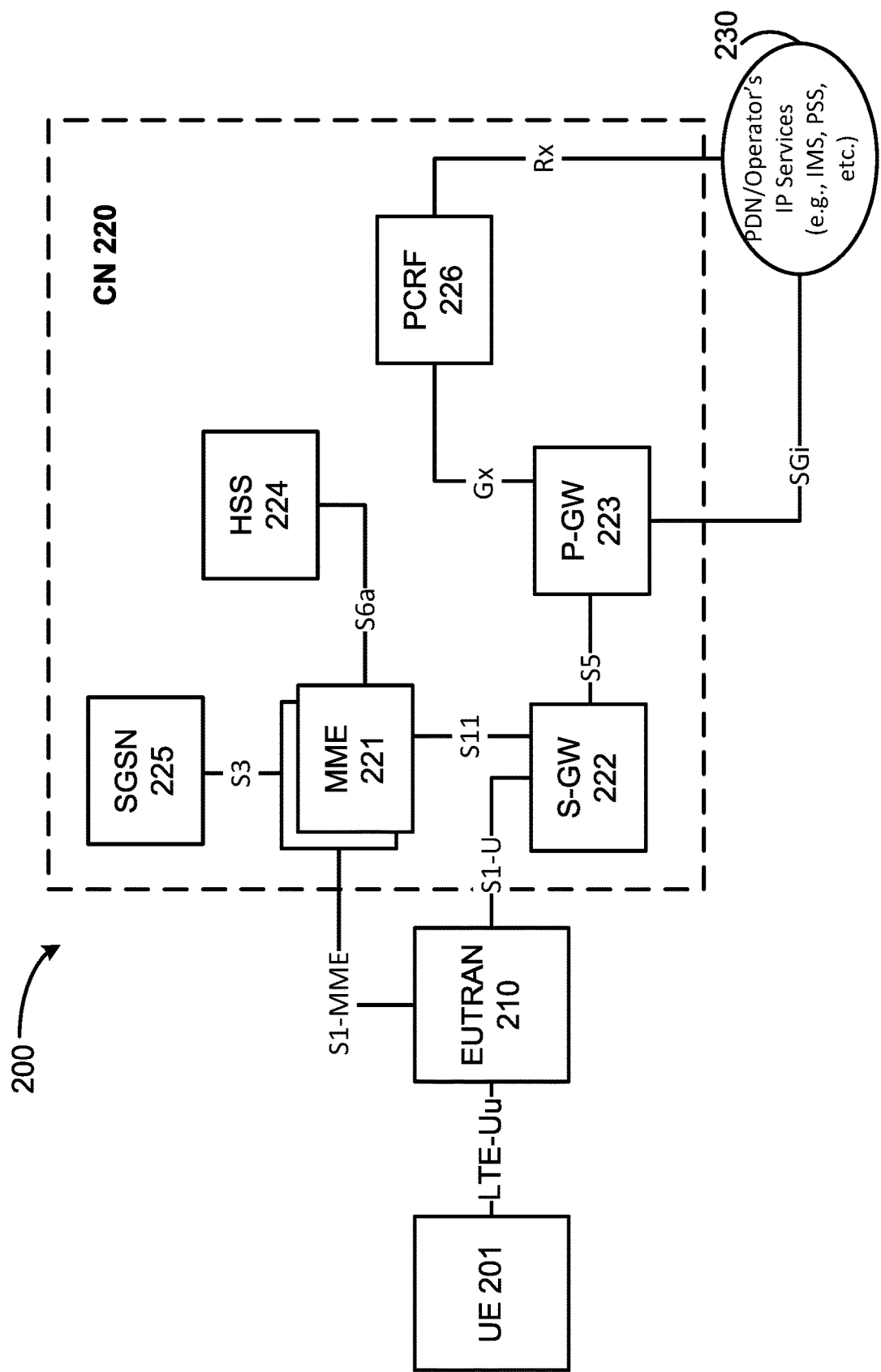
FIG. 2 depicts an architecture of a system including a first core network in accordance with some embodiments.

FIG. 2 illustrates an example architecture of a system 200 including a first CN 220, in accordance with various embodiments. In this example, system 200 may implement the LTE standard wherein the CN 220 is an EPC 220 that corresponds with CN 120 of FIG. 1. Additionally, the UE 201 may be the same or similar as the UEs 101 of FIG. 1, and the E-UTRAN 210 may be a RAN that is the same or similar to the RAN 110 of FIG. 1, and which may include RAN nodes 111 discussed previously. The CN 220 may comprise MMEs 221, an S-GW 222, a P-GW 223, a HSS 224, and a SGSN 225.

The MMEs 221 may be similar in function to the control plane of legacy SGSN, and may implement MM functions to keep track of the current location of a UE 201. The MMEs 221 may perform various MM procedures to manage mobility aspects in access such as gateway selection and tracking area list management. MM (also referred to as "EPS MM" or "EMM" in E-UTRAN systems) refers to all applicable procedures, methods, data storage, etc. that are used to maintain knowledge about a present location of the UE 201, provide user identity confidentiality, and/or perform other like services to users/subscribers. Each UE 201 and the MME 221 may include an MM or EMM sublayer, and an MM context may be established in the UE 201 and the MME 221 when an attach procedure is successfully completed. The MM context may be a data structure or database object that stores MM-related information of the UE 201. The MMEs 221 may be coupled with the HSS 224 via an S6a reference point, coupled with the SGSN 225 via an S3 reference point, and coupled with the S-GW 222 via an S11 reference point.

The SGSN 225 may be a node that serves the UE 201 by tracking the location of an individual UE 201 and performing security functions. In addition, the SGSN 225 may perform Inter-EPC node signaling for mobility between 2G/3G and E-UTRAN 3GPP access networks; PDN and S-GW selection as specified by the MMEs 221; handling of UE 201 time zone functions as specified by the MMEs 221; and MME selection for handovers to E-UTRAN 3GPP access network. The S3 reference point between the MMEs 221 and the SGSN 225 may enable user and bearer information exchange for inter-3GPP access network mobility in idle and/or active states.

The HSS 224 may comprise a database for network users, including subscription-related information to support the network entities' handling of communication sessions. The EPC 220 may comprise one or several HSSs 224, depending on the number of mobile subscribers, on the capacity of the equipment, on the organization of the network, etc. For example, the HSS 224 can provide support for routing/roaming, authentication, authorization, naming/addressing resolution, location dependencies, etc. An S6a reference point between the HSS 224 and the MMEs 221 may enable transfer of subscription and authentication data for authenticating/authorizing user access to the EPC 220 between HSS 224 and the MMEs 221.

The S-GW 222 may terminate the S1 interface 113 ("S1-U" in FIG. 2) toward the RAN 210, and routes data packets between the RAN 210 and the EPC 220. In addition, the S-GW 222 may be a local mobility anchor point for inter-RAN node handovers and also may provide an anchor for inter-3GPP mobility. Other responsibilities may include lawful intercept, charging, and some policy enforcement. The S11 reference point between the S-GW 222 and the MMEs 221 may provide a control plane between the MMEs 221 and the S-GW 222. The S-GW 222 may be coupled with the P-GW 223 via an S5 reference point.

The P-GW 223 may terminate an SGi interface toward a PDN 230. The P-GW 223 may route data packets between the EPC 220 and external networks such as a network including the application server 130 (alternatively referred to as an "AF") via an IP interface 125 (see e.g., FIG. 1). In embodiments, the P-GW 223 may be communicatively coupled to an application server (application server 130 of FIG. 1 or PDN 230 in FIG. 2) via an IP communications interface 125 (see, e.g., FIG. 1). The S5 reference point between the P-GW 223 and the S-GW 222 may provide user plane tunneling and tunnel management between the P-GW 223 and the S-GW 222. The S5 reference point may also be used for S-GW 222 relocation due to UE 201 mobility and if the S-GW 222 needs to connect to a non-collocated P-GW 223 for the required PDN connectivity. The P-GW 223 may further include a node for policy enforcement and charging data collection (e.g., PCEF (not shown)). Additionally, the SGi reference point between the P-GW 223 and the packet data network (PDN) 230 may be an operator external public, a private PDN, or an intra operator packet data network, for example, for provision of IMS services. The P-GW 223 may be coupled with a PCRF 226 via a Gx reference point.

PCRF 226 is the policy and charging control element of the EPC 220. In a non-roaming scenario, there may be a single PCRF 226 in the Home Public Land Mobile Network (HPLMN) associated with a UE 201's Internet Protocol Connectivity Access Network (IP-CAN) session. In a roaming scenario with local breakout of traffic, there may be two PCRFs associated with a UE 201's IP-CAN session, a Home PCRF (H-PCRF) within an HPLMN and a Visited PCRF (V-PCRF) within a Visited Public Land Mobile Network (VPLMN). The PCRF 226 may be communicatively coupled to the application server 230 via the P-GW 223. The application server 230 may signal the PCRF 226 to indicate a new service flow and select the appropriate QoS and charging parameters. The PCRF 226 may provision this rule into a PCEF (not shown) with the appropriate TFT and QCI, which commences the QoS and charging as specified by the application server 230. The Gx reference point between the PCRF 226 and the P-GW 223 may allow for the transfer of QoS policy and charging rules from the PCRF 226 to PCEF in the P-GW 223. An Rx reference point may reside between the PDN 230 (or "AF 230") and the PCRF 226.

Figure 3:
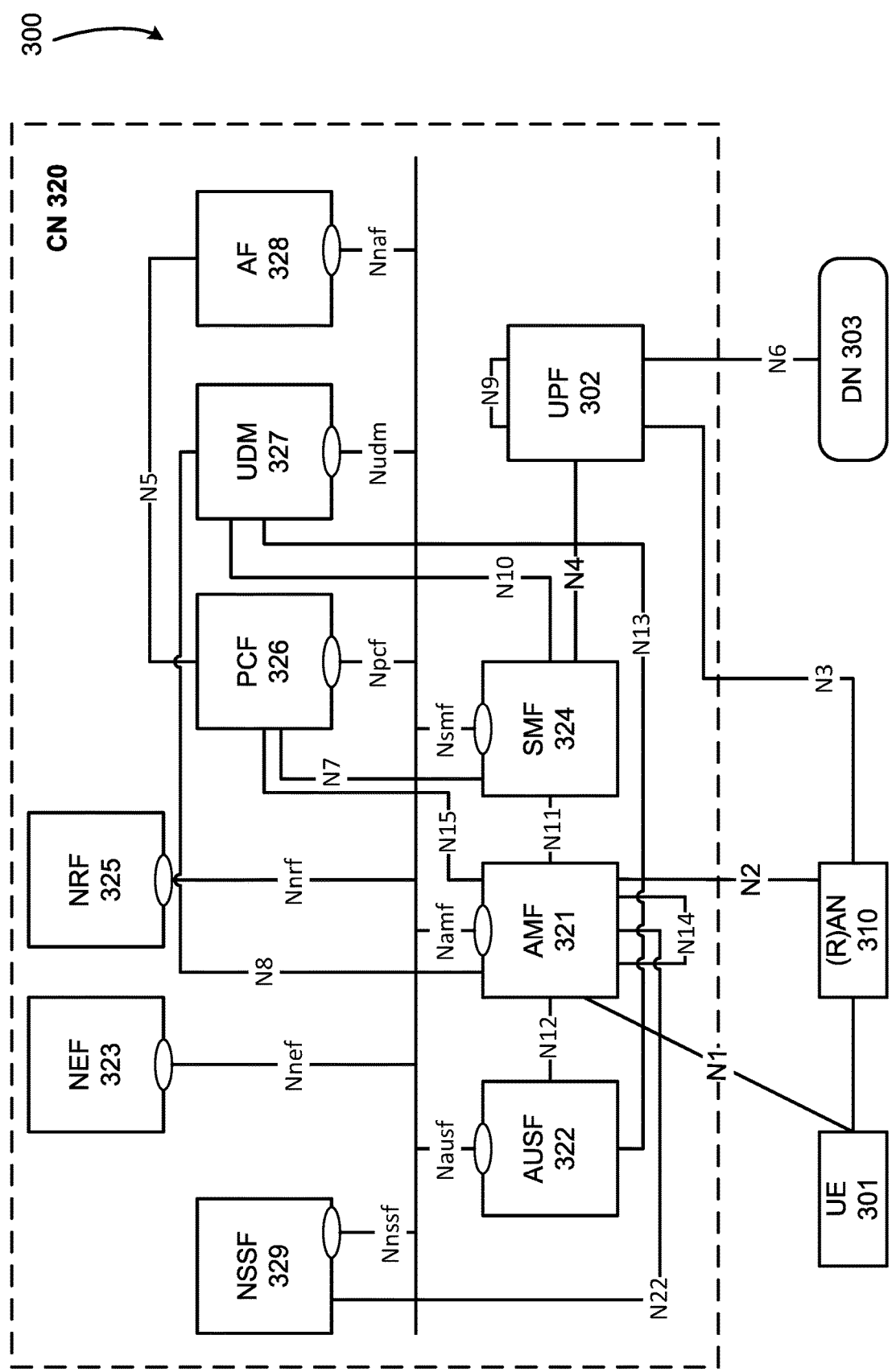
FIG. 3 depicts an architecture of a system including a second core network in accordance with some embodiments.

FIG. 3 illustrates an architecture of a system 300 including a second CN 320 in accordance with various embodiments. The system 300 is shown to include a UE 301, which may be the same or similar to the UEs 101 and UE 201 discussed previously; a (R)AN 310, which may be the same or similar to the RAN 110 and RAN 210 discussed previously, and which may include RAN nodes 111 discussed previously; and a DN 303, which may be, for example, operator services, Internet access or 3rd party services; and a 5GC 320. The 5GC 320 may include an AUSF 322; an AMF 321; a SMF 324; a NEF 323; a PCF 326; a NRF 325; a UDM 327; an AF 328; a UPF 302; and a NSSF 329.

The UPF 302 may act as an anchor point for intra-RAT and inter-RAT mobility, an external PDU session point of interconnect to DN 303, and a branching point to support multi-homed PDU session. The UPF 302 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 302 may include an uplink classifier to support routing traffic flows to a data network. The DN 303 may represent various network operator services, Internet access, or third party services. DN 303 may include, or be similar to, application server 130 discussed previously. The UPF 302 may interact with the SMF 324 via an N4 reference point between the SMF 324 and the UPF 302.

The AUSF 322 stores data for authentication of UE 301 and handle authentication-related functionality. The AUSF 322 may facilitate a common authentication framework for various access types. The AUSF 322 may communicate with the AMF 321 via an N12 reference point between the AMF 321 and the AUSF 322; and may communicate with the UDM 327 via an N13 reference point between the UDM 327 and the AUSF 322. Additionally, the AUSF 322 may exhibit an Nausf service-based interface.

The AMF 321 is responsible for registration management (e.g., for registering UE 301, etc.), connection management, reachability management, mobility management, and lawful interception of AMF-related events, and access authentication and authorization. The AMF 321 is a termination point for an N11 reference point between the AMF 321 and the SMF 324, a termination point for an N2 reference point between the (R)AN 310 and the AMF 321, a termination point for an N8 reference point between the UDM 327 and the AMF 328, a termination point for an N12 reference point between the AMF 321 and AUSF 322, a termination point for an N14 reference point between the AMF 321 and one or more other AMFs 321, a termination point for an N17 reference point between the AMF 321 and a 5G-EIR, a termination point for an N20 reference point between the AMF 321 and an SMSF (not shown by FIG. 3) (e.g., for SMS over NAS), a termination point for an N22 reference point between the AMF 321 and the NSSF 329, and a termination point for an N50 reference point between the AMF 321 and a CBCF (not shown by FIG. 3).

The AMF 321 provides transport for SM messages between the UE 301 and the SMF 324, and acts as a transparent proxy for routing SM messages. The AMF 321 also provides transport for SMS messages between UE 301 and an SMSF. The AMF 321 may act as SEAF, which may include interaction with the AUSF 322 and the UE 301, receipt of an intermediate key that was established as a result of the UE 301 authentication process. Where USIM based authentication is used, the AMF 321 may retrieve the security material from the AUSF 322. AMF 321 may also include a SCM function, which receives a key from the SEA that it uses to derive access-network specific keys. Furthermore, AMF 321 is a termination point of for NAS (N1) signalling (e.g., with UE 301), and performs NAS ciphering and integrity protection. In these embodiments, the AMF 321 may include an NAS-MM entity that provides NAS protocol functionality for RM, CM, UP connection activation/deactivation, as well as ciphering and integrity protection for NAS signaling (a same or similar NAS-MM entity may be included in the UE 301 for performing the same or similar functions). A single N1 termination point is located in AMF 324, and a single N1 NAS signaling connection is used for each access to which the UE 301 is connected. The single N1 NAS signaling connection is used for both Registration Management and Connection Management (RM/CM) and for SM-related messages and procedures for the UE 301. The NAS protocol on N1 comprises a NAS-MM and a NAS-SM components. In some embodiments, the NAS-MM in the AMF 324 transmits other types of NAS message (e.g., NAS-SM, SMS, etc.) together with an RM/CM NAS message by supporting NAS transport of different types of payloads or messages that do not terminate at the AMF 324, including NAS-SM, SMS, UE Policy, and LCS between the UE 301 and the AMF 321.

AMF 321 may also support NAS signalling with a UE 301 over an N3IWF interface for N3GPP access (e.g., the N2 reference point discussed herein). N3GPP access networks are connected to the 5GC 320 via an N3IWF (not shown by FIG. 3). In these embodiments, the AMF 321 authenticates UEs 301 connected over the N3IWF; manages mobility, authentication, and separate security context state(s) of UE(s) 301 connected via N3GPP access or connected via 3GPP and N3GPP accesses simultaneously; supports N2 interface with N3IWF, where some information (e.g. 3GPP Cell Identification) and procedures (e.g. handover related) defined over 3GPP access may not apply, and N3GPP access specific information may be applied that do not apply to 3GPP accesses; and supports NAS signalling with UEs 301 over the N3IWF, wherein some procedures supported by NAS signalling over 3GPP access may be not applicable to untrusted N3GPP (e.g. paging) access. The N3IWF is used to provide access to untrusted entities. N3IWF is a termination point for the N2 interface between the (R)AN 310 and the AMF 321 for the control plane (CP), and may be a termination point for the N3 reference point between the (R)AN 310 and the UPF 302 for the user plane (UP). As such, the AMF 321 may handle N2 signalling from the SMF 324 and the AMF 321 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated with such marking received over N2. N3IWF may also relay uplink and downlink control-plane NAS signalling between the UE 301 and AMF 321 via an N1 reference point between the UE 301 and the AMF 321, and relay uplink and downlink user-plane packets between the UE 301 and UPF 302. The N3IWF also provides mechanisms for IPsec tunnel establishment with the UE 301. The AMF 321 may exhibit an Namf service-based interface, and may be a termination point for an N14 reference point between two AMFs 321 and an N17 reference point between the AMF 321 and a 5G-EIR (not shown by FIG. 3).

The UE 301 needs to register with the AMF 321 in order to receive network services that require registration. Registration Management (RM) is used to register or deregister the UE 301 with the network (e.g., AMF 321), and establish a UE context in the network (e.g., AMF 321). An initial registration procedure involves execution of network access control functions (e.g., user authentication and access authorization based on subscription profiles in UDM 327). As result of the registration procedure, the identifier of the serving AMF 321 serving the UE 301 in the access through which the UE 301 has registered will be registered in UDM 327. Once registered, and if applicable, the UE 301 updates its registration with the network (e.g., AMF 321) periodically, in order to remain reachable (Periodic Registration Update); upon mobility (Mobility Registration Update); or to update its capabilities or re-negotiate protocol parameters (Mobility Registration Update). Two RM states are used in the UE 301 and the AMF 321 that reflect the registration status of the UE 301 in the selected PLMN, including RM-REGISTERED and RM-DEREGISTERED. The RM procedures and RM states are applicable over both 3GPP access and non-3GPP (N3GPP) access, where the 3GPP and N3GPP RM states are independent of each other. When served by the same PLMN for 3GPP and N3GPP accesses, the UE RX01 is served by the same AMF 321 except in the temporary situation wherein after a mobility from EPS while the UE 301 has PDU Sessions associated with the N3GPP access.

For 3GPP access, when the UE 301 operates the RM-DEREGISTERED state, the UE 301 is not registered with the network, and the UE context in AMF 321 (e.g., the RM context) holds no valid location or routing information for the UE 301 so the UE 301 is not reachable by the AMF 321. In the RM-REGISTERED state, the UE 301 is registered with the network, and the UE context in AMF 321 may hold a valid location or routing information for the UE 301 so the UE 301 is reachable by the AMF 321. In the RM-REGISTERED state, the UE 301 may perform a Mobility Registration Update procedure if a current TAI of the serving cell is not in a list of TAIs that the UE 301 has received from the network (e.g., AMF 321) in order to maintain the registration and enable the AMF 321 to page the UE 301; perform a Periodic Registration Update procedure triggered by expiration of the periodic update timer to notify the network (e.g., AMF 321) that the UE 301 is still active; perform a Mobility Registration Update procedure to update capability information (e.g., UE capability information) and/or to re-negotiate protocol parameters with the network (e.g., AMF 321); perform a Deregistration procedure and enter RM-DEREGISTERED state when the UE 301 needs to be no longer registered with the PLMN (wherein the UE 301 may decide to deregister from the network at any time; enter the RM-DEREGISTERED state when receiving a Registration Reject message or a Deregistration message (the actions of the UE 301 depend upon a 'cause value' in the Registration Reject or Deregistration message); among others.

The AMF 321 stores one or more RM contexts for the UE 301, where each RM context is associated with a specific access to the network. The RM context is a data structure, database object, etc. that indicates or stores, inter alia, a registration state per access type and the periodic update timer. For a given serving PLMN, there is one RM context for the UE 301 for each access, for example, when the UE 301 is consecutively or simultaneously served by a 3GPP access and by a N3GPP access (via an N3IWF) of the same PLMN. The UDM 327 manages separate/independent UE Registration procedures for each access. The AMF 321 associates multiple access-specific RM contexts for the UE 321 with a globally unique 5G-GUTI that is common to both 3GPP and Non-3GPP accesses; a Registration state per access type (e.g., 3GPP/N3GPP); a Registration Area per access type wherein one Registration Area for 3GPP access and another Registration Area for N3GPP access, and Registration Areas for the 3GPP access and the N3GPP access are independent; one or more timers for 3GPP access including a Periodic Registration timer and a Mobile Reachable timer and an Implicit Deregistration timer; and timers for non-3GPP access including a UE Non-3GPP Deregistration timer and a Network Non-3GPP Implicit Deregistration timer.

When the RM state of the UE 301 in the AMF 321 is the RM-REGISTERED state, the AMF 321 performs a Deregistration procedure and enters the RM-DEREGISTERED state for the UE 301 when the UE 301 needs to be no longer registered with the PLMN (wherein the network may decide to deregister the UE 321 at any time); performs Implicit Deregistration at any time after the Implicit Deregistration timer expires, wherein the AMF 321 enters the RM-DEREGISTERED state for the UE SR21 after Implicit Deregistration; and when applicable, accept or reject Registration Requests or Service Requests from the UE 301.

The AMF 321 also performs registration area management functions. Registration Area management comprises the functions to allocate and reallocate a Registration area to a UE 301. A registration area is managed per access type, for example 3GPP access or N3GPP access. When the UE 301 registers with the network over the 3GPP access, the AMF 321 allocates a set of tracking areas in TAI List to the UE 301. When the AMF 321 allocates a registration area, for example, the set of tracking areas in the TAI List, to the UE 301, the AMF 321 may take into account various information (e.g., Mobility Pattern and Allowed/Non-Allowed Area). When the AMF 321 has the whole PLMN as serving area, the AMF 321 may alternatively allocate the whole PLMN ("all PLMN") as a registration area to a UE 301 in MICO mode. The 5GC 300 supports allocating a Registration Area using a single TAI List for a UE 301, which includes tracking areas of any NG-RAN nodes in the Registration Area. A single TAI dedicated to N3GPP access (a "N3GPP TAI") is defined in a PLMN and applies within that PLMN. When the UE 301 registers with the network over the N3GPP access, the AMF allocates a registration area that only includes the N3GPP TAI to the UE 301. When generating the TAI list, the AMF 321 includes only TAIs that are applicable on the access type (e.g., 3GPP access or N3GPP access) where the TAI list is sent. To prevent extra signaling load resulting from Mobility Registration Update occurring at every RAT change, the AMF 321 may avoid generating a RAT-specific TAI list for the UE 301 when the UE 301 supports more than one RAT. For all 3GPP Access RATs in NG-RAN 310 and for N3GPP access, the 5GS 300 supports the TAI format including MCC, MNC and a 3-byte TAC only.

LADN service area(s) and LADN DNN(s) are configured in the AMF 321 on a per DN 303 basis. An LADN may be a service provided by the serving PLMN. An LADN is a DN 303 (or DNN) that is accessible by a UE 301 in one or more specific areas. Outside of these specific areas, the UE 301 is not able to access the DN 303 (or DNN). The LADN feature may be used for special DNNs that are local to, for example, a stadium, shopping center, university campus, enterprise buildings/campus, and/or the like. The specific areas where an LADN DNN is available are referred to as "LADN service areas." An LADN service area is a set of Tracking Areas configured in the AMF 321. Access to the DN 303 (or a DNN) via a PDU Session for a LADN is only available in a specific LADN service area. The LADN service applies only to 3GPP accesses and does not apply in Home Routed case; the usage of an LADN DNN requires an explicit subscription to the DNN or subscription to a wildcard DNN, and whether a DNN corresponds to an LADN service is an attribute of the DNN. DNs 303 (or DNNs) that are not configured as an LADN do not have an LADN service area and are not restricted by this feature. LADN services areas are provided to the UE 301 during registration, and therefore, the UE 301 is aware of what services areas an LADN DNN is available and should not attempt to access an LADN DNN when the UE 301 is outside of those services areas. The UE 301 is also configured to know whether a DNN is a LADN DNN and an association between application and LADN DNN. The configured association is a UE 301 local configuration. Additionally or alternatively, the UE 301 gets the information on whether a DNN is an LADN DNN from LADN Information during (re-)registration procedure as discussed herein.

For different UEs 301 accessing the same LADN, the configured LADN service area is the same regardless of other factors (e.g., UE's 301 Registration Area or UE subscription). If an LADN is not available in any TA of the AMF 321's service area, the AMF 321 is not required to be configured with any LADN related information for that DNN. LADN Information (e.g., LADN Service Area Information and LADN DNN) is provided by AMF 321 to the UE 301 during a Registration procedure or a UE Configuration Update procedure. For each LADN DNN configured in the AMF 321, the corresponding LADN Service Area Information includes a set of Tracking Areas that belong to the Registration Area that the AMF 321 assigns to the UE 301 (e.g., the intersection of the LADN service area and the assigned Registration Area). The AMF 321 does not create a Registration Area based on the availability of LADNs. It is possible that the LADN Service Area Information sent by the AMF 321 to the UE 301 contains only a sub-set of the full LADN service area as the LADN service area can contain one or more TA(s) outside of the registration area of the UE 301 or outside of the area served by the AMF 321.

According to various embodiments, the UE 301 provides an indication of one or more configured LADN DNNs (e.g., in a list of configured LADN DNNs) during the initial registration procedure. If there are any changes to the UE 301 configured LADN DNN(s), the UE 301 provides another indication of the changed/updated configured LADN DNNs (e.g., as an updated list of configured LADN DNN(s)) to AMF 321 using a suitable Registration procedure. In various embodiments, during the authentication and authorization procedure, the AMF 321 receives an indication of whether an LADN or LADN DNN is authorized to be used by the UE 301 based on subscription information. The subscription information may be included in the subscription profile from UDM 327. By looking into the configured LADN Information in the AMF 321 and the LADN authorization information for the UE 321 in the subscription profile, the AMF 321 determines the LADN DNN(s) that the UE 301 can use in a current Registration Area. The AMF 321 also sends a Registration Accept message to the UE 321, which includes the allowed LADN(s) Information and/or an indication of allowed/authorized LADN DNN(s) (e.g., as a list of LADN DNN(s) and corresponding LADN service area(s)). In some embodiments, the AMF 321 may send the LADN information to the UE 301 in a UE Configuration Update Command, or some other suitable message. These and other embodiments are discussed in more detail infra with respect to FIG. 4.

When the UE 301 performs a successful (re-)registration procedure, the AMF 321 may provide, to the UE 301 in a Registration Accept message, LADN Information for a list of LADN(s) available to the UE 301 in that Registration Area, based on a local configuration (e.g., via OAM) about LADN, UE 301 location, and UE 301 subscription information received from the UDM 327 about subscribed DNN(s). The list of LADN(s) is determined to be the LADN DNN(s) in the subscribed DNN list (except for wildcard DNNs) when neither an LADN DNN nor an indication of requesting LADN Information is provided in the Registration Request message. The list of LADN(s) is determined to be the LADN DNN(s) the UE requested if the UE subscribed DNN(s) includes the requested LADN DNN or if a wildcard DNN is included in the UE's 301 subscription data when the UE 301 provides LADN DNN(s) in the Registration Request message. In some implementations, an application can use only one LADN DNN at a time. The list of LADN(s) is determined to be all the LADN DNN(s) configured in the AMF 321 if the wildcard DNN is subscribed and/or the LADN DNN(s) which is in a subscribed DNN list and no wildcard DNN is subscribed when the UE 301 provides an indication of requesting LADN Information in the Registration Request message.

The UE 301 may provide either the LADN DNN(s) to retrieve the LADN Information for the indicated LADN DNN(s) or an indication of Requesting LADN Information to retrieve the LADN Information for all LADN(s) available in the current Registration Area. During subsequent Registration procedure(s), if the network does not provide LADN Information for a DNN, the UE 301 deletes any LADN Information for that DNN. When the LADN Information for the UE 301 in the 5GC 320 is changed, the AMF 321 updates the LADN Information to the UE 301 through the UE Configuration Update/Registration procedure. When receiving PDU Session Establishment with LADN DNN or Service Request for the established PDU Session corresponding to LADN, the AMF 321 determines the UE 301 presence in the LADN service area and forwards it to the SMF 324 if the requested DNN is configured at the AMF 321 as an LADN DNN.

Based on the LADN Service Area Information in the UE 301, the UE 301 determines whether it is in or out of a LADN service area. If the UE 301 does not have the LADN Service Area Information for an LADN DNN, the UE 301 considers it is out of the LADN service area. When the UE 301 is out of a LADN service area, the UE 301 does not request to activate UP connection of a PDU Session for this LADN DNN; does not establish/modify a PDU Session for this LADN DNN; and need not release any existing PDU Session for this LADN DNN unless the UE 301 receives explicit SM PDU Session Release Request message from the network. When the UE 301 is in an LADN service area, the UE 301 may request a PDU Session Establishment/Modification for the corresponding LADN DNN; and/or may request to activate UP connection of the existing PDU Session for the LADN DNN.

With respect to N3GPP access, the UE 301 enters the RM-DEREGISTERED state and the AMF 321 enters RM-DEREGISTERED state for the UE 321 on non-3GPP access at the UE 301 and at the AMF 321, after performing an Explicit Deregistration procedure; at the AMF 321, after the Network non-3GPP Implicit Deregistration timer has expired; and/or at the UE, after the UE 301 non-3GPP Deregistration timer has expired. Whenever the UE 301 registers over N3GPP access enters the CM-IDLE state for the non-3GPP access, the UE 301 starts a UE non-3GPP Deregistration timer according to the value received from the AMF 321 during a Registration procedure. Over N3GPP access, the AMF 321 runs the Network non-3GPP Implicit Deregistration timer. The Network non-3GPP Implicit Deregistration timer is started with a value longer than the UE's 301 non-3GPP Deregistration timer, whenever the CM state for the UE 301 registered over non-3GPP access changes to CM-IDLE for the non-3GPP access.

The AMF 321 also performs various Connection Management (CM) functions for UEs 301. CM is used to establish and release a signaling connection between the UE 301 and the AMF 321 over the N1 interface. The signaling connection is used to enable NAS signaling exchange between the UE 301 and the CN 320, and comprises both the signaling connection between the UE and the AN (e.g., RRC connection or UE-N3IWF connection for N3GPP access) and the N2 connection for the UE 301 between the AN (e.g., RAN 310) and the AMF 321. The AMF 321 also stores one or more CM contexts for the UE 301, which may be the same or similar as the RM contexts discussed previously, but are used to store CM related parameters.

Two CM states are used to reflect the NAS signaling connection of the UE 301 with the AMF 321 including a CM-IDLE state and a CM-CONNECTED state. The CM state for 3GPP access and N3GPP access are independent of each other, for example, one of the UE 301 or the AMF 321 can be in the CM-IDLE state at the same time as when the other one of the UE 301 or the AMF 321 is in the CM-CONNECTED state. When the UE 301 is operating in the CM-IDLE state, the UE 301 has no NAS signaling connection established with the AMF 321 over the N1 interface, and there may be (R)AN 310 signaling connection (e.g., N2 and/or N3 connections) for the UE 301. In the CM-IDLE state, the UE 301 performs cell (re)selection and PLMN selection procedures. When the UE 301 is in both the CM-IDLE state and the RM-REGISTERED state, the UE 301 responds to paging by performing a Service Request procedure, unless the UE 301 is in MICO mode; and performs the Service Request procedure when the UE 301 has uplink signaling and/or user data to be sent. In embodiments, specific conditions may apply for LADN. When the states of the UE 301 in the AMF 321 are both the CM-IDLE state and the RM-REGISTERED state, the AMF 321 performs a network triggered Service Request procedure when it has signalling or mobile-terminated data to be sent to the UE 301. The AMF 321 performs the network triggered Service Request procedure by sending a Paging Request to the UE 321 if the UE 321 is not prevented from responding due to, for example, MICO mode or Mobility Restrictions. The AMF 321 enters the CM-CONNECTED state for the UE 301 whenever an N2 connection is established for the UE 301 between the AN 310 and the AMF 321. The reception of an initial N2 message (e.g., N2 INITIAL UE MESSAGE) initiates the transition of AMF 321 from the CM-IDLE state to the CM-CONNECTED state. In some embodiments, establishment of an N2 connection between the (R)AN 310 and the AMF 321 may cause the UE 301 to transition from CM-IDLE mode to CM-CONNECTED mode, and the UE 301 may transition from the CM-CONNECTED mode to the CM-IDLE mode when N2 signaling between the (R)AN 310 and the AMF 321 is released.

The UE 301 enters the CM-CONNECTED state whenever an AN signaling connection is established between the UE 301 and the AN (e.g., entering the RRC connected state over 3GPP access, or at the establishment of the UE-N3IWF connectivity over N3GPP access). The transmission of an initial NAS message (e.g., a Registration Request, Service Request or Deregistration Request) initiates the transition from the CM-IDLE state to the CM-CONNECTED state. When the UE 301 is operating in the CM-CONNECTED state, the UE 301 has an established NAS signaling connection with the AMF 321 over the N1 interface, and there may be a (R)AN 310 signaling connection (e.g., N2 and/or N3 connections) for the UE 301. A NAS signaling connection uses an RRC connection between the UE 301 and the NG-RAN 310 and an NGAP UE association between the AN 310 and the AMF 321 for 3GPP access. The UE 301 can be in the CM-CONNECTED state with an NGAP UE association that is not bound to any TNLA between the AN 310 and the AMF 321. Upon completion of the NAS signaling procedure, the AMF 321 may decide to release the NAS signaling connection with the UE 301. In the CM-CONNECTED state, the UE 321 enters the CM-IDLE state whenever the AN 310 signalling connection is released (e.g., by entering the RRC idle state over 3GPP access or when the release of the UE-N3IWF connectivity over N3GPP access is detected by the UE 301). When the UE 301 CM state in the AMF 321 is the CM-CONNECTED state, the AMF 321 enters the CM-IDLE state for the UE 301 whenever the logical NGAP signalling connection and the N3 user plane connection for the UE 301 are released upon completion of the AN Release procedure. The AMF 321 may keep a UE 301 CM state in the AMF 321 in the CM-CONNECTED state until the UE 301 de-registers from the CN 320. Additionally, when the UE 301 is in the CM-CONNECTED state, the UE 301 can also be in the RRC inactive state. When the UE is in the RRC inactive state UE reachability is managed by the RAN 310, with assistance information from CN 320; UE paging is managed by the RAN 310; and the UE 301 monitors for paging with the UE's 301 CN identifier (e.g., a 5G S-TMSI) and RAN identifier.

The AMF 321 also performs MM related functions, such as Mobility Restrictions and Mobility Pattern functionality. The AMF 321 also stores one or more MM contexts for the UE 301, which may be the same or similar as the CM and/or RM contexts discussed previously, but are used to store MM related parameters such as a mobility pattern and/or mobility restrictions. In some embodiments, the AMF 321 stores a 5GC MM context that may be the same or similar to the (E)MM context discussed herein, which stores, inter alia, a CE mode B Restriction parameter of the UE 301 in an associated MM context or RM context. The AMF 321 may also derive the value, when needed, from the UE's 301 usage setting parameter already stored in the UE context (and/or MM/RM context). The Mobility Pattern is a concept that may be used by the AMF 321 to characterize and optimize UE mobility. The AMF 321 determines and updates Mobility Pattern of the UE 301 based on subscription of the UE 301, statistics of the UE mobility, network local policy, and the UE assisted information, or any combination thereof. The statistics of the UE mobility can be historical or expected UE moving trajectory. The Mobility Pattern can be used by the AMF 321 to optimize mobility support provided to the UE 301, for example, Registration area allocation and the like.

Mobility Restrictions restrict mobility handling or service access of a UE 301. The Mobility Restriction functionality is provided by the UE 301 only for mobility restriction categories provided to the UE 301, the RAN 310, and the CN 320. Service Area restrictions and handling of Forbidden Areas for the CM-IDLE state and for the CM-CONNECTED state when the UE 301 is in the RRC inactive state are executed by the UE 301 based on information received from the CN 320. Mobility Restrictions for CM-CONNECTED state when in RRC-Connected state are executed by the RAN 310 and the CN 320. In the CM-CONNECTED state, the CN 320 provides Mobility Restrictions to the RAN 310 within a Mobility Restriction List. The CN 320 determines the Mobility Restrictions based on UE subscription information, UE location, and local policy. The Mobility Restriction may change due to, for example, UE 301 subscription, location change, and local policy.

Mobility Restrictions include RAT restrictions, Forbidden Areas, Service Area Restrictions, and Core Network type restriction. Core Network type restriction defines whether the UE 301 is allowed to connect to the 5GC 320 for a particular PLMN. RAT restrictions define the 3GPP RATs that the UE 301 is not allowed to access in a PLMN. In a restricted RAT, the UE 301 is not permitted access to the network for this PLMN. The RAT restrictions may be defined by or otherwise based on subscription information related to the UE 301. For CM-CONNECTED state, when RAN 310 determines a target RAT and target PLMN during a handover procedure, the RAN 310 should take per PLMN RAT restriction into consideration. The RAT restriction is enforced in the network, and not provided to the UE 301. Forbidden Areas are areas where the UE 301, based on subscription information, is not permitted to initiate any communication with the network for the PLMN. The UE behaviour in terms of cell selection, RAT selection, and PLMN selection depends on the network response that informs the UE 301 of the Forbidden Area.

Service Area Restrictions defines areas in which the UE 301 may or may not initiate communication with the network. The Service Area Restrictions may include Allowed Areas and non-Allowed Areas. In an Allowed Area, the UE 301 is permitted to initiate communication with the network as allowed by the UE subscription. In a Non-Allowed Area, the UE 301 is service area restricted based on subscription information. The UE 301 and the network are not allowed to initiate a Service Request or SM signalling to obtain user services both in CM-IDLE and in CM-CONNECTED states. The UE 301 does not use the entering of a non-Allowed Area as a criterion for cell reselection, a trigger for PLMN Selection, or domain selection for UE 301 originating sessions or calls. The RRC procedures while the UE 301 is in CM-CONNECTED with RRC inactive state are unchanged compared to when the UE 301 is in an Allowed Area. The RM procedures are unchanged compared to when the UE is in an Allowed Area. When the UE 301 is in a non-Allowed Area, the UE 301 responds to CN 320 paging or NAS Notification messages from N3GPP access with a Service Request and RAN paging. Optionally, the Service Area Restrictions or the non-Allowed Area may be fine-tuned by the PCF 326, for example, based on UE location, PEI, and/or network policies. Service Area Restrictions may be updated during a registration procedure or UE Configuration Update procedure.

The SMF 324 is responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF 321 over N2 to AN; and determining SSC mode of a session. The SMF 324 may check whether the UE 301 requests are compliant with user subscription information associated with the UE 301. In this regard, the SMF 324 may retrieve and/or request to receive update notifications on SMF 324 level subscription data from the UDM 327. The SMF 324 may include the following roaming functionality: handling local enforcement to apply QoS SLAB (VPLMN); charging data collection and charging interface (VPLMN); lawful intercept (in VPLMN for SM events and interface to LI system); and support for interaction with external DN for transport of signalling for PDU session authorization/authentication by external DN. An N16 reference point between two SMFs 324 may be included in the system 300, which may be between another SMF 324 in a visited network and the SMF 324 in the home network in roaming scenarios. Additionally, the SMF 324 may exhibit the Nsmf service-based interface.

In some embodiments, the SMF 324 includes a NAS-SM entity that handles SM between the UE 301 and the SMF 324, such as UP PDU session establishment, modification, and release. The SM signaling message(s) is/are handled (e.g., created and processed) in the NAS-SM layer of the SMF 324. The UE 301 also includes an NAS-SM layer/entity that performs the same or similar functions as the NAS-SM entity/layer of the SMF 324. The content of the SM signaling message is not interpreted by the AMF 324. For transmission of SM signaling, the NAS-MM layer of the transmitting entity (e.g., of the AMF 321 and/or UE 301) creates a NAS-MM message including security header, indicating NAS transport of SM signalling, additional information for the receiving NAS-MM to derive how and where to forward the SM signalling message. For reception of SM signaling, the receiving NAS-MM processes the NAS-MM part of the message, i.e. performs integrity check, and interprets the additional information to derive how and where to derive the SM signalling message.

SM refers to management of a PDU session, and a PDU session or "session" refers to a PDU connectivity service that provides or enables the exchange of PDUs between a UE 301 and a data network (DN) 303 identified by a Data Network Name (DNN). PDU sessions are established upon UE 301 request, modified upon UE 301 and 5GC 320 request, and released upon UE 301 and 5GC 320 request using NAS SM signaling exchanged over the N1 reference point between the UE 301 and the SMF 324. Each PDU Session supports a single PDU Session type, for example, the exchange of a single type of PDU requested by the UE at the establishment of the PDU Session.

The subscription information for each S-NSSAI may contain a Subscribed DNN list and one default DNN. When the UE 301 does not provide a DNN in a NAS Message containing PDU Session Establishment Request for a given S-NSSAI, the serving AMF 321 determines the DNN for the requested PDU Session by selecting the default DNN for the S-NSSAI if a default DNN is present in the UE's 301 Subscription Information; otherwise the serving AMF 321 selects a locally configured DNN for the S-NSSAI. If the DNN provided by the UE 301 is not supported by the network and AMF 321 cannot select an SMF 324 by querying the NRF 325, the AMF 321 rejects the NAS Message containing PDU Session Establishment Request from the UE 301 with a cause indicating that the DNN is not supported. The subscription information may include a wildcard DNN per subscribed S-NSSAI. When a wildcard DNN is associated with a subscribed S-NSSAI, the subscription allows the UE 301 to establish a PDU Session using any DNN value for that S-NSSAI. The SMF 324 is made aware whether the DNN of a PDU Session being established corresponds to an explicitly subscribed DNN or corresponds to a wildcard DNN. The SMF 324 can reject a PDU Session establishment if the DNN of the PDU Session is not part of explicitly subscribed DNN(s) and local policies in the SMF 324 require UE 301 to have a subscription to this DNN.

Upon request from an application server (e.g., application server 130 of FIG. 1), the 5GC 320 may trigger a specific application in the UE 301. In response to receipt of the application trigger message (or simply "trigger message"), the UE 301 passes the trigger message (or relevant parts/information of the trigger message) to one or more identified applications in the UE 301. The identified application(s) in the UE 301 may establish a PDU session to a specific DNN. The application trigger message contains information that allows the network to route the application trigger message to the appropriate UE 301, and allows the UE 301 to route the message to the appropriate application. The information destined to the application, excluding the information to route it, is referred to as the "trigger payload." The trigger payload is implementation specific. The application in the UE 301 may perform actions indicated by the trigger payload when the triggered payload is received at the UE 301. For example initiation of immediate or later communication with the application server 130 (or with elements in the DN 303) based on the information contained in the trigger payload, which includes the PDU Session Establishment procedure if the related PDU Session is not already established.

The SMF 324 may support PDU Sessions for LADN where access to the DN 303 is only available in a specific LADN service area. During a PDU session establishment procedure, the SMF 324 receives, inter alia, a "UE presence in LADN service area" from the AMF 321. The AMF 321 provides the "UE presence in LADN service area" to the SMF 324 to indicate if the UE 301 is IN or OUT of the LADN service area. The AMF 321 provides the "UE presence in LADN service area" when the AMF 321 determines that the DNN corresponds to an LADN. The SMF 324 checks the validity of the UE PDU session establishment request, and if the DNN corresponds to an LADN, the SMF 324 checks whether the UE 301 is located within the LADN service area based on the "UE presence in LADN service area" indication from the AMF 321. If the AMF 321 does not provide the "UE presence in LADN service area" indication and the SMF 324 determines that the DNN corresponds to a LADN, then the SMF 324 considers that the UE 301 to be OUT of the LADN service area. The SMF 324 may also subscribe to a UE mobility event notification from the AMF 321 (e.g., location reporting, UE moving into or out of Area Of Interest, etc.) by invoking the Namf_EventExposure_Subscribe service operation. For LADN, the SMF 324 subscribes to the UE moving into or out of the LADN service area event notification by providing the LADN DNN as an indicator for the Area Of Interest. Additionally, the UE 301 does not trigger a PDU Session establishment for a PDU Session corresponding to an LADN when the UE 301 is outside the area of availability of the LADN.

The SMF 324 supporting a DNN is configured with information about whether the DNN is an LADN DNN or not. When receiving an SM request corresponding an LADN from the AMF 321, the SMF 324 determines whether the UE 321 is inside the LADN service area based on the indication (e.g., the "UE Presence in LADN service area") received from the AMF 321. If the SMF 324 does not receive the indication, the SMF 324 considers that the UE 301 to be outside of the LADN service area. The SMF 324 rejects the request if the UE 301 is outside of the LADN service area. When the SMF 324 receives a request for PDU Session Establishment with the LADN DNN, the SMF 324 subscribe to a "UE mobility event notification" for reporting UE 301 presence in an Area of Interest by providing the LADN DNN to the AMF 321. In particular, the AMF 321 publishes various parameters to the subscribing NF consumers, including an event reporting type that specifies what to be reported on UE mobility (e.g. UE location, UE mobility on Area of Interest); Area Of Interest (AOI) that specifies a geographical area within 3GPP system; event reporting information such as event reporting mode, number of reports, maximum duration of reporting, event reporting condition (e.g. when the target UE moved into a specified Area Of Interest); notification address (e.g., endpoint address of NF service consumer to be notified to); and/or the target of event reporting that indicates a specific UE 301, a group of UE(s) 301 or any UE 301 (e.g., all UEs 301). The AOI is represented by a list of TAs, list of cells, or a list of (R)AN node identifiers. In the case of LADNs, the event consumer (e.g., the SMF 324) provides the LADN DNN to refer the LADN service area as the area of interest. In the case of Presence Reporting Area (PRA), the event consumer (e.g. SMF 324 or PCF 326) may provide an identifier for AOI to refer predefined area as the AOI.

The SMF 324 takes certain actions based on the notification about the UE 301 presence in the LADN service area as notified by AMF 321 (e.g., IN, OUT, or UNKNOWN). When SMF 324 is informed that the UE 301 presence in the LADN service area is OUT, the SMF 324 releases the PDU Session immediately or deactivates the user plane connection for the PDU Session with maintaining the PDU Session and ensures the Data Notification is disabled and the SMF 324 may release the PDU Session if the SMF 324 is not informed that the UE 301 moves into the LADN service area after a period. When SMF 324 is informed that the UE 301 presence in the LADN service area is IN, the SMF 324 ensures that Data Notification is enabled and triggers the Network triggered Service Request procedure for an LADN PDU Session to active the UP connection when the SMF 324 receives downlink data or Data Notification from UPF 302. When SMF 324 is informed that the UE 301 presence in the LADN service area is UNKNOWN, the SMF 324 may ensure that Data Notification is enabled, and may trigger the Network triggered Service Request procedure for a LADN PDU Session to active the UP connection when the SMF receives downlink data or Data Notification from UPF 302.

The NEF 323 may provide means for securely exposing the services and capabilities provided by 3GPP network functions for third party, internal exposure/re-exposure, Application Functions (e.g., AF 328), edge computing or fog computing systems, etc. In such embodiments, the NEF 323 may authenticate, authorize, and/or throttle the AFs. NEF 323 may also translate information exchanged with the AF 328 and information exchanged with internal network functions. For example, the NEF 323 may translate between an AF-Service-Identifier and an internal 5GC information. NEF 323 may also receive information from other network functions (NFs) based on exposed capabilities of other network functions. This information may be stored at the NEF 323 as structured data, or at a data storage NF using standardized interfaces. The stored information can then be re-exposed by the NEF 323 to other NFs and AFs, and/or used for other purposes such as analytics. Additionally, the NEF 323 may exhibit an Nnef service-based interface.

The NRF 325 may support service discovery functions, receive NF discovery requests from NF instances, and provide the information of the discovered NF instances to the NF instances. NRF 325 also maintains information of available NF instances and their supported services. As used herein, the terms "instantiate," "instantiation," and the like refers to the creation of an instance, and an "instance" refers to a concrete occurrence of an object, which may occur, for example, during execution of program code. Additionally, the NRF 325 may exhibit the Nnrf service-based interface.

The PCF 326 may provide policy rules to control plane function(s) to enforce them, and may also support unified policy framework to govern network behaviour. The PCF 326 may also implement an FE to access subscription information relevant for policy decisions in a UDR of the UDM 327. The PCF 326 may communicate with the AMF 321 via an N15 reference point between the PCF 326 and the AMF 321, which may include a PCF 326 in a visited network and the AMF 321 in case of roaming scenarios. The PCF 326 may communicate with the AF 328 via an N5 reference point between the PCF 326 and the AF 328; and with the SMF 324 via an N7 reference point between the PCF 326 and the SMF 324. The system 300 and/or CN 320 may also include an N24 reference point between the PCF 326 (in the home network) and a PCF 326 in a visited network. Additionally, the PCF 326 may exhibit an Npcf service-based interface.

The UDM 327 handles subscription-related information to support the network entities' handling of communication sessions, and stores subscription data of the UE 301. For example, subscription data may be communicated between the UDM 327 and the AMF 321 via an N8 reference point between the UDM 327 and the AMF 321. The UDM 327 may include two parts, an application FE and a UDR (the FE and UDR are not shown by FIG. 3). The UDR stores subscription data and policy data for the UDM 327 and the PCF 326, and/or structured data for exposure and application data (including PFDs for application detection, application request information for multiple UEs 301) for the NEF 323. The Nudr service-based interface may be exhibited by the UDR 221 to allow the UDM 327, PCF 326, and NEF 323 to access a particular set of the stored data, as well as to read, update (e.g., add, modify), delete, and subscribe to notification of relevant data changes in the UDR. The UDM 327 may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 324 via an N10 reference point between the UDM 327 and the SMF 324. UDM 327 may also support SMS management, wherein an SMS-FE implements the similar application logic as discussed previously. Additionally, the UDM 327 may exhibit the Nudm service-based interface. The UDM 327 uses subscription data (including authentication data) that may be stored in the UDR, in which case the UDM 327 implements application logic and does not require an internal user data storage. This allows several different UDMs 327 to serve the same UEs 301 in different transactions. The Initial Registration procedure involves execution of Network Access Control functions as discussed infra (e.g., user authentication and access authorization based on subscription profiles in the UDM 327). As result of the registration procedure, the identifier of the serving AMF 321 serving the UE 301 in the access through which the UE 301 has registered will be registered in UDM 327.

The UDM 327 also stores the Service Area Restrictions of the UE 301 as part of the UE's 301 subscription data. The PCF 326 in the serving network may (e.g. due to varying conditions such as UE's 301 location, application in use, time and date, etc.) further adjust Service Area Restrictions of the UE 301, either by expanding an allowed area or by reducing a non-allowed area or by increasing the maximum allowed number of tracking areas. The UDM 327 and the PCF 326 may update the Service Area Restrictions of the UE 301 at any time. For the UE 301 in the CM-CONNECTED state, the AMF 321 updates the UE 301 and RAN 310 immediately or as soon as practicable. For the UE 301 in the CM-IDLE state, the AMF 321 may page the UE 301 immediately or as soon as practicable, and/or store the updated service area restriction and update the UE 301 upon next signaling interaction with the UE 301. During registration, if the Service Area Restrictions of the UE 301 is not present in the AMF 321, the AMF 321 fetches, from the UDM 327, the Service Area Restrictions of the UE 301 that may be further adjusted by the PCF 326. The serving AMF 321 also enforces the Service Area Restrictions of the UE 301. A limited allowed area, given by a maximum allowed number of tracking areas, may be dynamically assigned by the AMF 321 adding, any not yet visited (by the UE 301) tracking areas to the allowed area until the maximum allowed number of tracking areas is reached.

The network functions (NFs) within the CN 320 may expose their capabilities as service(s) via respective service based interfaces, which can be re-used by other NFs. Unless the expected NF information is locally configured on a requester NF (e.g. the expected NF is in the same PLMN), the NF service discovery is implemented via the NF discovery. In embodiments, the UDM 327 may provide, inter alia, a subscriber data management (SDM) service, which may be referred to as a "Nudm_SubscriberDataManagement" service or "Nudm_SDM" Service. The SDM service allows NF consumers (e.g., AMF 321, SMF 324, PCF 326, etc.) to retrieve user subscription data when necessary, and provides updated user subscriber data to the subscribed NF consumers. Subscription data types used in the Nudm_SubscriberDataManagement Service are defined in table 1.

TABLE 1

UE Subscription Data Types

| Subscription data type | Field | Description |
| --- | --- | --- |
| Access and Mobility Subscription data (data needed for UE Registration and Mobility Management) | GPSI List | List of the GPSI (Generic Public Subscription Identifier) used both inside and outside of the 3GPP system to address a 3GPP subscription. |
| | Internal Group ID-list | List of the subscribed internal group(s) that the UE belongs to. |
| | Subscribed-UE-AMBR | The Maximum Aggregated uplink and downlink MBRs to be shared across all Non-GBR QoS Flows according to the subscription of the user. |

TABLE 1-continued

UE Subscription Data Types

| Subscription data type | Field | Description |
| --- | --- | --- |
| | Subscribed S-NSSAIs | The Network Slices that the UE subscribes to. In the roaming case, it indicates the subscribed Network Slices applicable to the Serving PLMN. |
| | Default S-NSSAIs | The Subscribed S-NSSAIs marked as default S-NSSAI. In the roaming case, only those applicable to the Serving PLMN. |
| | UE Usage Type | As defined in TS 23.501, clause 5.15.7.2. |
| | RAT restriction | 3GPP RAT(s) not allowed the UE to access. |
| | Forbidden area | Defines areas in which the UE is not permitted to initiate any communication with the network. |
| | Service Area Restriction | Indicates Allowed areas in which the UE is permitted to initiate communication with the network, and Non-allowed areas in which the UE and the network are not allowed to initiate Service Request or SM signalling to obtain user services. |
| | Core Network type restriction | Defines whether UE is allowed to connect to 5GC and/or EPC for this PLMN. |
| | RFSP Index | An index to specific RRM configuration in the NG-RAN. |
| | Subscribed Periodic Registration Timer | Indicates a subscribed Periodic Registration Timer value. |
| | MPS priority | Indicates the user is subscribed to MPS. |
| | MCX priority | Indicates the user is subscribed to MCX. |
| | UE behavioural information/ Communication patterns | Information on expected UE movement and communication characteristics. |
| | Steering of Roaming | List of preferred PLMN/access technology combinations or HPLMN indication that no change of the "Operator Controlled PLMN Selector with Access Technology" list stored in the UE is needed (see NOTE 3). Optionally includes an indication that the UDM requests an acknowledgement of the reception of this information from the UE. |
| | Network Slicing Subscription Change Indicator | When present, indicates to the serving AMF that the subscription data for network slicing changed and the UE configuration must be updated. |
| | Tracing Requirements | Trace requirements about a UE (e.g. trace reference, address of the Trace Collection Entity, etc.). This information is only sent to AMF in the HPLMN or one of its equivalent PLMN(s). |
| | Inclusion of NSSAI in RRC Connection Establishment Allowed | When present, it is used to indicate that the UE is allowed to include NSSAI in the RRC connection Establishment in clear text for 3GPP access. |
| | Subscribed DNN list | List of the subscribed DNNs for the UE (NOTE 1). Used to determine the list of LADN available to the UE. |
| Slice Selection Subscription data (data needed for Slice Selection) | Subscribed S-NSSAIs | The Network Slices that the UE subscribes to. In roaming case, it indicates the subscribed network slices applicable to the serving PLMN. |
| UE context in AMF data | AMF | Allocated AMF for the registered UE. Include AMF address and AMF NF Id. |
| | Access Type | 3GPP or non-3GPP access through this AMF |
| | Homogenous Support of IMS Voice over PS Sessions for AMF | Indicates per UE and AMF if "IMS Voice over PS Sessions" is homogeneously supported in all TAs in the serving AMF or homogeneously not supported, or, support is non-homogeneous/unknown. |
| SMF Selection Subscription data (data needed for SMF) | SUPI | Key |
| | SMF Selection Subscription data contains one or more S-NSSAI level subscription data: | |
| | S-NSSAI | Indicates the value of the S-NSSAI. |
| | Subscribed DNN list | List of the subscribed DNNs for the UE (NOTE 1). |
| | Default DNN | The default DNN if the UE does not provide a DNN (NOTE 2). |
| | LBO Roaming Information | Indicates whether LBO roaming is allowed per DNN, or per (S-NSSAI, subscribed DNN) |
| | Interworking with EPS indication list | Indicates for which DNN from the Subscribed DNN list interworking is supported. |
| UE context in SMF data | SUPI | Key |
| | PDU Session Id(s) | List of PDU Session Id(s) for the UE |
| | For each PDU Session Id: | |
| | DNN | DNN for the PDU Session. |
| | SMF | Allocated SMF for the PDU Session. Includes SMF IP Address and SMF NF Id. |

TABLE 1-continued

UE Subscription Data Types

| Subscription data type | Field | Description |
| --- | --- | --- |
| | PGW-C + SMF FQDN | The S5/S8 PGW-C + SMF FQDN used for interworking with EPS. |
| SMS Management Subscription data (data needed by SMSF for SMSF Registration) | SMS parameters | Indicates SMS parameters subscribed for SMS service such as SMS teleservice, SMS barring list |
| | Trace Requirements | Trace requirements about a UE (e.g. trace reference, address of the Trace Collection Entity, etc.). This information is only sent to a SMSF in HPLMN. |
| SMS Subscription data (data needed in AMF) | SMS Subscription | Indicates subscription to any SMS delivery service over NAS irrespective of access type. |
| UE Context in SMSF data | SMSF Information | Indicates SMSF allocated for the UE, including SMSF address and SMSF NF ID. |
| | Access Type | 3GPP or non-3GPP access through this SMSF |
| Session Management Subscription data (data needed for PDU Session Establishment) | GPSI List | List of the GPSI (Generic Public Subscription Identifier) used both inside and outside of the 3GPP system to address a 3GPP subscription. |
| | Internal Group ID-list | List of the subscribed internal group(s) that the UE belongs to. |
| | Trace Requirements | Trace requirements about a UE (e.g. trace reference, address of the Trace Collection Entity, etc . . .). This information is only sent to a SMF in the HPLMN or one of its equivalent PLMN(s). |
| | Session Management Subscription data contains one or more S-NSSAI level subscription data: | |
| | S-NSSAI | Indicates the value of the S-NSSAI. |
| | Subscribed DNN list | List of the subscribed DNNs for the S-NSSAI (NOTE 1). |
| | For each DNN in S-NSSAI level subscription data: | |
| | DNN | DNN for the PDU Session. |
| | UE Address | Indicates the subscribed static IP address(es) for the IPv4 or IPv6 or IPv4v6 type PDU Sessions accessing the DNN, S-NSSAI. |
| | Allowed PDU Session Types | Indicates the allowed PDU Session Types (IPv4, IPv6, IPv4v6, Ethernet, and Unstructured) for the DNN, S-NSSAI. |
| | Default PDU Session Type | Indicates the default PDU Session Type for the DNN, S-NSSAI. |
| | Allowed SSC modes | Indicates the allowed SSC modes for the DNN, S-NSSAI. |
| | Default SSC mode | Indicate the default SSC mode for the DNN, S-NSSAI. |
| | Interworking with EPS indication | Indicates whether interworking with EPS is supported for this DNN and S-NSSAI. |
| | 5GS Subscribed QoS profile | The QoS Flow level QoS parameter values (5QI and ARP) for the DNN, S-NSSAI. |
| | Charging Characteristics | This information may e.g. contain information on how to contact the Charging Function. This information, when provided shall override any corresponding predefined information at the SMF |
| | Subscribed-Session-AMBR | The maximum aggregated uplink and downlink MBRs to be shared across all Non-GBR QoS Flows in each PDU Session, which are established for the DNN, S-NSSAI. |
| | Static IP address/prefix | Indicate the static IP address/prefix for the DNN, S-NSSAI. |
| | User Plane Security Policy | Indicates the security policy for integrity protection and encryption for the user plane. |
| Identifier translation | SUPI | Corresponding SUPI for input GPSI |
| | (Optional) MSISDN | Corresponding GPSI (MSISDN) for input GPSI (External Identifier). This is optionally provided for legacy SMS infrastructure not supporting MSISDN-less SMS. The presence of an MSISDN should be interpreted as an indication to the NEF that MSISDN shall be used to identify the UE when sending the SMS to the SMS-SC via T4. |
| Intersystem continuity Context | (DNN, PGW FQDN) list | For each DNN, indicates the PGW-C + SMF which support interworking with EPC. |

NOTE 1:
The Subscribed DNN list can include a wildcard DNN.
NOTE 2:
The default DNN shall not be a wildcard DNN.
NOTE 3:
The Steering of Roaming information is protected using the mechanisms The AF 328 provides application influence on traffic routing, provide access to the NCE, and interact with the policy framework for policy control. The NCE may be a mechanism that allows the 5GC 320 and AF 328 to provide information to each other via NEF 323, which may be used for edge computing implementations. In such implementations, the network operator and third party services may be hosted close to the UE 301 access point of attachment to achieve an efficient service delivery through the reduced end-to-end latency and load on the transport network. For edge computing implementations, the 5GC may select a UPF 302 close to the UE 301 and execute traffic steering from the UPF 302 to DN 303 via the N6 interface. This may be based on the UE subscription data, UE location, and information provided by the AF 328. In this way, the AF 328 may influence UPF (re)selection and traffic routing. Based on operator deployment, when AF 328 is considered to be a trusted entity, the network operator may permit AF 328 to interact directly with relevant NFs. Additionally, the AF 328 may exhibit an Naf service-based interface.

The Data Network (DN) 303 represents various operator services, Internet access, and/or 3rd party services. The DN 303 may represent one or more data networks, and may correspond to the application server 130 discussed previously with regard to FIG. 1. An LADN is a DN 303 that is accessible by the UE 301 only in specific locations, which provides connectivity to a specific DNN, and whose availability is provided to the UE 301. In one example, the LADN may be an enterprise network where the UE 301 may only access enterprise network resources when the UE 301 is at the enterprise premises, within a predetermined distance of the enterprise premises, within a specified geofence, and/or the like. The DNN is a reference to a particular DN 303 (or LADN), which may be used to select an SMF 324 or a UPF 302 for a PDU session; select N6 interface(s) for a PDU session; and/or determine policies to apply to a PDU session. The UE 301 may use a DN Access Identifier (DNAI) to obtain user plane access to one or more DN(s) 303 (or LADN(s)) where one or more applications and/or devices are deployed.

In 5GS 300, the DNN is equivalent to an APN in EPS 200, and the requirements for APNs are applicable for DNN in a 5GS. In some cases, the APN (and DNN) is used in various Domain Name System (DNS) procedures. In some embodiments, the APN (or DNN) may be a wildcard APN (or wildcard DNN). The wildcard DNN is a value that can be used for the DNN field of subscribed DNN list of SM Subscription data. The wildcard DNN can be used with an S-NSSAI for operator to allow the subscriber to access any Data Network supported within the Network Slice associated with the S-NSSAI. The APN comprises an APN Network Identifier and (optionally) an APN Operator Identifier. The APN network Identifier defines to which external network the GGSN/PGW is connected and optionally a requested service by the UE 101, 301. The APN Operator Identifier defines in which PLMN GPRS/EPS backbone the GGSN/PGW is located. The APN field in the HLR/HSS 224 (or UDM 327) may contain a wild card APN/DNN if the HPLMN operator allows the subscriber to access any network of a given PDP Type. If an SGSN 225 (or the AMF 321) has received such a wild card APN/DNN, it may either choose the APN/DNN Network Identifier received from the UE 301 or a default APN/DNN Network Identifier for addressing the GGSN when activating a PDP context. The APN/DNN may be an Emergency APN/DNN (Em-APN or eM-DNN), which is an APN/DNN used to derive a PDN GW selected for IMS Emergency call support.

The NSSF 329 may select a set of network slice instances serving the UE 301. The NSSF 329 may also determine allowed NSSAI and the mapping to the subscribed S-NSSAIs, if needed. The NSSF 329 may also determine the AMF set to be used to serve the UE 301, or a list of candidate AMF(s) 321 based on a suitable configuration and possibly by querying the NRF 325. The selection of a set of network slice instances for the UE 301 may be triggered by the AMF 321 with which the UE 301 is registered by interacting with the NSSF 329, which may lead to a change of AMF 321. The NSSF 329 may interact with the AMF 321 via an N22 reference point between AMF 321 and NSSF 329; and may communicate with another NSSF 329 in a visited network via an N31 reference point (not shown by FIG. 3). Additionally, the NSSF 329 may exhibit an Nnssf service-based interface.

As discussed previously, the CN 320 may include an SMSF, which may be responsible for SMS subscription checking and verification, and relaying SM messages to/from the UE 301 to/from other entities, such as an SMS-GMSC/IWMSC/SMS-router. The SMS may also interact with AMF 321 and UDM 327 for a notification procedure that the UE 301 is available for SMS transfer (e.g., set a UE not reachable flag, and notifying UDM 327 when UE 301 is available for SMS).

The CN 120 may also include other elements that are not shown by FIG. 3, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 3). Individual NFs may share a UDSF for storing their respective unstructured data or individual NFs may each have their own UDSF located at or near the individual NFs. Additionally, the UDSF may exhibit an Nudsf service-based interface (not shown by FIG. 3). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 3 for clarity. In one example, the CN 320 may include an Nx interface, which is an inter-CN interface between the MME (e.g., MME 221) and the AMF 321 in order to enable interworking between CN 320 and CN 220. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 4:
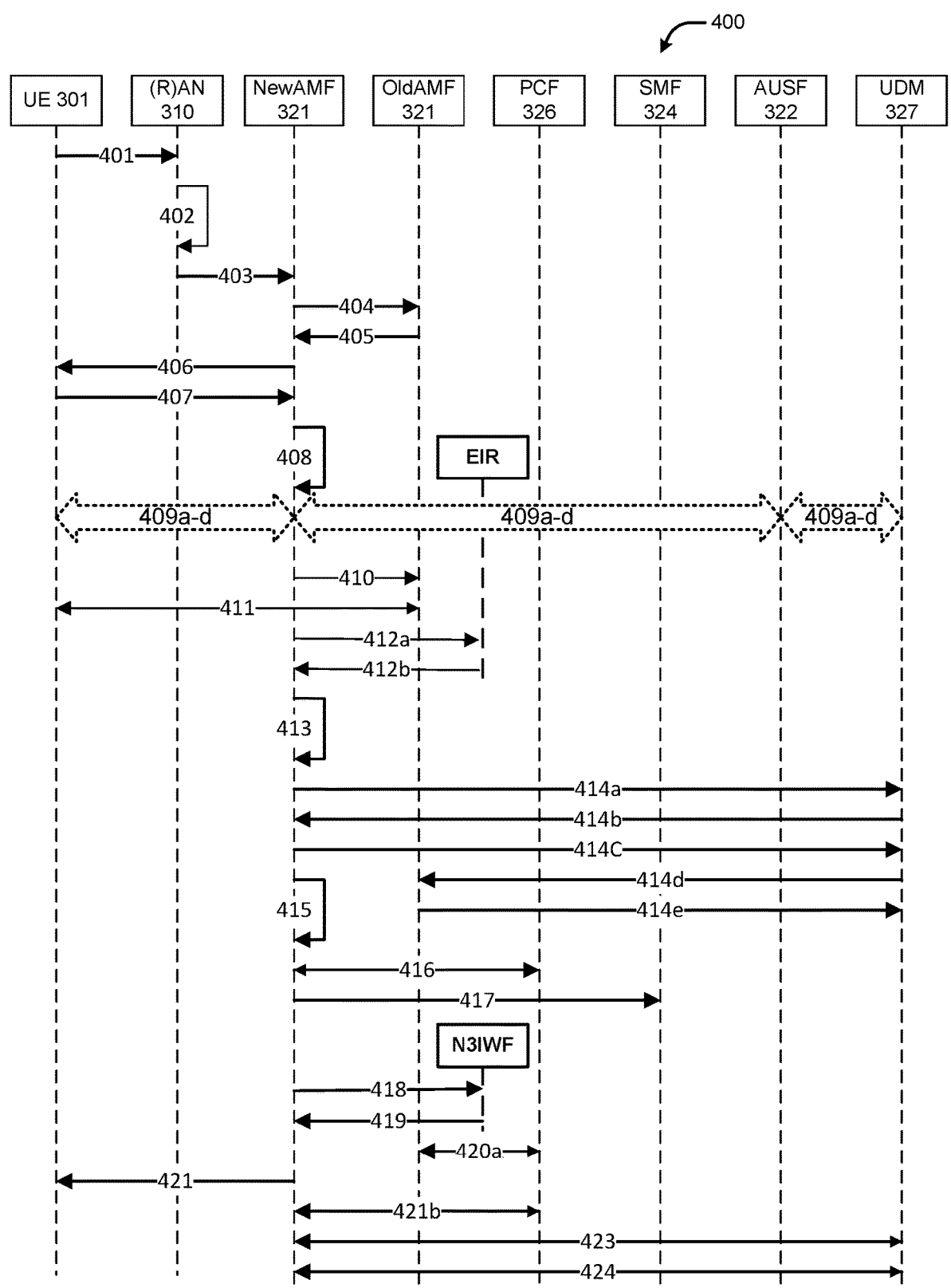
FIG. 4 illustrates an example registration procedure according to various embodiments

FIG. 4 illustrates an example general registration procedure ZM00 according to various embodiments. In FIG. 4, like numbered items are the same as discussed previously with respect to FIGS. 1-3. As mentioned previously, the UE 301 needs to register with the network to get authorized to receive services, enable mobility tracking, and enable reachability. The general registration procedure 400 applies to multiple types of registration types including initial registration, mobility registration, periodic registration, and emergency registration. The periodic registration may not need to include all parameters that are used in other registration procedures. The general registration procedure 400 is also used by UEs 301 in a limited service state registering for emergency services only (referred to as Emergency Registration).

Procedure 400 begins at operation 401 where the UE 301 sends, to the (R)AN 310, an Access Network (AN) message including AN parameters and a Registration Request. The Registration Request includes or indicates a Registration type; SUCI, 5G-GUTI, or PEI; last visited TAI (if available); security parameters; requested NSSAI; a mapping of requested NSSAI; default configured NSSAI indication; UE Radio Capability Update; UE MM core network capability; PDU session status; "List Of PDU Sessions To Be Activated"; follow-on request, MICO mode preference, requested DRX parameters, LADN DNN(s) or Indicator of Requesting LADN Information; and a UE policy container. The UE policy container includes a list of PSIs, an indication of UE support for ANDSP, and an operating system identifier. In the case of NG-RAN 310, the AN parameters include, for example, 5G-S-TMSI or GUAMI, the Selected PLMN ID, and Requested NSSAI. The AN parameters also include an establishment cause. The establishment cause provides the reason for requesting the establishment of an RRC connection.

The registration type indicates whether the UE 301 wants to perform an initial registration (e.g., the UE 301 is in the RM-DEREGISTERED state), a Mobility Registration Update (e.g., the UE 301 is in the RM-REGISTERED state and initiates a Registration procedure due to mobility, due to the UE 301 needing to update its capabilities or protocol parameters, or to request a change of the set of network slices it is allowed to use), a Periodic Registration Update (e.g., the UE 301 is in the RM-REGISTERED state and initiates a Registration procedure due to the Periodic Registration Update timer expiry), or an Emergency Registration (e.g., the UE 301 is in a limited service state).

When the UE 301 is performing an Initial Registration the UE 301 indicates its UE identity in the Registration Request message. The UE 301 lists, in decreasing order of preference, if the UE 301 was previously registered in EPS and has a valid EPS GUTI, the UE 301 provides 5G-GUTI; a native 5G-GUTI assigned by the which the UE 301 is attempting to register, if available; a native 5G-GUTI assigned by an equivalent PLMN to the PLMN to which the UE 301 is attempting to register, if available; a native 5G-GUTI assigned by any other PLMN, if available. This can also be a 5G-GUTIs assigned via another access type. Otherwise, the UE 301 includes its SUCI in the Registration Request.

If the UE 301 has a NAS security context, the UE 301 includes, in the security parameters, an indication that the NAS message is integrity protected and partially ciphered to indicate to the AMF 321 how to process the enclosed parameters. If the UE 301 has no NAS security context, the Registration Request message is to only contain cleartext IEs.

When the UE 301 is performing an Initial Registration (e.g., the UE 301 is in the RM-DEREGISTERED state) with a native 5G-GUTI then the UE 301 indicates the related GUAMI information in the AN parameters. When the UE 301 is performing an Initial Registration with its SUCI, the UE 301 does not indicate any GUAMI information in the AN parameters.

For an Emergency Registration, the SUCI is to be included if the UE 301 does not have a valid 5G-GUTI available, and the PEI is to be included when the UE 301 has no SUPI and no valid 5G-GUTI. In other cases, the 5G-GUTI is included and it indicates the last serving AMF 321. The UE 301 may provide the UE's 301 usage setting based on its configuration. In case of Initial Registration or Mobility Registration Update, the UE 301 includes the Mapping Of Requested NSSAI (if available), which is the mapping of each S-NSSAI of the Requested NSSAI to the HPLMN S-NSSAIs, to ensure that the network is able to verify whether the S-NSSAI(s) in the Requested NSSAI are permitted based on the Subscribed S-NSSAIs. The UE includes the Default Configured NSSAI Indication if the UE 301 is using a Default Configured NSSAI.

In the case of Mobility Registration Update, the UE 301 includes, in the List Of PDU Sessions To Be Activated, the PDU Sessions for which there is/are pending uplink data. When the UE 301 includes the List Of PDU Sessions To Be Activated, the UE 301 indicates PDU Sessions only associated with the access to which the Registration Request is related. The UE 301 includes always-on PDU Sessions, which are accepted by the network in the "List Of PDU Sessions To Be Activated" even if there are no pending uplink data for those PDU Sessions.

A PDU Session corresponding to an LADN is not included in the List Of PDU Sessions To Be Activated when the UE 301 is outside the area of availability of the LADN. According to various embodiments, the UE 301 may provide either the LADN DNN(s) or an Indication Of Requesting LADN Information as discussed previously. For example, the UE 301 may provide either the LADN DNN(s) to retrieve the LADN Information for the indicated LADN DNN(s) or an indication of Requesting LADN Information to retrieve the LADN Information for all LADN(s) available in the current Registration Area. If the UE 301 provides the LADN DNN(s) in the Registration Request message, the list of LADN is LADN DNN(s) the UE 301 requested if the UE subscribed DNN(s) include(s) the requested LADN DNN or if a wildcard DNN is included in the UE's 301 subscription data. If the UE 301 provides an indication of requesting LADN Information in the Registration Request message, the list of LADN is all the LADN DNN(s) configured in the AMF 321 if the wildcard DNN is subscribed, or the LADN DNN(s) which is in the subscribed DNN list and no wildcard DNN is subscribed. If neither the LADN DNN nor the indication of requesting LADN Information is provided in the Registration Request message, the list of LADN is the LADN DNN(s) in subscribed DNN list except for wildcard DNN.

The UE MM Core Network Capability is provided by the UE 301 and handled by AMF 321. The UE MM Core Network Capability is split into the S1 UE network capability (mostly for E-UTRAN access related core network parameters) and the Core Network Capability (mostly to include other UE capabilities related to 5GCN or interworking with EPS) and includes non-radio-related capabilities (e.g., the NAS security algorithms etc.) The S1 UE network capability is transferred between all CN nodes at AMF 321 to AMF 321, AMF 321 to MME 221, MME 221 to MME 221, and MME 221 to AMF 321 changes. The 5GMM capability is transferred only at AMF 321 to AMF 321 changes. The UE 301 includes, in the UE MM Core Network Capability, an indication indicating that it supports Request Type flag "handover" for PDN connectivity request during the attach procedure. If available, the last visited TAI are included in order to help the AMF 321 produce Registration Area(s) for the UE 301.

The Security parameters are used for Authentication and integrity protection. Requested NSSAI indicates the Network Slice Selection Assistance Information. The PDU Session status indicates the previously established PDU Sessions in the UE 301. When the UE 301 is connected to two AMEs 321 belonging to different PLMN via 3GPP access and N3GPP access, then the PDU Session status indicates the established PDU Session of the current PLMN in the UE 301.

The Follow-on request is included when the UE 301 has pending uplink signaling and the UE 301 does not include the List Of PDU Sessions To Be Activated, or the Registration type indicates that the UE 301 wants to perform an Emergency Registration. In Initial Registration and Mobility Registration Update, the UE 301 provides UE Requested DRX parameters to negotiate idle mode DRX cycle parameters with the AMF 321. The Idle mode DRX cycle applies in CM-IDLE state and in CM-CONNECTED with RRC Inactive state. The AMF 321 determines Accepted DRX parameters based on the received UE specific DRX parameters and the AMF 321 should accept the UE requested values, but subject to operator policy, the AMF 321 may change the UE requested values. In the CM-CONNECTED state with RRC Inactive state, the UE 301 applies either the DRX cycle negotiated with AMF 321, the DRX cycle broadcast by RAN 310, or the UE specific DRX cycle configured by the RAN 310.

The UE provides the UE Radio Capability Update indication in the registration request message. The UE Radio Capability information contains information on RATs that the UE 301 supports (e.g., power class, frequency bands, etc.). Consequently, this information can be sufficiently large that it is undesirable to send it across the radio interface at every transition of UE 301 CM state in the AMF 321 from CM-IDLE to CM-CONNECTED. To avoid this radio overhead, the AMF 321 stores the UE Capability information during the CM-IDLE state for the UE 301 and the RM-REGISTERED state for the UE 301, and the AMF 321, if available, sends its most up to date UE Radio Capability information to the RAN 310 in an N2 REQUEST message. The RAN 310 stores the UE Radio Capability information, received in the N2 message or obtained from the UE 301, for the duration of the UE 301 staying in RRC connected or RRC inactive states. The AMF 321 deletes the UE radio capability when the UE RM state in the AMF 321 transitions to RM-DEREGISTERED state. If the UE's 301 NG-RAN UE Radio Capability information changes while in the CM-IDLE state, the UE 321 performs the Registration procedure with the Registration type set to Mobility Registration Update indicating "UE Radio Capability Update". When the AMF 321 receives Mobility Registration Update Request with "UE Radio Capability Update", the AMF 321 deletes any UE Radio Capability information that it has stored for the UE 301. If the trigger to change the UE's 301 NG-RAN UE Radio Capability information happens when the UE 301 is in the CM-CONNECTED state, the UE 301 first enters the CM-IDLE state and then performs the Registration procedure with the Registration type set to Mobility Registration Update indicating "UE Radio Capability Update". The UE access selection and PDU session selection identifies the list of UE access selection and PDU session selection policy information stored in the UE 301. They are used by the PCF to determine if the UE has to be updated with new PSIs or if some of the stored ones are no longer applicable and have to be removed.

At operation 402, if a 5G-S-TMSI or GUAMI is not included, or the 5G-S-TMSI or GUAMI does not indicate a valid AMF 321, the (R)AN 310, based on (R)AT and Requested NSSAI, if available, selects an AMF 321 (e.g., the new AMF 321 depicted by FIG. 4). The (R)AN 310 selects an AMF 321 (or an AMF 321 from an AMF Set) using AMF selection functionality that is applicable to both 3GPP access and N3GPP access. The AMF selection functionality can be supported by the 5G-AN 310 (e.g., RAN, N3IWF) and is used to select an AMF 321 for a given UE 301. An AMF 321 supports the AMF selection functionality to select an AMF 321 for relocation or because the initially selected AMF 321 was not an appropriate AMF 321 to serve the UE 301 (e.g., due to change of Allowed NSSAI). Other CP NF(s) (e.g., SMF) supports the AMF 321 selection functionality to select an AMF 321 from the AMF set when the original AMF 321 serving a UE 301 is unavailable. The AMF selection functionality in the 5G-AN 310 may consider the following factors for selecting the AMF Set: AMF Region ID and AMF Set ID derived from GUAMI, requested NSSAI, and local operator policies, availability of candidate AMFs 321, and/or load balancing across candidate AMFs (e.g., considering weight factors of candidate AMFs in the AMF Set). The 5G-AN 310 selects an AMF Set and/or an AMF 321 from the AMF Set under the following circumstances: when the UE 301 provides no 5G-S-TMSI nor the GUAMI to the 5G-AN 310; when the UE 301 provides the 5G-S-TMSI or GUAMI but the routing information (e.g., AMF 321 identified based on AMF Set ID, AMF pointer) present in the 5G-S-TMSI or GUAMI is not sufficient and/or not usable (e.g., the UE 301 provides GUAMI with an AMF region ID from a different region); the AMF 321 has instructed the (R)AN 310 that the AMF 321 (e.g., identified by the GUAMI(s)) is unavailable and no target AMF 321 is identified and/or the (R)AN 310 has detected that the AMF 321 has failed. If the UE 301 is in the CM-CONNECTED state, the (R)AN 310 forwards the Registration Request message to the AMF 321 based on the N2 connection of the UE 301. If the (R)AN 310 cannot select an appropriate AMF 321, the (R)AN 310 forwards the Registration Request to an AMF 321 which has been configured, in (R)AN 310, to perform AMF selection.

At operation 403, the (R)AN 310 sends, to the new AMF 321, an N2 message including N2 parameters, Registration Request (as described in operation 401) and the UE Policy Container. When the (R)AN 310 is an NG-RAN 310, the N2 parameters include the selected PLMN ID, Location Information and Cell Identity related to the cell in which the UE 301 is camping, UE Context Request which indicates that a UE context including security information needs to be setup at the NG-RAN. When the (R)AN 310 is an NG-RAN 310, the N2 parameters also include the establishment cause. When the establishment cause is associated with priority services (e.g., MPS, MCS, etc.), the AMF 321 includes a Message Priority header to indicate priority information. Other NFs relay the priority information by including the Message Priority header in service-based interfaces. The Mapping Of Requested NSSAI is provided only if available. If the Registration type indicated by the UE 301 is a Periodic Registration Update, then operations 404 to 419 discussed infra may be omitted.

At operation 404, the new (target) AMF 321 sends, to the old (source) AMF 321, an Namf_Communication_UEContextTransfer including a complete Registration Request. In other embodiments, the new AMF 321 sends, to a UDSF, an Nudsf_Unstructured Data Management_Query( ) Operation 404 is conditional.

With UDSF Deployment, if the UE's 301 5G-GUTI was included in the Registration Request and the serving AMF 321 has changed since last Registration procedure, the new AMF 321 and the old AMF 321 are in the same AMF Set and the UDSF is deployed, the new AMF 321 retrieves the stored UE's 301 SUPI and UE context directly from the UDSF using Nudsf_UnstructuredDataManagement_Query service operation or they can share stored UE context via implementation specific means if the UDSF is not deployed. This includes also event subscription information by each NF consumer for the given UE 301. In this case, the new AMF uses integrity protected complete Registration request NAS message to perform and verify integrity protection.

Without UDSF Deployment, if the UE's 301 5G-GUTI was included in the Registration Request and the serving AMF 321 has changed since last Registration procedure, the new AMF 321 may invoke the Namf_Communication_UE-ContextTransfer service operation on the old AMF 321 including the complete Registration Request NAS message, which may be integrity protected, as well as the Access Type, to request the UE's 301 SUPI and UE Context. In this case, the old AMF 321 uses either 5G-GUTI and the integrity protected complete Registration request NAS message, or the SUPI and an indication that the UE 301 is validated from the new AMF 321, to verify integrity protection if the context transfer service operation invocation corresponds to the UE 301 requested. The old AMF 321 also transfers the event subscriptions information by each NF consumer, for the UE 301, to the new AMF 321.

If the old AMF 321 has PDU Sessions for another access type (e.g., different from the Access Type indicated in this operation) and if the old AMF 321 determines that there is no possibility for relocating the N2 interface to the new AMF 321, the old AMF 321 returns the SUPI of the UE 301 and indicates that the Registration Request has been validated for integrity protection, but does not include the rest of the UE context. The new AMF 321 sets the indication that the UE 301 is validated according to operation 409a, in case the new AMF 321 has performed successful UE authentication after previous integrity check failure in the old AMF 321. The NF consumers do not need to subscribe for the events once again with the new AMF 321 after the UE 301 is successfully registered with the new AMF 321. If the new AMF 321 has already received UE contexts from the old AMF 321 during handover procedure, then operations 404, 405, and 410 may be skipped.

For an Emergency Registration, if the UE 301 identifies itself with a 5G-GUTI that is not known to the AMF 321, operations 404 and 405 may be skipped and the AMF 321 immediately requests the SUPI from the UE 301. If the UE 301 identifies itself with a PEI, the SUPI request is skipped. Allowing Emergency Registration without a user identity is dependent on local regulations.

At operation 405, the old AMF 321 sends, to the new AMF 321, a Response to Namf_Communication_UEContextTransfer include the SUPI, and the UE Context in the AMF 32. Alternatively, the UDSF sends, to the new AMF 321, an Nudsf_Unstructured Data Management_Query( ) The old AMF 321 may start an implementation specific (guard) timer for the UE context. Operation 405 is conditional.

If the UDSF was queried in operation 404, the UDSF responds to the new AMF 321 for the Nudsf_Unstructured Data Management_Query invocation with the related contexts including established PDU Sessions, the old AMF 321 includes SMF information DNN, S-NSSAI(s) and PDU Session ID, active NGAP UE-TNLA bindings to N3IWF, the old AMF 321 includes information about the NGAP UE-TNLA bindings. If the Old AMF 321 was queried in operation 404, the old AMF 321 responds to the new AMF 321 for the Namf_Communication_UEContextTransfer invocation by including the UE's 301 301 SUPI and UE Context.

If the old AMF 321 holds information about established PDU Session(s), the old AMF 321 includes SMF information, DNN(s), S-NSSAI(s) and PDU Session ID(s). If the old AMF 321 holds information about active NGAP UE-TNLA bindings to N3IWF, the old AMF 321 includes information about the NGAP UE-TNLA bindings. If the old AMF 321 fails the integrity check of the Registration Request NAS message, the old AMF 321 indicates the integrity check failure. If the old AMF 321 holds information about AM Policy Association, the old AMF 321 includes the information about the AM Policy Association including the policy control request trigger and PCF ID. In the roaming case, V-PCF ID and H-PCF ID are included. When new AMF 321 uses the UDSF for context retrieval, interactions between the old AMF 321, the new AMF 321, and the UDSF due to UE 301 signaling on the old AMF 321 at the same time is an implementation issue.

At operation 406, the new AMF 321 sends, to the UE 301, the Identity Request( ) If the SUCI is not provided by the UE 301 nor retrieved from the old AMF 321, the Identity Request procedure is initiated by the AMF 321 sending an Identity Request message to the UE 301 requesting the SUCI. Operation 406 is conditional.

At operation 407, the UE 301 sends, to the new AMF 321, an Identity Response( ) The UE 301 responds with an Identity Response message including the SUCI. The UE 301 derives the SUCI by using the provisioned public key of the HPLMN. Operation 407 is conditional.

At operation 408, the AMF 321 may decide to initiate UE authentication by invoking an AUSF 322. In that case, the AMF 321 selects an AUSF 322 based on SUPI or SUCI. The AMF 321 performs AUSF selection to allocate an AUSF 322 that performs authentication between the UE 301 and 5G CN 320 in the HPLMN. The AMF 321 utilizes the NRF 325 to discover the AUSF 322 instance(s) unless AUSF information is available by other means (e.g., locally configured on AMF). The AUSF selection function in the AMF 321 selects an AUSF 322 instance based on the available AUSF 322 instances (e.g., obtained from the NRF 325 or locally configured in the AMF 321) The AUSF selection function in AUSF NF consumers (e.g., AMF 321) consider one of the following factors when available to the AUSF NF consumer: home network identifier (e.g., MNC and MCC) of SUCI/SUPI (by an NF consumer in a VPLMN) and Routing Indicator; AUSF Group ID to which the UE's 301 SUPI belongs; and SUPI (e.g., the AMF 321 selects an AUSF 322 instance based on the SUPI range the UE's 301 SUPI belongs to or based on the results of a discovery procedure with NRF 325 using the UE's 301 SUPI as input for AUSF 322 discovery). The UE 301 provides the Routing Indicator to the AMF 321 as part of the SUCI during initial registration. The AMF 321 can provide the UE's 301 Routing Indicator to other AMFs 321. When the UE's 301 Routing Indicator is set to its default value, the AUSF NF consumer can select any AUSF 322 instance within the home network for the UE 301. The AMF 321 can infer the AUSF Group ID the UE's 301 SUPI belongs to, based on the results of AUSF discovery procedures with NRF 325. The AMF 321 provides the AUSF Group ID the SUPI belongs to other AMFs 321. If the AMF 321 is configured to support Emergency Registration for unauthenticated SUPIs and the UE 301 indicated Registration type Emergency Registration, the AMF 321 skips the authentication or the AMF 321 accepts that the authentication may fail and continues the Registration procedure.

At operation 409a, if authentication is required, the AMF 321 requests it from the AUSF 322; if Tracing Requirements about the UE 301 are available at the AMF 321, the AMF 321 provides the Tracing Requirements in its request to the AUSF 322. Upon request from the AMF 321, the AUSF 322 executes authentication of the UE 301. The AUSF 322 selects a UDM 327 and gets the authentication data from the UDM 327. Once the UE 301 has been authenticated, the AUSF 322 provides relevant security related information to the AMF 321. In case the new AMF 321 provided a SUCI to the AUSF 322, the AUSF 322 returns the SUPI to the new AMF 321 only after the authentication is successful. After successful authentication in the new AMF 321, which is triggered by the integrity check failure in old AMF 321 at operation 405, the new AMF 321 invokes operation 404 above again and indicates that the UE 301 is validated (e.g., through a reason parameter).

At operation 409b, if NAS security context does not exist, the NAS security initiation is performed. If the UE 301 had no NAS security context in operation 401, the UE 301 includes the full Registration Request message. The AMF 321 decides if the Registration Request needs to be rerouted, where the initial AMF 321 refers to the AMF 321. In some embodiments, during the authentication and authorization procedure, the AMF 321 receives an indication of whether the LADN(s) is/are authorized to be used by the subscriber UE 301 based on information in the subscription profile from UDM 327. At operation 409c, the AMF 321 initiates NGAP procedure to provide the 5G-AN 310 with the security context if the 5G-AN 310 had requested for UE Context. In addition, if Tracing Requirements about the UE 301 are available at the AMF 321, the AMF 321 provides the 5G-AN 310 with Tracing Requirements in the NGAP procedure. At operation 409d, the 5G-AN 310 stores the security context and acknowledges to the AMF 321. The 5G-AN 310 uses the security context to protect the messages exchanged with the UE 301.

At operation 410, the new AMF 321 sends, to the old AMF 321, an Namf_Communication_RegistrationCompleteNotify( ) If the AMF 321 has changed, the new AMF 321 notifies the old AMF 321 that the registration of the UE 301 in the new AMF 321 is completed by invoking the Namf_Communication_RegistrationCompleteNotify service operation. If the authentication/security procedure fails, then the Registration is rejected, and the new AMF 321 invokes the Namf_Communication_RegistrationCompleteNotify service operation with a reject indication reason code towards the old AMF 321. The old AMF 321 continues as if the UE context transfer service operation was never received. If one or more of the S-NSSAIs used in the old Registration Area cannot be served in the target Registration Area, the new AMF 321 determines which PDU Session cannot be supported in the new Registration Area. The new AMF 321 invokes the Namf_Communication_RegistrationCompleteNotify service operation including the rejected PDU Session ID and a reject cause (e.g., the S-NSSAI becomes no longer available) towards the old AMF 321. Then the new AMF 321 modifies the PDU Session Status correspondingly. The old AMF 321 informs the corresponding SMF(s) 324 to locally release the UE's 301 SM context by invoking the Nsmf_PDUSession_ReleaseSMContext service operation. If the new AMF 321 received in the UE context transfer in operation 402 the information about the AM Policy Association including the PCF ID(s) and decides, based on local policies, not to use the PCF(s) 326 identified by the PCF ID(s) for the AM Policy Association, then it will inform the old AMF 321 that the AM Policy Association in the UE context is not used any longer and then the PCF selection is performed in operation 415. Operation 410 is conditional.

At operation 411, the new AMF 321 sends, to the UE 301, an Identity Request/Response (PEI). If the PEI was not provided by the UE 301 nor retrieved from the old AMF 321, the Identity Request procedure is initiated by the new AMF 321 sending an Identity Request message to the UE 301 to retrieve the PEI. The PEI is transferred encrypted unless the UE 301 performs Emergency Registration and cannot be authenticated. For an Emergency Registration, the UE 301 may have included the PEI in the Registration Request. If so, the PEI retrieval is skipped. Operation 411 is conditional.

At operation 412, the new AMF 321 initiates ME identity check by invoking the N5g-eir_EquipmentIdentityCheck_Get service operation and/or a PEI check. For an Emergency Registration, if the PEI is blocked, operator policies are used to determine whether the Emergency Registration procedure continues or is stopped.

At operation 413, the new AMF 321 selects a UDM 327 based on the SUPI if operation 414 is to be performed. NF consumers (e.g., the new AMF 321) utilizes the NRF 325 to discover the UDM 327 instance(s) unless UDM information is available by other means (e.g., locally configured on the NF consumers). The UDM selection function in the NF consumer selects a UDM 327 instance based on the available UDM 327 instances (obtained from the NRF 325 or locally configured). The UDM selection function in NF consumers is applicable to both 3GPP access and N3GPP access. The UDM selection considers at least one of the following factors when available to the UDM NF consumer: home network identifier (e.g. MNC and MCC) of SUCI/SUPI and UE's Routing Indicator; UDM Group ID of the UE's SUPI; SUPI (e.g., the UDM NF consumer selects a UDM instance based on the SUPI range the UE's 301 SUPI belongs to or based on the results of a discovery procedure with NRF using the UE's SUPI as input for UDM discovery); and GPSI or External Group ID (e.g., UDM NF consumers which manage network signalling not based on SUPI/SUCI (e.g., the NEF 323) select a UDM 327 instance based on the GPSI or External Group ID range the UE's 301 GPSI or External Group ID belongs to or based on the results of a discovery procedure with NRF using the UE's GPSI or External Group ID as input for UDM discovery). The UE 301 provides the Routing Indicator to the AMF 321 as part of the SUCI during initial registration, and the AMF 321 provides the UE's Routing Indicator to other UDM NF consumers. When the UE's 301 Routing Indicator is set to its default value, the UDM NF consumers can select any UDM 327 instance within the home network of the SUCI/SUPI. The AMF 321 can infer the UDM Group ID to which the UE's 301 SUPI belongs based on the results of UDM 327 discovery procedures with NRF 325. The AMF 321 provides the UDM Group ID to which the SUPI belongs to other UDM NF consumers. Then the UDM 327 may select a UDR instance.

At operations 414a-c, if the AMF 321 has changed since the last Registration procedure, or if the UE 301 provides a SUPI which doesn't refer to a valid context in the AMF 321, or if the UE 301 registers to the same AMF 321 it has already registered to a non-3GPP access (e.g., the UE 301 is registered over a non-3GPP access and initiates this Registration procedure to add a 3GPP access), the new AMF 321 registers with the UDM 327 using Nudm_UECM_Registration for the access to be registered (and subscribes to be notified when the UDM 327 deregisters this AMF 321. The AMF 321 provides the "Homogenous Support of IMS Voice over PS Sessions" indication to the UDM 327. The "Homogenous Support of IMS Voice over PS Sessions" indication is not included unless the AMF 321 has completed its evaluation of the support of "IMS Voice over PS Session". At this operation, the AMF 321 may not have all the information needed to determine the setting of the IMS Voice over PS Session Supported indication for the UE 301, and therefore, the AMF 321 can send the "Homogenous Support of IMS Voice over PS Sessions" later on in this procedure.

If the AMF 321 does not have subscription data for the UE, the AMF 321 retrieves the Access and Mobility Subscription data, SMF Selection Subscription data and UE context in SMF data using Nudm_SDM_Get. This requires that UDM 327 may retrieve this information from UDR by Nudr_DM_Query. After a successful response is received, the AMF 321 subscribes to be notified using Nudm_SDM_Subscribe when the data requested is modified, UDM 327 may subscribe to UDR by Nudr_DM_Subscribe. The GPSI is provided to the AMF 321 in the Access and Mobility Subscription data from the UDM 327 if the GPSI is available in the UE 301 subscription data. The UDM 327 may provide indication that the subscription data for network slicing is updated for the UE 301. If the UE 301 is subscribed to MPS in the serving PLMN, "MPS priority" is included in the Access and Mobility Subscription data provided to the AMF 321. If the UE 301 is subscribed to MCX in the serving PLMN, "MCX priority" is included in the Access and Mobility Subscription data provided to the AMF 321.

The new AMF 321 provides the Access Type it serves for the UE 301 to the UDM 327 and the Access Type is set to "3GPP access". The UDM 327 stores the associated Access Type together with the serving AMF 321 and does not remove the AMF 321 identity associated to the other Access Type if any. The UDM 327 may store in UDR information provided at the AMF 321 registration by Nudr_DM_Update. If the UE 301 was registered in the old AMF 321 for an access, and the old and the new AMFs 321 are in the same PLMN, the new AMF 321 sends a separate/independent Nudm_UECM_Registration to update UDM 327 with Access Type set to access used in the old AMF 321, after the old AMF 321 relocation is successfully completed. The new AMF 321 creates an UE context for the UE 301 after getting the Access and Mobility Subscription data from the UDM 327. The Access and Mobility Subscription data includes whether the UE 301 is allowed to include NSSAI in the 3GPP access RRC Connection Establishment in clear text.

For an Emergency Registration in which the UE 301 was not successfully authenticated, the AMF 321 does not register with the UDM 327. For an Emergency Registration, the AMF 321 does not check for access restrictions, regional restrictions, or subscription restrictions. For an Emergency Registration, the AMF 321 ignores any unsuccessful registration response from UDM 327 and continues with the Registration procedure.

At operation 414d, when the UDM 327 stores the associated Access Type (e.g., 3GPP) together with the serving AMF 321 as indicated in operation 414a, it will cause the UDM 327 to initiate a Nudm_UECM_DeregistrationNotification to the old AMF 321 corresponding to the same access (e.g., 3GPP or N3GPP), if one exists. If the timer started in operation 405 is not running, the old AMF 321 may remove the UE context. Otherwise, the AMF 321 may remove UE context when the timer expires. If the serving NF removal reason indicated by the UDM 327 is Initial Registration, then the old AMF 321 invokes the Nsmf_PDUSession_ReleaseSMContext (SUPI, PDU Session ID) service operation towards all the associated SMF(s) 324 of the UE 301 to notify that the UE 301 is deregistered from the old AMF 321. The SMF(s) 324 release the PDU Session upon getting this notification.

If the old AMF 321 has established a Policy Association with the PCF, and the old AMF 321 did not transfer the PCF ID(s) to the new AMF 321 (e.g., new AMF 321 is in different PLMN), the old AMF 321 performs an AMF-initiated Policy Association Termination procedure to delete the association with the PCF. In addition, if the old AMF 321 transferred the PCF ID(s) in the UE context but the new AMF 321 informed in operation 410 that the AM Policy Association information in the UE context will not be used then the old AMF 321 performs an AMF-initiated Policy Association Termination procedure, as defined in clause 4.16.3.2, to delete the association with the PCF. If the old AMF 321 has an N2 connection for that UE 301 (e.g., because the UE 301 was in RRC Inactive state but has now moved to E-UTRAN or moved to an area not served by the old AMF), the old AMF 321 performs AN Release with a cause value that indicates that the UE 301 has already locally released the NG-RAN's RRC Connection. At operation 414e, the old AMF 321 unsubscribes with the UDM 327 for subscription data using Nudm_SDM_unsubscribe.

At operation 415, the AMF 321 determines whether to initiate PCF communication. If the new AMF 321 decides to contact the (V-)PCF identified by PCF ID included in the UE context from the old AMF 321 in operation 405, the new AMF 321 contacts the (V-)PCF identified by the (V-)PCF ID. If the new AMF 321 decides to perform PCF discovery and selection, the new AMF 321 selects a (V)-PCF and may select an H-PCF (for roaming scenario) and according to the V-NRF to H-NRF interaction(s).

At operation 416, new AMF 321 performs an AM Policy Association Modification. For an Emergency Registration, this operation is skipped. If the new AMF 321 contacts the PCF identified by the (V-)PCF ID received during inter-AMF 321 mobility in operation 405, the new AMF 321 includes the PCF ID(s) in the Npcf AMPolicyControl Create operation. This indication is not included by the AMF 321 during initial registration procedure. If the AMF 321 notifies the Mobility Restrictions (e.g., UE location) to the PCF for adjustment, or if the PCF updates the Mobility Restrictions itself due to some conditions (e.g., application in use, time and date), the PCF 326 provides the updated Mobility Restrictions to the AMF 321. If the subscription information includes Tracing Requirements, the AMF 321 provides the PCF 326 with Tracing Requirements. Operation 416 may be conditional.

At operation 417, the AMF 321 sends, to the SMF 324, an Nsmf_PDUSession_UpdateSMContext( ) For an Emergency Registered UE 301, this operation is applied when the Registration Type is Mobility Registration Update. The AMF 321 invokes the Nsmf_PDUSession_UpdateSMContext in the following scenario(s): if the List Of PDU Sessions To Be Activated is included in the Registration Request in operation 401, the AMF 321 sends Nsmf_PDUSession_UpdateSMContext Request to SMF(s) 324 associated with the PDU Session(s) in order to activate User Plane connections of these PDU Session(s). Various operations of a UE Triggered Service Request procedure are executed to complete the User Plane connection activation without sending the RRC Inactive Assistance Information and without sending MM NAS Service Accept from the AMF 321 to (R)AN 310 of the UE Triggered Service Request procedure. Operation 417 may be conditional.

When the serving AMF 321 has changed, the new serving AMF 321 notifies the SMF 324 for each PDU Session that it has taken over the responsibility of the signalling path towards the UE 301. The new serving AMF 321 invokes the Nsmf_PDUSession_UpdateSMContext service operation using SMF information received from the old AMF 321 at operation 405, and also indicates whether the PDU Session is to be re-activated. In the case of PLMN change from V-PLMN to H-PLMN, the new serving AMF 321 only invokes the Nsmf_PDUSession_UpdateSMContext service operation for Home Routed PDU session(s). If the UE 301 moves into a V-PLMN, the AMF 321 in the V-PLMN cannot insert or change the V-SMF(s) 324 even for Home Routed PDU session(s). Various operations of a UE Triggered Service Request procedure are executed. In the case that the intermediate UPF 302 insertion, removal, or change is performed for the PDU Session(s) not included in "PDU Session(s) to be re-activated", the procedure is performed without N11 and N2 interactions to update the N3 user plane between (R)AN and 5GC.

The AMF 321 invokes the Nsmf_PDUSession_ReleaseSMContext service operation towards the SMF 324. If any PDU Session status indicates that it is released at the UE 301, the AMF 321 invokes the Nsmf_PDUSession_ReleaseSMContext service operation towards the SMF in order to release any network resources related to the PDU Session. If the serving AMF 321 is changed, the new AMF 321 waits until operation 418 is finished with all the SMF(s) 324 associated with the UE 301. Otherwise, operations 419 to Z22 can continue in parallel with this operation.

At operation 418, the new AMF 321 sends, to the N3IWF, an N2 AMF Mobility Request( ). If the AMF 321 has changed and the old AMF 321 has indicated an existing NGAP UE association towards a N3IWF, the new AMF 321 creates an NGAP UE association towards the N3IWF to which the UE 301 is connected. This automatically releases the existing NGAP UE association between the old AMF 321 and the N3IWF. At operation 419, the N3IWF sends, to the new AMF 321, an N2 AMF Mobility Response( ).

At operation 420*a*, the old AMF 321 sends, to the (V-)PCF 326, an AMF-Initiated UE Policy Association Termination. If the old AMF 321 previously initiated a UE Policy Association to the PCF 326, and the old AMF 321 did not transfer the PCF ID(s) to the new AMF 321 (e.g., new AMF 321 is in different PLMN), the old AMF 321 performs an AMF-initiated UE Policy Association Termination procedure to delete the association with the PCF 326. In addition, if the old AMF 321 transferred the PCF ID(s) in the UE context but the new AMF 321 informed in operation 410 that the UE Policy Association information in the UE context will not be used, then the old AMF 321 performs an AMF-initiated UE Policy Association Termination procedure to delete the association with the PCF 326. Operation 20*a* may be a conditional operation.

At operation 421, the new AMF 321 sends, to the UE 301, a Registration Accept message including 5G-GUTI, Registration Area, Mobility restrictions, PDU Session status, Allowed NSSAI, Mapping Of Allowed NSSAI, Configured NSSAI for the Serving PLMN, Mapping Of Configured NSSAI, rejected S-NSSAIs, Periodic Registration Update timer, LADN Information and accepted MICO mode, IMS Voice over PS session supported Indication, Emergency Service Support indicator, Accepted DRX parameters, Network support of Interworking without N26, Access Stratum Connection Establishment NSSAI Inclusion Mode, Network Slicing Subscription Change Indication, and operator-defined access category definitions. The Allowed NSSAI for the Access Type for the UE 301 is included in the N2 message carrying the Registration Accept message.

The AMF 321 sends a Registration Accept message to the UE 301 indicating that the Registration Request has been accepted. 5G-GUTI is included if the AMF 321 allocates a new 5G-GUTI. If the UE 301 is already in the RM-REGISTERED state via another access in the same PLMN, the UE 301 uses the 5G-GUTI received in the Registration Accept for both registrations. If no 5G-GUTI is included in the Registration Accept, then the UE 301 uses the 5G-GUTI assigned for the existing registration also for the new registration. If the AMF 321 allocates a new Registration area, the AMF 321 sends the Registration area to the UE 301 via Registration Accept message. If there is no Registration area included in the Registration Accept message, the UE 301 considers the old Registration Area as valid. Mobility Restrictions is included in case mobility restrictions applies for the UE 301 and Registration Type is not Emergency Registration. The AMF 321 indicates the established PDU Sessions to the UE 301 in the PDU Session status. The UE 301 removes locally any internal resources related to PDU Sessions that are not marked as established in the received PDU Session status. If the AMF 321 invokes the Nsmf_PDUSession_UpdateSMContext procedure for UP activation of PDU Session(s) in operation 418 and receives rejection from the SMF 324, then the AMF 321 indicates to the UE 301 the PDU Session ID and the cause why the User Plane resources were not activated. When the UE 301 is connected to the two AMFs 321 belonging to different PLMNs via 3GPP access and N3GPP access, then the UE 301 removes locally any internal resources related to the PDU Session of the current PLMN that are not marked as established in received PDU Session status. If the PDU Session status information was in the Registration Request, the AMF 321 indicates the PDU Session status to the UE 301. The Mapping Of Allowed NSSAI is the mapping of each S-NSSAI of the Allowed NSSAI to the HPLMN S-NSSAIs. The Mapping Of Configured NSSAI is the mapping of each S-NSSAI of the Configured NSSAI for the Serving PLMN to the HPLMN S-NSSAIs. According to various embodiments, the AMF 321 includes, in the Registration Accept message, the LADN Information for the list of LADNs discussed herein, that are available within the Registration area determined by the AMF 321 for the UE 301. In embodiments, the AMF 321 looks into the configured LADN Information configured in the AMF 321 and/or the LADN authorization information for the UE 301 in the subscription profile from the UDM 327, and determines the list the LADN DNN(s) that the UE 301 can (and/or is authorized to) use in the current Registration Area. The LADN Information (e.g., a list of LADN DNN(s) and the corresponding LADN service area(s)) is included in the Registration Accept message, and is sent to the UE 301.

If the UE 301 included MICO mode in the request, then the AMF 321 responds whether MICO mode should be used. The AMF 321 may include the operator-defined access category definitions to let the UE 301 determine the applicable operator-specific access category definitions. In the case of registration over 3GPP access, the AMF 321 sets the IMS Voice over PS session supported Indication. In order to set the IMS Voice over PS session supported Indication, the AMF 321 may need to perform the UE Capability Match Request procedure to check the compatibility of the UE 301 and NG-RAN 310 radio capabilities related to IMS Voice over PS. If the AMF 321 has not received Voice Support Match Indicator from the NG-RAN 310 on time, then, based on implementation, the AMF 321 may set IMS Voice over PS session supported Indication and update it at a later stage.

In the case of registration over N3GPP access, the AMF 321 sets the IMS Voice over PS session supported Indication.

The Emergency Service Support indicator informs the UE 301 that emergency services are supported (e.g., the UE 301 is allowed to request PDU Session for emergency services). If the AMF 321 received "MPS priority" from the UDM 327 as part of Access and Mobility Subscription data, based on operator policy, "MPS priority" is included in the Registration Accept message to the UE 301 to inform the UE 301 whether configuration of Access Identity 1 is valid within the selected PLMN. If the AMF 321 received "MCX priority" from the UDM 327 as part of Access and Mobility Subscription data, based on operator policy and UE 301 subscription to MCX Services, "MCX priority" is included in the Registration Accept message to the UE 301 to inform the UE 301 whether configuration of Access Identity 2 is valid within the selected PLMN. The Accepted DRX parameters are defined elsewhere. The AMF 321 sets the Interworking without N26 parameter.

If the UDM 327 intends to indicate the UE 301 that subscription has changed, the Network Slicing Subscription Change Indication is included. If the AMF 321 includes the Network Slicing Subscription Change Indication, then the UE 301 locally erases (deletes) all the network slicing configuration for all PLMNs, and updates the configuration for the current PLMN based on any received information, if applicable.

The Access Stratum Connection Establishment NSSAI Inclusion Mode is included to instruct the UE 301 on what NSSAI, if any, to include in the Access Stratum connection establishment. The AMF 321 can set the value to modes of operations in the 3GPP access only if the Inclusion of NSSAI in RRC Connection Establishment Allowed indicates that it is allowed to do so.

At operation 421*b*, the new AMF 321 performs a UE Policy Association Establishment. For an Emergency Registration, this operation is skipped. The new AMF 321 sends an Npcf_UEPolicyControl Create Request to the PCF 326. The PCF 326 sends an Npcf_UEPolicyControl Create Response to the new AMF 321. PCF triggers UE Configuration Update Procedure. Operation 421*b* may be a conditional operation.

At operation 422, the UE 301 sends, to the new AMF 321, a Registration Complete( ) The UE 301 sends a Registration Complete message to the AMF 321 when the UE 301 has successfully updated itself after receiving any of the configured NSSAI for the serving PLMN, Mapping Of Configured NSSAI, and a Network Slicing Subscription Change Indication in operation 421. The UE 301 sends a Registration Complete message to the AMF 321 to acknowledge if a new 5G-GUTI was assigned. If a new 5G-GUTI was assigned, then the UE 301 passes the new 5G-GUTI to its 3GPP access' lower layer when a lower layer (e.g., either 3GPP access or N3GPP access) indicates to the UE's 301 RM layer that the Registration Complete message has been successfully transferred across the radio interface. This may be needed because the NG-RAN 310 may use the RRC inactive state and a part of the 5G-GUTI is used to calculate a paging frame. It may be assumed that the Registration Complete is reliably delivered to the AMF 321 after the 5G-AN 310 has acknowledged its receipt to the UE 301. When the List Of PDU Sessions To Be Activated is not included in the Registration Request and the Registration procedure was not initiated in CM-CONNECTED state, the AMF 321 releases the signalling connection with UE 301. When the Follow-on request is included in the Registration Request, the AMF 321 should not release the signalling connection after the completion of the Registration procedure. If the AMF 321 is aware that some signalling is pending in the AMF 321 or between the UE 301 and the 5GC, the AMF 321 should not release the signalling connection immediately after the completion of the Registration procedure. Operation 422 may be a conditional operation.

At operation 423*a* (not shown by FIG. 4), for Registration over 3GPP Access, if the AMF 321 does not release the signalling connection, the AMF 321 sends the RRC Inactive Assistance Information to the NG-RAN 310. For Registration over N3GPP Access, if the UE 301 is also in the CM-CONNECTED state on 3GPP access, the AMF 321 sends the RRC Inactive Assistance Information to the NG-RAN 310.

At operation 423, the AMF 321 to UDM: If the Access and Mobility Subscription data provided by UDM 327 to AMF 321 in 14*b* includes Steering of Roaming information with an indication that the UDM 327 requests an acknowledgement of the reception of this information from the UE, the AMF 321 provides the UE 301 acknowledgement to UDM 327 using Nudm_SDM_Info. The AMF 321 also uses the Nudm_SDM_Info service operation to provide an acknowledgment to UDM 327 that the UE 301 received the Network Slicing Subscription Change Indication (see operation 421 and operation 422) and acted upon it. Operation 423 may be a conditional operation.

At operation 424, the AMF 321 sends a "Homogeneous Support of IMS Voice over PS Sessions" indication to the UDM 327 using Nudm_UECM Update. This operations may be performed after operation 414*a*, and in parallel with any of the preceding operations. This operations may be performed if the AMF 321 has evaluated the support of IMS Voice over PS Sessions, and if the AMF 321 determines that it needs to update the Homogeneous Support of IMS Voice over PS Sessions. Operation 424 may be a conditional operation.

The mobility related event notifications towards the NF consumers are triggered at the end of procedure 400 for certain cases/scenarios. For example, the AMF 321 may invoke the Namf_EventExposure_Notify to provide mobility related events to NF consumers that have subscribed for the events by invoking Namf_EventExposure_Subscribe, in the following scenarios listed below and after Namf_EventExposure_Subscribe service operation. During a Registration procedure when there is a change of AMFs 321, the new AMF 321 notifies each SMF 324 of the new AMF 321 serving the UE 301 by informing about the UE reachability status. During a registration procedure for the PDU Sessions to be re-activated, if the UE 301 is moving from an Allowed Area to a Non-Allowed Area, then the AMF 321 informs all NF consumers (e.g. SMF(s) 324) that the UE 301 is reachable only for regulatory prioritized service(s). Additionally, if the UDM 327 had subscribed for UE reachability event notifications either to be reported to the UDM 327 or to an NF consumer directly, then the AMF 321 notifies the UE reachability event to the UDM 327 or to the NF consumer.

Figure 5:
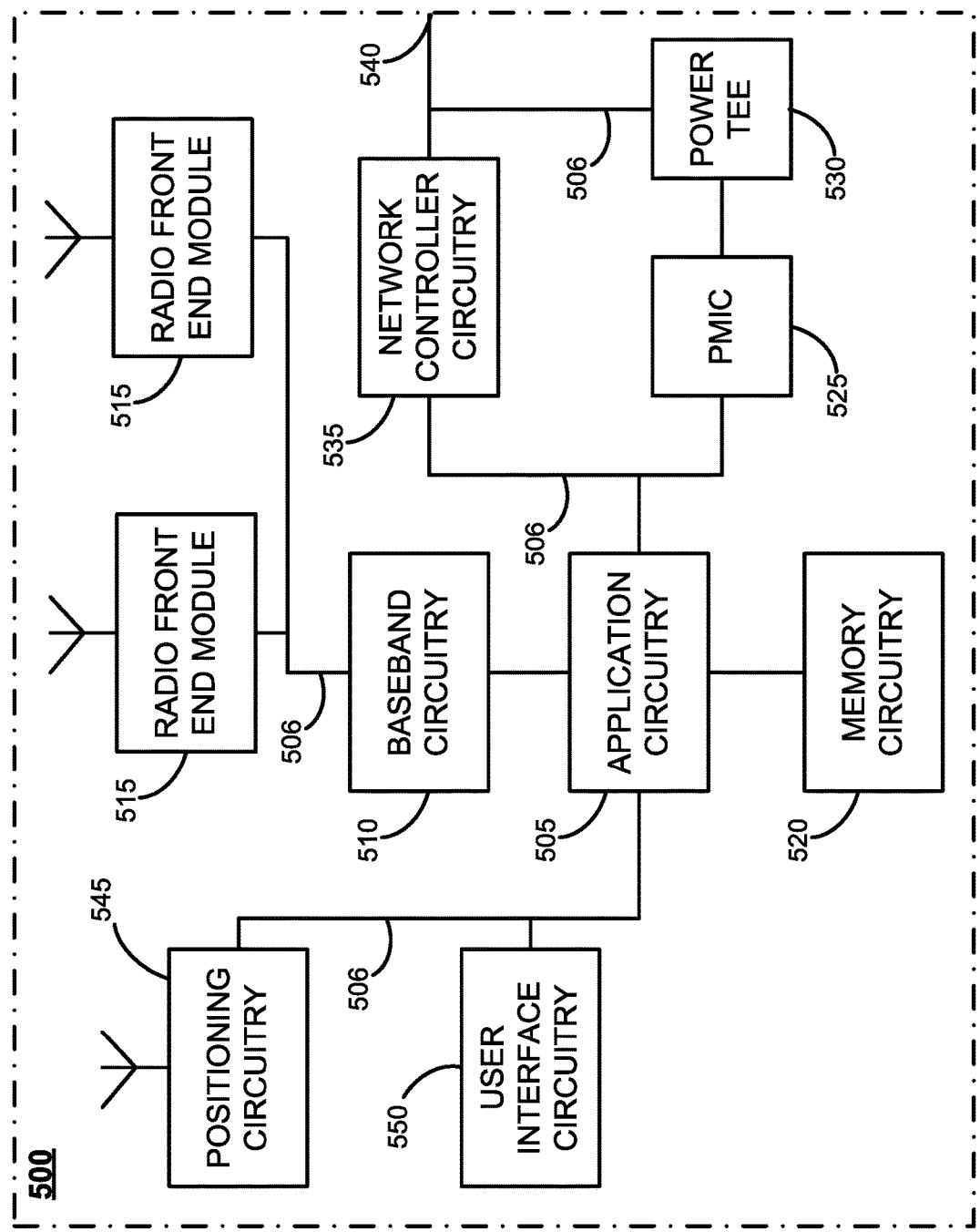
FIG. 5 depicts an example of infrastructure equipment in accordance with various embodiments.

FIG. 5 illustrates an example of infrastructure equipment 500 in accordance with various embodiments. The infrastructure equipment 500 (or "system 500") may be implemented as a base station, radio head, RAN node such as the RAN nodes 111 and/or AP 106 shown and described previously, application server(s) 130, and/or any other element/device discussed herein. In other examples, the system 500 could be implemented in or by a UE 101.

The system 500 includes application circuitry 505, baseband circuitry 510, one or more radio front end modules (RFEMs) 515, memory circuitry 520, power management integrated circuitry (PMIC) 525, power tee circuitry 530, network controller circuitry 535, network interface connector 540, satellite positioning circuitry 545, and user interface 550. In some embodiments, the device 500 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 505 includes circuitry such as, but not limited to one or more processors (or processor cores), cache memory, and one or more of low drop-out voltage regulators (LDOs), interrupt controllers, serial interfaces such as SPI, I$^2$C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 505 may be coupled with or may include memory/storage elements and may be configured to execute instructions stored in the memory/storage to enable various applications or operating systems to run on the system 500. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 505 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 505 may comprise, or may be, a special-purpose processor/controller to operate according to the various embodiments herein. As examples, the processor(s) of application circuitry 505 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 500 may not utilize application circuitry 505, and instead may include a special-purpose processor/controller to process IP data received from an EPC or 5GC, for example.

In some implementations, the application circuitry 505 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 505 may comprise logic blocks or logic fabric, and other interconnected resources that may be programmed to perform various functions, such as the procedures, methods, functions, etc. of the various embodiments discussed herein. In such embodiments, the circuitry of application circuitry 505 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. in look-up-tables (LUTs) and the like.

The baseband circuitry 510 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 510 are discussed infra with regard to FIG. 8.

User interface circuitry 550 may include one or more user interfaces designed to enable user interaction with the system 500 or peripheral component interfaces designed to enable peripheral component interaction with the system 500. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 515 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 811 of FIG. 8 infra), and the RFEM may be connected to multiple antennas. In alternative implementations, both mmWave and sub-mmWave radio functions may be implemented in the same physical RFEM 515, which incorporates both mmWave antennas and sub-mmWave.

The memory circuitry 520 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 520 may be implemented as one or more of solder down packaged integrated circuits, socketed memory modules and plug-in memory cards.

The PMIC 525 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 530 may provide for electrical power drawn from a network cable to provide both power supply and data connectivity to the infrastructure equipment 500 using a single cable.

The network controller circuitry 535 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 500 via network interface connector 540 using a physical connection, which may be electrical (commonly referred to as a "copper interconnect"), optical, or wireless. The network controller circuitry 535 may include one or more dedicated processors and/or FPGAs to communicate using one or more of the aforementioned protocols. In some implementations, the network controller circuitry 535 may include multiple controllers to provide connectivity to other networks using the same or different protocols.

The positioning circuitry 545 includes circuitry to receive and decode signals transmitted/broadcasted by a positioning network of a GNSS. Examples of navigation satellite constellations (or GNSS) include United States' GPS, Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 545 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 545 may include a Micro-Technology for Positioning, Navigation, and Timing (Micro-PNT) IC that uses a master timing clock to perform position tracking/estimation without GNSS assistance. The positioning circuitry 545 may also be part of, or interact with, the baseband circuitry 510 and/or RFEMs 515 to communicate with the nodes and components of the positioning network. The positioning circuitry 545 may also provide position data and/or time data to the application circuitry 505, which may use the data to synchronize operations with various infrastructure (e.g., RAN nodes 111, etc.), or the like.

The components shown by FIG. 5 communicate with one another using interface circuitry, which may include interconnect (IX) 506. The IX 506 may include any number of bus and/or IX technologies such as industry standard architecture (ISA), extended ISA (EISA), inter-integrated circuit (I²C), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath interconnect (QPI), Ultra Path Interconnect (UPI), Intel® Omni-Path Architecture (OPA) IX, RapidIO™ system IXs, Cache Coherent Interconnect for Accelerators (CCIA), Gen-Z Consortium IXs, Open Coherent Accelerator Processor Interface (OpenCAPI) IX, a Hyper-Transport interconnect, and/or any number of other IX technologies. The IX technology may be a proprietary bus, for example, used in an SoC based system.

Figure 6:
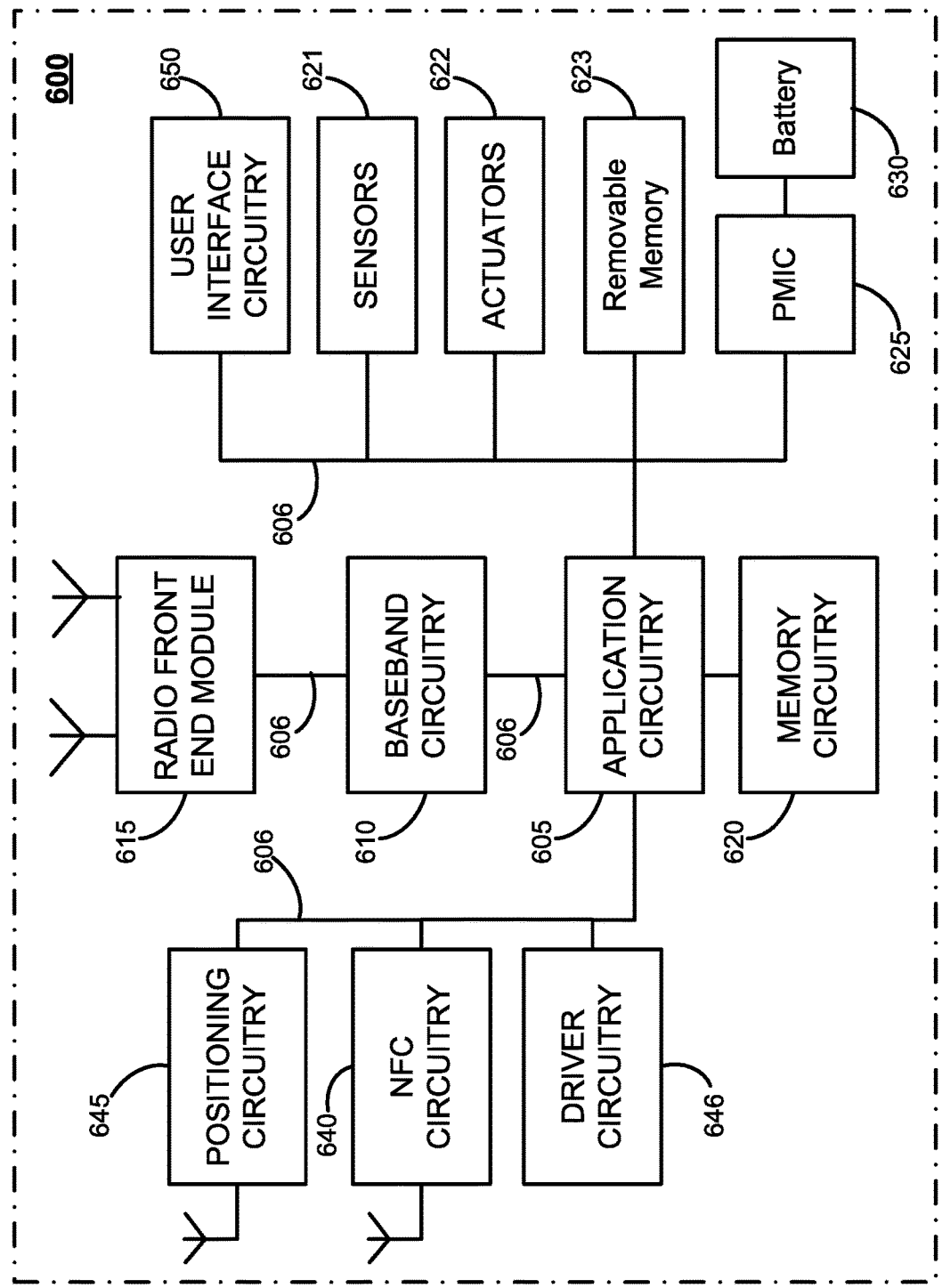
FIG. 6 depicts example components of a computer platform in accordance with various embodiments.

FIG. 6 illustrates an example of a platform 600 (or "device 600") in accordance with various embodiments. In embodiments, the computer platform 600 may be suitable for use as UEs 101, 201, 301, application servers 130, and/or any other element/device discussed herein. The platform 600 may include any combinations of the components shown in the example. The components of platform 600 may be implemented as integrated circuits (ICs), portions thereof, discrete electronic devices, or other modules, logic, hardware, software, firmware, or a combination thereof adapted in the computer platform 600, or as components otherwise incorporated within a chassis of a larger system. The block diagram of FIG. 6 is intended to show a high level view of components of the computer platform 600. However, some of the components shown may be omitted, additional components may be present, and different arrangement of the components shown may occur in other implementations.

Application circuitry 605 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 605 may be coupled with or may include memory/storage elements and may be configured to execute instructions stored in the memory/storage to enable various applications or operating systems to run on the system 600. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 605 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. The processors (or cores) of the application circuitry 605 may be coupled with or may include memory/storage and may be configured to execute instructions stored in the memory/storage to enable various applications or operating systems to run on the system 600. In these embodiments, the processors (or cores) of the application circuitry 605 are configured to operate application software to provide a specific service to a user of the system 600. In some embodiments, the application circuitry 605 may comprise, or may be, a special-purpose processor/controller to operate according to the various embodiments herein.

As examples, the processor(s) of application circuitry 605 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 605 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 605 may be a part of a system on a chip (SoC) in which the application circuitry 605 and other components are formed into a single integrated circuit, or a single package, such as the Edison™ or Galileo™ SoC boards from Intel® Corporation. Other examples of the processor circuitry of application circuitry 505 are mentioned elsewhere in the present disclosure.

Additionally or alternatively, application circuitry 605 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 605 may comprise logic blocks or logic fabric, and other interconnected resources that may be programmed to perform various functions, such as the procedures, methods, functions, etc. of the various embodiments discussed herein. In such embodiments, the circuitry of application circuitry 605 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 610 may be implemented, for example, as a solder-down substrate including one or more integrated circuits, a single packaged integrated circuit soldered to a main circuit board or a multi-chip module containing two or more integrated circuits. The baseband circuitry 610 may include circuitry such as, but not limited to, one or more single-core or multi-core processors (e.g., one or more baseband processors) or control logic to process baseband signals received from a receive signal path of the RFEMs 615, and to generate baseband signals to be provided to the RFEMs 615 via a transmit signal path. In various embodiments, the baseband circuitry 610 may implement a real-time OS (RTOS) to manage resources of the baseband circuitry 610, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. The various hardware electronic elements of baseband circuitry 610 are discussed infra with regard to FIG. 8.

The RFEMs 615 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 811 of FIG. 8 infra), and the RFEM may be connected to multiple antennas. In alternative implementations, both mmWave and sub-mmWave radio functions may be implemented in the same physical RFEM 615, which incorporates both mmWave antennas and sub-mmWave.

The memory circuitry 620 may include any number and type of memory devices used to provide for a given amount of system memory. As examples, the memory circuitry 620 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 620 may be developed in accordance with a Joint Electron Devices Engineering Council (JEDEC) low power double data rate (LPDDR)-based design, such as LPDDR2, LPDDR3, LPDDR4, or the like. Memory circuitry 620 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 620 may be on-die memory or registers associated with the application circuitry 605. To provide for persistent storage of information such as data, applications, operating systems and so forth, memory circuitry 620 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 600 may incorporate the three-dimensional (3D) cross-point (XPOINT) memories from Intel® and Micron®.

Removable memory circuitry 623 may include devices, circuitry, enclosures/housings, ports or receptacles, etc. used to couple portable data storage devices with the platform 600. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

In some implementations, the memory circuitry 620 and/or the removable memory 623 provide persistent storage of information such as data, applications, operating systems (OS), and so forth. The persistent storage circuitry is configured to store computational logic (or "modules") in the form of software, firmware, or hardware commands to implement the techniques described herein. The computational logic may be employed to store working copies and/or permanent copies of computer programs (or data to create the computer programs) for the operation of various components of platform 600 (e.g., drivers, etc.), an operating system of platform 600, one or more applications, and/or for carrying out the embodiments discussed herein. The computational logic may be stored or loaded into memory circuitry 620 as instructions (or data to create the instructions) for execution by the application circuitry 605 to provide the functions described herein. The various elements may be implemented by assembler instructions supported by processor circuitry or high-level languages that may be compiled into such instructions (or data to create the instructions). The permanent copy of the programming instructions may be placed into persistent storage devices of persistent storage circuitry in the factory or in the field through, for example, a distribution medium (not shown), through a communication interface (e.g., from a distribution server (not shown)), or OTA.

Figure 10:
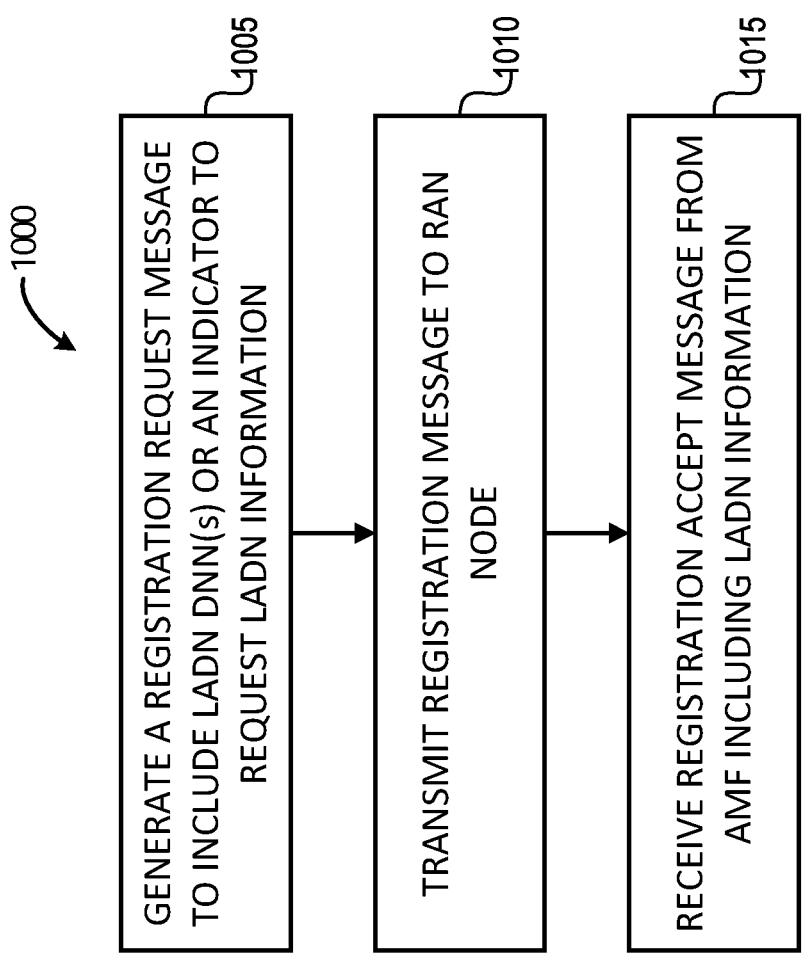
FIGS. 10-12 depict example processes for practicing the various embodiments discussed herein. In particular.
Figure 11:
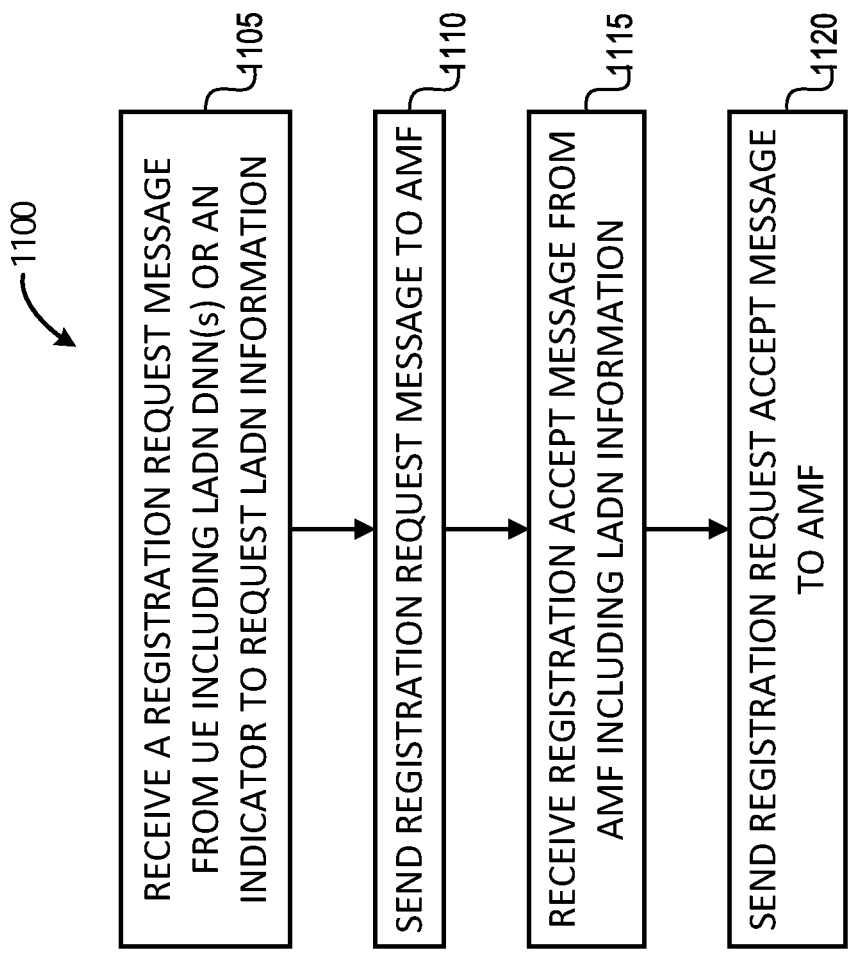
Figure 12:
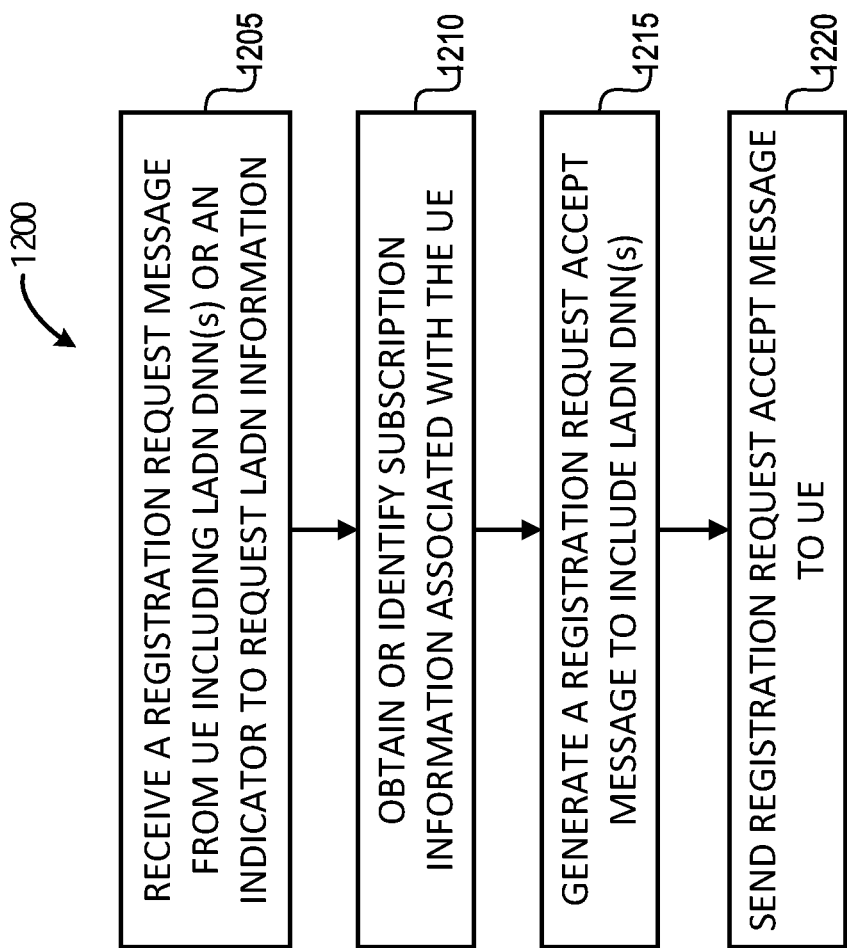

In an example, the instructions provided via the memory circuitry 620 and/or the persistent storage circuitry are embodied as one or more non-transitory computer readable storage media including program code, a computer program product (or data to create the computer program) with the computer program or data, to direct the application circuitry 605 of platform 600 to perform electronic operations in the platform 600, and/or to perform a specific sequence or flow of actions, for example, as described with respect to the flowchart(s) and block diagram(s) of operations and functionality depicted infra (see e.g., FIGS. 10-12). The application circuitry 605 accesses the one or more non-transitory computer readable storage media over the IX 606.

Although the instructions and/or computational logic have been described as code blocks included in the memory circuitry 620 and/or code blocks in the persistent storage circuitry, it should be understood that any of the code blocks may be replaced with hardwired circuits, for example, built into an FPGA, ASIC, or some other suitable circuitry. For example, where application circuitry 605 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The platform 600 may also include interface circuitry (not shown) that is used to connect external devices with the platform 600. The external devices connected to the platform 600 via the interface circuitry include sensor circuitry 621 and actuators 622, as well as removable memory devices coupled to removable memory circuitry 623.

The sensor circuitry 621 include devices, modules, or subsystems whose purpose is to detect events or changes in its environment and send the information (sensor data) about the detected events to some other a device, module, subsystem, etc. Examples of such sensors include, inter alia, inertia measurement units (IMUS) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

Actuators 622 include devices, modules, or subsystems whose purpose is to enable platform 600 to change its state, position, and/or orientation, or move or control a mechanism or (sub)system. The actuators 622 comprise electrical and/or mechanical devices for moving or controlling a mechanism or system, and converts energy (e.g., electric current or moving air and/or liquid) into some kind of motion. The actuators 622 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 622 may include one or more electromechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The platform 1000 may be configured to operate one or more actuators 622 based on one or more captured events and/or instructions or control signals received from a service provider and/or various client systems.

In some implementations, the interface circuitry may connect the platform 600 with positioning circuitry 645. The positioning circuitry 645 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 645 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 645 may include a Micro-PNT IC that uses a master timing clock to perform position tracking/estimation without GNSS assistance. The positioning circuitry 645 may also be part of, or interact with, the baseband circuitry 610 and/or RFEMs 615 to communicate with the nodes and components of the positioning network. The positioning circuitry 645 may also provide position data and/or time data to the application circuitry 605, which may use the data to synchronize operations with various infrastructure (e.g., radio base stations), for turn-by-turn navigation applications, or the like In some implementations, the interface circuitry may connect the platform 600 with Near-Field Communication (NFC) circuitry 640. NFC circuitry 640 is configured to provide contactless, short-range communications based on radio frequency identification (RFID) standards, wherein magnetic field induction is used to enable communication between NFC circuitry 640 and NFC-enabled devices external to the platform 600 (e.g., an "NFC touchpoint"). NFC circuitry 640 comprises an NFC controller coupled with an antenna element and a processor coupled with the NFC controller. The NFC controller may be a chip/IC providing NFC functionalities to the NFC circuitry 640 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 640, or initiate data transfer between the NFC circuitry 640 and another active NFC device (e.g., a smartphone or an NFC-enabled POS terminal) that is proximate to the platform 600.

The driver circuitry 646 may include software and hardware elements that operate to control particular devices that are embedded in the platform 600, attached to the platform 600, or otherwise communicatively coupled with the platform 600. The driver circuitry 646 may include individual drivers allowing other components of the platform 600 to interact with or control various input/output (I/O) devices that may be present within, or connected to, the platform 600. For example, driver circuitry 646 may include a display driver to control and allow access to a display device, a touchscreen driver to control and allow access to a touchscreen interface of the platform 600, sensor drivers to obtain sensor readings of sensor circuitry 621 and control and allow access to sensor circuitry 621, actuator drivers to obtain actuator positions of the actuators 622 and/or control and allow access to the actuators 622, a camera driver to control and allow access to an embedded image capture device, audio drivers to control and allow access to one or more audio devices.

The power management integrated circuitry (PMIC) 625 (also referred to as "power management circuitry 625") may manage power provided to various components of the platform 600. In particular, with respect to the baseband circuitry 610, the PMIC 625 may control power-source selection, voltage scaling, battery charging, or DC-to-DC conversion. The PMIC 625 may often be included when the platform 600 is capable of being powered by a battery 630, for example, when the device is included in a UE 101, 201, 301.

In some embodiments, the PMIC 625 may control, or otherwise be part of, various power saving mechanisms of the platform 600. For example, if the platform 600 is in an RRC_Connected state, where it is still connected to the RAN node as it expects to receive traffic shortly, then it may enter a state known as DRX after a period of inactivity. During this state, the platform 600 may power down for brief intervals of time and thus save power. If there is no data traffic activity for an extended period of time, then the platform 600 may transition off to an RRC Idle state, where it disconnects from the network and does not perform operations such as channel quality feedback, handover, etc. The platform 600 goes into a very low power state and it performs paging where again it periodically wakes up to listen to the network and then powers down again. The platform 600 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 630 may power the platform 600, although in some examples the platform 600 may be mounted deployed in a fixed location, and may have a power supply coupled to an electrical grid. The battery 630 may be a lithium ion battery, a metal-air battery, such as a zinc-air battery, an aluminum-air battery, a lithium-air battery, and the like. In some implementations, such as in V2X applications, the battery 630 may be a typical lead-acid automotive battery.

In some implementations, the battery 630 may be a "smart battery," which includes or is coupled with a Battery Management System (BMS) or battery monitoring integrated circuitry. The BMS may be included in the platform 600 to track the state of charge (SoCh) of the battery 630. The BMS may be used to monitor other parameters of the battery 630 to provide failure predictions, such as the state of health (SoH) and the state of function (SoF) of the battery 630. The BMS may communicate the information of the battery 630 to the application circuitry 605 or other components of the platform 600. The BMS may also include an analog-to-digital (ADC) convertor that allows the application circuitry 605 to directly monitor the voltage of the battery 630 or the current flow from the battery 630. The battery parameters may be used to determine actions that the platform 600 may perform, such as transmission frequency, network operation, sensing frequency, and the like.

A power block, or other power supply coupled to an electrical grid may be coupled with the BMS to charge the battery 630. In some examples, the power block XS30 may be replaced with a wireless power receiver to obtain the power wirelessly, for example, through a loop antenna in the computer platform 600. In these examples, a wireless battery charging circuit may be included in the BMS. The specific charging circuits chosen may depend on the size of the battery 630, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 650 includes various input/output (I/O) devices present within, or connected to, the platform 600, and includes one or more user interfaces designed to enable user interaction with the platform 600 and/or peripheral component interfaces designed to enable peripheral component interaction with the platform 600. The user interface circuitry 650 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the platform 600. The output device circuitry may also include speakers or other audio emitting devices, printer(s), and/or the like. In some embodiments, the sensor circuitry 621 may be used as the input device circuitry (e.g., an image capture device, motion capture device, or the like) and one or more actuators 622 may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

The components shown by FIG. 6 communicate with one another using interface circuitry, which may include interconnect (IX) 606. The IX 606 may include any number of bus and/or IX technologies such as ISA, EISA, I²C, SPI, point-to-point interfaces, PMBus, PCI) PCIe, Intel® UPI, IAL, CAPI, Intel® QPI, UPI, Intel® OPA IX, RapidIO™ system IXs, CCIA, Gen-Z Consortium IXs, OpenCAPI IX, a HyperTransport interconnect, Time-Trigger Protocol (TTP) system, a Fle3ay system, and/or any number of other IX technologies. The IX technology may be a proprietary bus, for example, used in an SoC based system.

Figure 7:
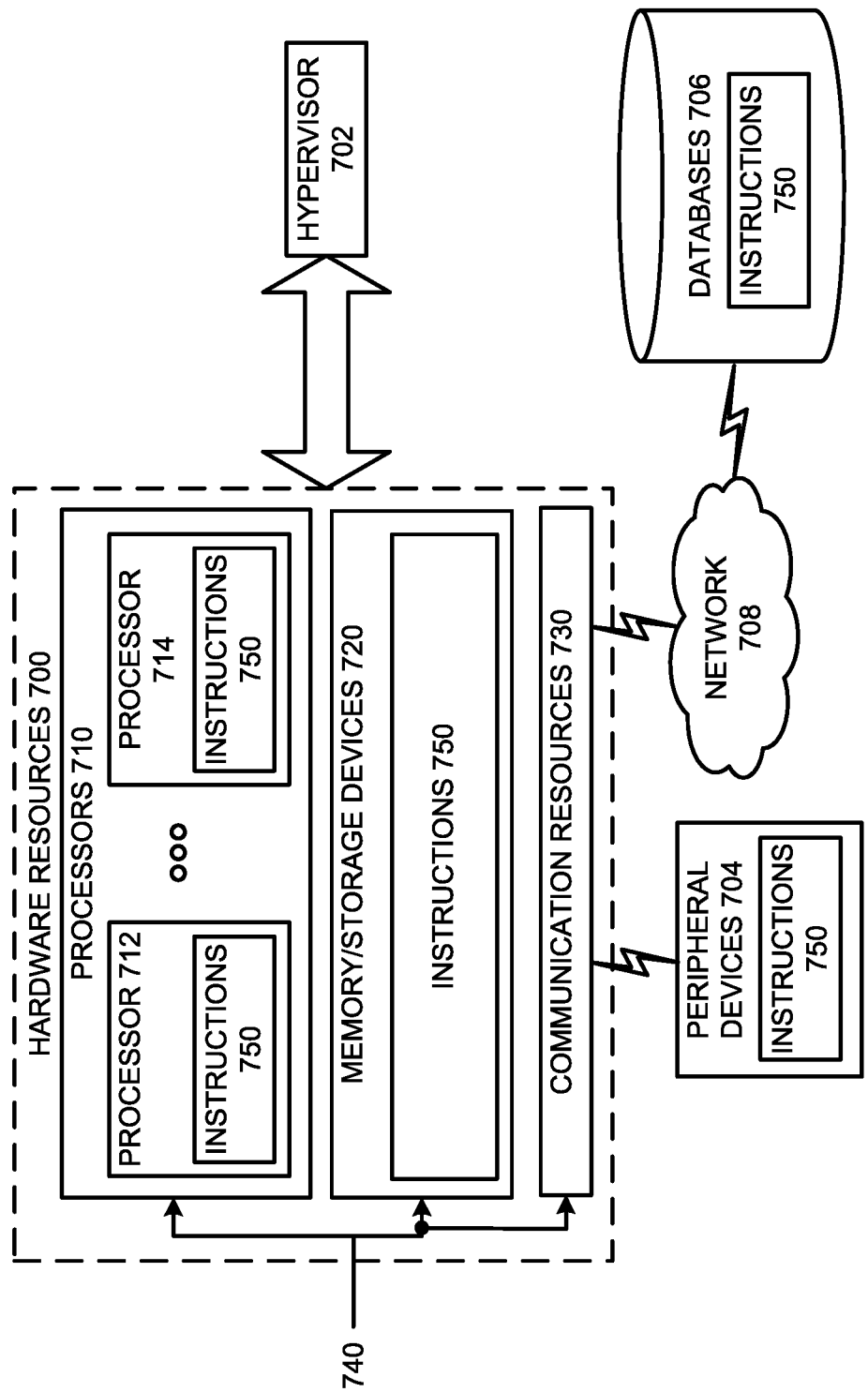
FIG. 7 depicts a block diagram illustrating components, according to some example embodiments, able to read instructions from a machine-readable or computer-readable medium (e.g., a non-transitory machine-readable storage medium) and perform any one or more of the methodologies discussed herein.

FIG. 7 illustrates components, according to some example embodiments, able to read instructions from a machine-readable or computer-readable medium (e.g., a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. For embodiments where node virtualization (e.g., NFV) is utilized, a hypervisor 702 may be executed to provide an execution environment for one or more network slices/sub-slices to utilize the hardware resources 700.

The processors 710 may include, for example, a processor 712 and a processor 714. The processor(s) 710 may be, for example, a CPU, a reduced instruction set computing (RISC) processor, a CISC processor, a GPU, a DSP such as a baseband processor, an ASIC, an FPGA, a RFIC, another processor (including those discussed herein), or any suitable combination thereof. The memory/storage devices 720 may include main memory, disk storage, or any suitable combination thereof. The memory/storage devices 720 may include, but are not limited to, any type of volatile or nonvolatile memory such as DRAM, SRAM, EPROM, EEPROM, Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (e.g., for coupling via USB), cellular communication components, NFC components, Bluetooth® (or Bluetooth® Low Energy) components, Wi-Fi® components, and other communication components, such as those discussed herein.

Instructions 750 may comprise software, a program, an application, an applet, an app, or other executable code for causing at least any of the processors 710 to perform any one or more of the methodologies discussed herein. The instructions 750 may reside, completely or partially, within at least one of the processors 710 (e.g., within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

Figure 8:
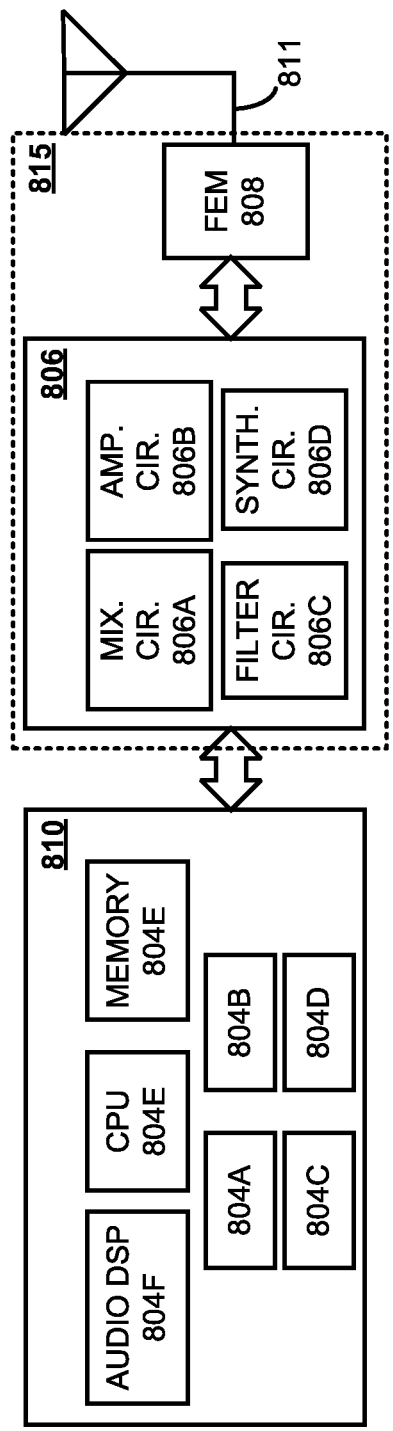
FIG. 8 depicts example components of baseband circuitry and radio frequency circuitry in accordance with various embodiments.

FIG. 8 illustrates example components of baseband circuitry 810 and radio front end modules (RFEM) 815 in accordance with various embodiments. The baseband circuitry 810 corresponds to the baseband circuitry 510 and 610 of FIGS. 5 and 6, respectively. The RFEM 815 corresponds to the RFEM 515 and 615 of FIGS. 5 and 6, respectively. As shown, the RFEMs 815 may include Radio Frequency (RF) circuitry 806, front-end module (FEM) circuitry 808, antenna array 811 coupled together at least as shown.

The baseband circuitry 810 includes circuitry and/or control logic configured to carry out various radio/network protocol and radio control functions that enable communication with one or more radio networks via the RF circuitry 806. The radio control functions may include, but are not limited to, signal modulation/demodulation, encoding/decoding, radio frequency shifting, etc. In some embodiments, modulation/demodulation circuitry of the baseband circuitry 810 may include Fast-Fourier Transform (FFT), precoding, or constellation mapping/demapping functionality. In some embodiments, encoding/decoding circuitry of the baseband circuitry 810 may include convolution, tail-biting convolution, turbo, Viterbi, LDPC, and/or polar code encoder/decoder functionality. Embodiments of modulation/demodulation and encoder/decoder functionality are not limited to these examples and may include other suitable functionality in other embodiments. The baseband circuitry 810 is configured to process baseband signals received from a receive signal path of the RF circuitry 806 and to generate baseband signals for a transmit signal path of the RF circuitry 806. The baseband circuitry 810 is configured to interface with application circuitry 505/605 (see FIGS. 5 and 6) for generation and processing of the baseband signals and for controlling operations of the RF circuitry 806. The baseband circuitry 810 may handle various radio control functions.

The aforementioned circuitry and/or control logic of the baseband circuitry 810 may include one or more single or multi-core processors. For example, the one or more processors may include a 3G baseband processor 804A, a 4G/LTE baseband processor 804B, a 5G/NR baseband processor 804C, or some other baseband processor(s) 804D for other existing generations, generations in development or to be developed in the future (e.g., 6G, etc.). In other embodiments, some or all of the functionality of baseband processors 804A-D may be included in modules stored in the memory 804G and executed via a CPU 804E. In other embodiments, some or all of the functionality of baseband processors 804A-D may be provided as hardware accelerators (e.g., FPGAs, ASICs, etc.) loaded with the appropriate bit streams or logic blocks stored in respective memory cells. In various embodiments, the memory 804G may store program code of a real-time OS (RTOS), which when executed by the CPU 804E (or other baseband processor), is to cause the CPU 804E (or other baseband processor) to manage resources of the baseband circuitry 810, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 810 includes one or more audio DSPs 804F. The audio DSP(s) 804F include elements for compression/decompression and echo cancellation and may include other suitable processing elements in other embodiments.

In some embodiments, each of the processors 804A-804E include respective memory interfaces to send/receive data to/from the memory 804G. The baseband circuitry 810 may further include one or more interfaces to communicatively couple to other circuitries/devices, such as an interface to send/receive data to/from memory external to the baseband circuitry 810; an application circuitry interface to send/receive data to/from the application circuitry 505/605 of FIGS. 5 and 6); an RF circuitry interface to send/receive data to/from RF circuitry 806 of FIG. 8; a wireless hardware connectivity interface to send/receive data to/from one or more wireless hardware elements (e.g., NFC components, Bluetooth®/Bluetooth® Low Energy components, Wi-Fi® components, and/or the like); and a power management interface to send/receive power or control signals to/from the PMIC 625.

In alternate embodiments (which may be combined with the above described embodiments), baseband circuitry 810 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem.

Each of the interconnect subsystems may include a bus system, point-to-point connections, network-on-chip (NOC) structures, and/or some other suitable bus or interconnect technology. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 810 may include protocol processing circuitry with one or more instances of control circuitry (not shown) to provide control functions for the digital baseband circuitry and/or radio frequency circuitry (e.g., the radio front end modules 815/615/515).

Although not shown by FIG. 8, in some embodiments, the baseband circuitry 810 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 810 and/or RF circuitry 806 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 810 and/or RF circuitry 806 are part of a Wi-Fi communication system. In the second example, the protocol processing circuitry would operate Wi-Fi MAC and logical link control (LLC) functions. The protocol processing circuitry may include one or more memory structures (e.g., 804G) to store program code and data for operating the protocol functions, as well as one or more processing cores to execute the program code and perform various operations using the data. The baseband circuitry 810 may also support radio communications for more than one wireless protocol.

The various hardware elements of the baseband circuitry 810 discussed herein may be implemented, for example, as a solder-down substrate including one or more integrated circuits (ICs), a single packaged IC soldered to a main circuit board or a multi-chip module containing two or more ICs. In one example, the components of the baseband circuitry 810 may be suitably combined in a single chip or chipset, or disposed on a same circuit board. In another example, some or all of the constituent components of the baseband circuitry 810 and RF circuitry 806 may be implemented together such as, for example, a system on a chip (SoC) or System-in-Package (SiP). In another example, some or all of the constituent components of the baseband circuitry 810 may be implemented as a separate SoC that is communicatively coupled with and RF circuitry 806 (or multiple instances of RF circuitry 806). In yet another example, some or all of the constituent components of the baseband circuitry 810 and the application circuitry 505/605 may be implemented together as individual SoCs mounted to a same circuit board (e.g., a "multi-chip package").

In some embodiments, the baseband circuitry 810 may provide for communication compatible with one or more radio technologies. For example, in some embodiments, the baseband circuitry 810 may support communication with an E-UTRAN or other WMAN, a WLAN, a WPAN. Embodiments in which the baseband circuitry 810 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path, which may include circuitry to down-convert RF signals received from the FEM circuitry 808 and provide baseband signals to the baseband circuitry 810. RF circuitry 806 may also include a transmit signal path, which may include circuitry to up-convert baseband signals provided by the baseband circuitry 810 and provide RF output signals to the FEM circuitry 808 for transmission.

In some embodiments, the receive signal path of the RF circuitry 806 may include mixer circuitry 806a, amplifier circuitry 806b and filter circuitry 806c. In some embodiments, the transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 810 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 810 and may be filtered by filter circuitry 806c.

In some embodiments, the mixer circuitry 806a of the receive signal path and the mixer circuitry 806a of the transmit signal path may include two or more mixers and may be arranged for quadrature downconversion and upconversion, respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a of the transmit signal path may be arranged for direct downconversion and direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 810 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806*d* may be a fractional-N synthesizer or a fractional N/N+1 synthesizer, although the scope of the embodiments is not limited in this respect as other types of frequency synthesizers may be suitable. For example, synthesizer circuitry 806*d* may be a delta-sigma synthesizer, a frequency multiplier, or a synthesizer comprising a phase-locked loop with a frequency divider.

The synthesizer circuitry 806*d* may be configured to synthesize an output frequency for use by the mixer circuitry 806*a* of the RF circuitry 806 based on a frequency input and a divider control input. In some embodiments, the synthesizer circuitry 806*d* may be a fractional N/N+1 synthesizer.

In some embodiments, frequency input may be provided by a voltage controlled oscillator (VCO), although that is not a requirement. Divider control input may be provided by either the baseband circuitry 810 or the application circuitry 505/605 depending on the desired output frequency. In some embodiments, a divider control input (e.g., N) may be determined from a look-up table based on a channel indicated by the application circuitry 505/605.

Synthesizer circuitry 806*d* of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path, which may include circuitry configured to operate on RF signals received from antenna array 811, amplify the received signals and provide the amplified versions of the received signals to the RF circuitry 806 for further processing. FEM circuitry 808 may also include a transmit signal path, which may include circuitry configured to amplify signals for transmission provided by the RF circuitry 806 for transmission by one or more of antenna elements of antenna array 811. In various embodiments, the amplification through the transmit or receive signal paths may be done solely in the RF circuitry 806, solely in the FEM circuitry 808, or in both the RF circuitry 806 and the FEM circuitry 808.

In some embodiments, the FEM circuitry 808 may include a TX/RX switch to switch between transmit mode and receive mode operation. The FEM circuitry 808 may include a receive signal path and a transmit signal path. The receive signal path of the FEM circuitry 808 may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission by one or more antenna elements of the antenna array 811.

The antenna array 811 comprises one or more antenna elements, each of which is configured convert electrical signals into radio waves to travel through the air and to convert received radio waves into electrical signals. For example, digital baseband signals provided by the baseband circuitry 810 is converted into analog RF signals (e.g., modulated waveform) that will be amplified and transmitted via the antenna elements of the antenna array 811 including one or more antenna elements (not shown). The antenna elements may be omnidirectional, direction, or a combination thereof. The antenna elements may be formed in a multitude of arranges as are known and/or discussed herein. The antenna array 811 may comprise microstrip antennas or printed antennas that are fabricated on the surface of one or more printed circuit boards. The antenna array 811 may be formed in as a patch of metal foil (e.g., a patch antenna) in a variety of shapes, and may be coupled with the RF circuitry 806 and/or FEM circuitry 808 using metal transmission lines or the like.

Processors of the application circuitry 505/605 and processors of the baseband circuitry 810 may be used to execute elements of one or more instances of a protocol stack. For example, processors of the baseband circuitry 810, alone or in combination, may be used execute Layer 3, Layer 2, or Layer 1 functionality, while processors of the application circuitry 505/605 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail infra.

Figure 9:
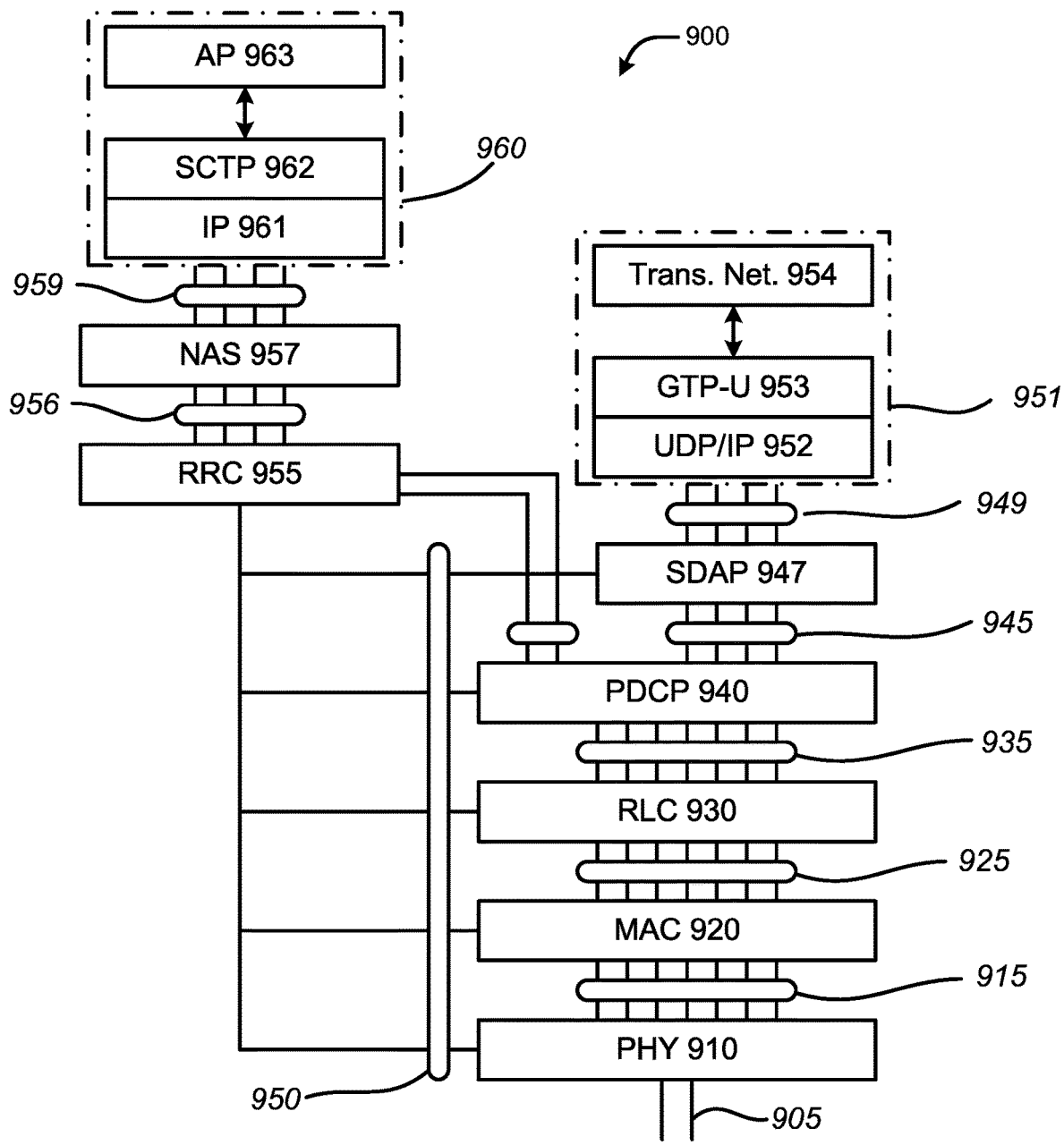
FIG. 9 is an illustration of various protocol functions that may be used for various protocol stacks in accordance with various embodiments.

FIG. 9 illustrates various protocol functions that may be implemented in a wireless communication device according to various embodiments. In particular, FIG. 9 includes an arrangement 900 showing interconnections between various protocol layers/entities. The following description of FIG. 9 is provided for various protocol layers/entities that operate in conjunction with the 5G/NR system standards and LTE system standards, but some or all of the aspects of FIG. 9 may be applicable to other wireless communication network systems as well.

The protocol layers of arrangement 900 may include one or more of PHY 910, MAC 920, RLC 930, PDCP 940, SDAP 947, RRC 955, and NAS layer 957, in addition to other higher layer functions not illustrated. The protocol layers may include one or more service access points (e.g., items 959, 956, 950, 949, 945, 935, 925, and 915 in FIG. 9) that may provide communication between two or more protocol layers.

The PHY 910 may transmit and receive physical layer signals 905 that may be received from or transmitted to one or more other communication devices. The physical layer signals 905 may comprise one or more physical channels, such as those discussed herein. The PHY 910 may further perform link adaptation or adaptive modulation and coding (AMC), power control, cell search (e.g., for initial synchronization and handover purposes), and other measurements used by higher layers, such as the RRC 955. The PHY 910 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 910 may process requests from and provide indications to an instance of MAC 920 via one or more PHY-SAP 915. According to some embodiments, requests and indications communicated via PHY-SAP 915 may comprise one or more transport channels.

Instance(s) of MAC 920 may process requests from, and provide indications to, an instance of RLC 930 via one or more MAC-SAPs 925. These requests and indications communicated via the MAC-SAP 925 may comprise one or more logical channels. The MAC 920 may perform mapping between the logical channels and transport channels, multiplexing of MAC SDUs from one or more logical channels onto TBs to be delivered to PHY 910 via the transport channels, de-multiplexing MAC SDUs to one or more logical channels from TBs delivered from the PHY 910 via transport channels, multiplexing MAC SDUs onto TBs, scheduling information reporting, error correction through HARQ, and logical channel prioritization.

Instance(s) of RLC 930 may process requests from and provide indications to an instance of PDCP 940 via one or more radio link control service access points (RLC-SAP) 935. These requests and indications communicated via RLC-SAP 935 may comprise one or more RLC channels. The RLC 930 may operate in a plurality of modes of operation, including: Transparent Mode™, Unacknowledged Mode (UM), and Acknowledged Mode (AM). The RLC 930 may execute transfer of upper layer protocol data units (PDUs), error correction through automatic repeat request (ARQ) for AM data transfers, and concatenation, segmentation and reassembly of RLC SDUs for UM and AM data transfers. The RLC 930 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 940 may process requests from and provide indications to instance(s) of RRC 955 and/or instance(s) of SDAP 947 via one or more packet data convergence protocol service access points (PDCP-SAP) 945. These requests and indications communicated via PDCP-SAP 945 may comprise one or more radio bearers. The PDCP 940 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 947 may process requests from and provide indications to one or more higher layer protocol entities via one or more SDAP-SAP 949. These requests and indications communicated via SDAP-SAP 949 may comprise one or more QoS flows. The SDAP 947 may map QoS flows to DRBs, and vice versa, and may also mark QFIs in DL and UL packets. A single SDAP entity 947 may be configured for an individual PDU session. In the UL direction, the NG-RAN 110 may control the mapping of QoS Flows to DRB(s) in two different ways, reflective mapping or explicit mapping. For reflective mapping, the SDAP 947 of a UE 101 may monitor the QFIs of the DL packets for each DRB, and may apply the same mapping for packets flowing in the UL direction. For a DRB, the SDAP 947 of the UE 101 may map the UL packets belonging to the QoS flows(s) corresponding to the QoS flow ID(s) and PDU session observed in the DL packets for that DRB. To enable reflective mapping, the NG-RAN 310 may mark DL packets over the Uu interface with a QoS flow ID. The explicit mapping may involve the RRC 955 configuring the SDAP 947 with an explicit QoS flow to DRB mapping rule, which may be stored and followed by the SDAP 947. In embodiments, the SDAP 947 may only be used in NR implementations and may not be used in LTE implementations.

The RRC 955 may configure, via one or more management service access points (M-SAP), aspects of one or more protocol layers, which may include one or more instances of PHY 910, MAC 920, RLC 930, PDCP 940 and SDAP 947. In embodiments, an instance of RRC 955 may process requests from and provide indications to one or more NAS entities 957 via one or more RRC-SAPs 956. The main services and functions of the RRC 955 may include broadcast of system information (e.g., included in MIBs or SIBs related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

According to various embodiments, RRC 955 is used to configure the UE 101 with specific parameters, and for the UE 101 to provide the network with UE-specific parameters. For example, the RRC 955 of a RAN node 111 may transmit a suitable RRC message (e.g., RRC connection reconfiguration message, RRC setup message during an RRC connection establishment procedure, or the like) to the UE 101, where the RRC message includes one or more IEs, which is a structural element containing one or more fields where each field includes parameters, content, and/or data. The parameters, content, and/or data included in the one or more fields of the IEs are used to configure the UE 101 to operate in a particular manner. Additionally, the UE 101 may send a suitable RRC message (e.g., an RRC setup complete message during an RRC connection establishment procedure, or the like) to transfer initial NAS dedicated information/messages from the UE 101 to the network. As an example, an RRC setup complete message (RRCSetupComplete) is shown by table 2, which may be sent by the UE 101 to confirm the successful completion of an RRC connection establishment and to transfer initial NAS dedicated information/messages from the UE 101 to the network, such as during the registration procedure discussed previously with regard to FIG. 4.

TABLE 2

RRCSetupComplete message

```
-- ASN1START
-- TAG-RRCSETUPCOMPLETE-START
RRCSetupComplete ::=                    SEQUENCE {
    rrc-TransactionIdentifier                   RRC-TransactionIdentifier,
    criticalExtensions                          CHOICE {
        rrcSetupComplete                            RRCSetupComplete-IEs,
        criticalExtensionsFuture                        SEQUENCE { }
    }
}
RRCSetupComplete-IEs ::=                SEQUENCE {
    selectedPLMN-Identity                       INTEGER (1..maxPLMN),
    registeredAMF               RegisteredAMF                       OPTIONAL,
    guami-Type              ENUMERATED {native, mapped}                         OPTIONAL,
    s-nssai-List            SEQUENCE (SIZE (1..maxNrofS-NSSAI)) OF S-NSSAI
OPTIONAL,
    dedicatedNAS-Message                    DedicatedNAS-Message,
    ng-5G-S-TMSI-Value                      CHOICE {
        ng-5G-S-TMSI                    NG-5G-S-TMSI,
        ng-5G-S-TMSI-Part2                  BIT STRING (SIZE (9))
                                                OPTIONAL,
    lateNonCriticalExtension                    OCTET STRING            OPTIONAL,
    nonCriticalExtension                    SEQUENCE{ }             OPTIONAL
}
RegisteredAMF ::=               SEQUENCE {
    plmn-Identity               PLMN-Identity                   OPTIONAL,
    amf-Identifier              AMF-Identifier
}
-- TAG-RRCSETUPCOMPLETE-STOP
-- ASN1STOP
```

In the example of table 2, the RRCSetupComplete includes a guami-Type field/IE to indicate whether the GUAMI included is native (derived from native 5G-GUTI) or mapped (from EPS, derived from EPS GUTI); an ng-5G-S-TMSI-Part2 IE/field to indicate a 5G-S-TMSI (e.g., as the leftmost 9 bits); a registeredAMF field/IE to transfer the AMF where the UE is registered, as provided by upper layers; a selectedPLMN-Identity IE/field including an index of the PLMN selected by the UE 101 from the plmn-IdentityList fields included in SIB1; and a dedicatedNAS-Message IE/field to include a suitable NAS message (DedicatedNAS-Message), such as a registration request message discussed previously. Other RRC messages may include the dedicatedNAS-Message IE/field to convey NAS messages, such as an RRC resume complete message (RRCResumeComplete) and the downlink information transfer message (DLInformationTransfer), which is used for the downlink transfer of NAS dedicated information.

In another example, table 3 shows an example RRC re-configuration message (RRCReconfiguration), which is the command to modify an RRC connection. RRCReconfiguration may convey information for measurement configuration, mobility control, radio resource configuration (including RBs, MAC main configuration and physical channel configuration) including and security configuration.

TABLE 3

RRCReconfiguration message

```
-- ASN1START
-- TAG-RRCRECONFIGURATION-START
RRCReconfiguration ::=                  SEQUENCE {
    rrc-TransactionIdentifier                   RRC-TransactionIdentifier,
    criticalExtensions                          CHOICE {
        rrcReconfiguration                          RRCReconfiguration-IEs,
        criticalExtensionsFuture                        SEQUENCE { }
    }
}
RRCReconfiguration-IEs ::=                  SEQUENCE {
    radioBearerConfig                       RadioBearerConfig
OPTIONAL, -- Need M
    secondaryCellGroup                      OCTET STRING (CONTAINING CellGroupConfig)
OPTIONAL, -- Need M
    measConfig              MeasConfig
OPTIONAL, -- Need M
    lateNonCriticalExtension                    OCTET STRING
OPTIONAL,
    nonCriticalExtension                    RRCReconfiguration-v1530-IEs
OPTIONAL
}
RRCReconfiguration-v1530-IEs ::=                SEQUENCE {
    masterCellGroup                     OCTET STRING (CONTAINING CellGroupConfig)
OPTIONAL, -- Need M
    fullConfig              ENUMERATED {true}
```

TABLE 3-continued

RRCReconfiguration message

```
OPTIONAL, -- Cond FullConfig
    dedicatedNAS-MessageList                    SEQUENCE (SIZE(1..maxDRB)) OF
DedicatedNAS-Message                   OPTIONAL, -- Cond nonHO
    masterKeyUpdate                    MasterKeyUpdate
OPTIONAL, -- Cond MasterKeyChange
    dedicatedSIB1-Delivery                      OCTET STRING (CONTAINING SIB1)
OPTIONAL, -- Need N
    dedicatedSystemInformationDelivery          OCTET STRING (CONTAINING
SystemInformation)                              OPTIONAL, -- Need N
    otherConfig                    OtherConfig
OPTIONAL, -- Need M
    nonCriticalExtension                        RRCReconfiguration-v1540-IEs
OPTIONAL
}
RRCReconfiguration-v1540-IEs ::=              SEQUENCE {
    otherConfig-v1540                         OtherConfig-v1540      OPTIONAL, -- Need M
    nonCriticalExtension                      SEQUENCE { }  OPTIONAL
}
MasterKeyUpdate ::=                SEQUENCE {
    keySetChangeIndicator             BOOLEAN,
    nextHopChainingCount              NextHopChainingCount,
    nas-Container          OCTET STRING
        OPTIONAL, -- Cond securityNASC
    ...
}
-- TAG-RRCRECONFIGURATION-STOP
-- ASN1STOP
```

As shown by table 3, the RRCReconfiguration includes, inter alia, dedicatedNAS-MessageList IE/field to transfer UE specific NAS layer information between the network and the UE 101, wherein the RRC layer is transparent for each PDU in the list; and a nas-Container IE/field to transfer UE specific NAS layer information between the network and the UE 101, wherein the RRC layer is transparent for this field, although it affects activation of AS-security after inter-system handover to NR.

The NAS 957 forms the highest stratum of the control plane between the UE 101 and the AMF 321 (e.g., over the N1 reference point). The NAS 957 may support the mobility of the UEs 101 and the session management procedures to establish and maintain IP connectivity between the UE 101 and a P-GW in LTE systems. In 5GS, the NAS 957 may support mobility (or MM) of the UEs 101 including also common procedures such as authentication, identification, generic UE configuration update and security control mode procedures; support of SM procedures to establish and maintain data connectivity between the UEs 101 and the DN 303; and the NAS 957 transport procedure to provide a transport of SMS, LPP, UE policy container, SOR transparent container and UE parameters update information payloads. With respect to MM, the UE 101, 301 may be in one of a plurality of 5GS mobility management (5GMM) states, which are different state machines part of a 5GMM sublayer of the UE 301 and the network. The 5GMM sublayer states are managed per access type (e.g., 3GPP access or non-3GPP access) independently.

In an 5GMM-NULL state, 5GS services are disabled in the UE 301 and no 5GS mobility management functions are performed. In the 5GMM-DEREGISTERED state, no 5GMM context has been established and the UE location is unknown to the network, and hence, the UE 301 is unreachable by the network. In order to establish a 5GMM context, the UE 301 starts the initial registration procedure. The UE 301 enters the 5GMM-REGISTERED-INITIATED state after the UE 301 has started the initial registration procedure or the non-initial registration procedure, and is waiting for a response from the network. In the 5GMM-REGISTERED state, a 5GMM context has been established, and one or more PDU session(s) may be established at the UE 301. The UE 301 may initiate the non-initial registration procedure (including the normal registration update and periodic registration update) and the service request procedure. The UE 301 in the 5GMM-REGISTERED state over non-3GPP access does not initiate the periodic registration update procedure. The UE 301 enters the 5GMM-DEREGISTERED-INITIATED state after it has requested release of the 5GMM context by starting the de-registration procedure and is waiting for a response from the network. The UE 301 enters the 5GMM-SERVICE-REQUEST-INITIATED state after it has started the service request procedure and is waiting for a response from the network.

When the UE 101, 301 is in 5GMM-IDLE mode over 3GPP access and needs to transmit an initial NAS message, the UE 101, 301 requests the lower layer (e.g., RRC 955) to establish an RRC connection. Upon indication from the lower layers that the RRC connection has been established, the UE 101, 301 considers that the N1 NAS signaling connection over 3GPP access is established and enters the 5GMM-CONNECTED mode over 3GPP access. In various embodiments, the UE 301 may generate a NAS message to be included in an RRC message to establish the RRC connection and the AMF 321 may generate another NAS message to be included in an RRC message. Such NAS messages may have a format as shown by table 4.

TABLE 4

General message organization example for a plain 5GS NAS message

| 8 | 7 | 6 | 5 | 4 | 3 | 2 | 1 | |
|---|---|---|---|---|---|---|---|---|
| Extended protocol discriminator | | | | | | | | octet 1 |
| Security header type associated with a spare half octet; or PDU session identity | | | | | | | | octet 2 |

TABLE 4-continued

General message organization example
for a plain 5GS NAS message

| 8 | 7 | 6 | 5 | 4 | 3 | 2 | 1 | |
|---|---|---|---|---|---|---|---|---|
| Procedure transaction identity | | | | | | | | octet 2a* |
| Message type | | | | | | | | octet 3 |
| Other information elements as required | | | | | | | | octet 4 |
| | | | | | | | | octet n |

The message type octet includes a message type value that determines the function of the NAS message within a protocol in a given direction. The meaning of the message type is dependent on the protocol and the direction in which the NAS message is sent. For example, the same message type value may have different meanings in different protocols, and/or the same message type value may have different meanings in the same protocol when sent from the UE 101, 301 to the network and when sent from the network to the UE 101, 301. Example values for the message type IE are shown by table 5.

TABLE 5 message type IE for 5GS mobility management

| Bits | | | | | | | | |
|---|---|---|---|---|---|---|---|---|
| 8 | 7 | 6 | 5 | 4 | 3 | 2 | 1 | |
| 0 | 1 | — | — | — | — | — | — | 5GS mobility management messages |
| 0 | 1 | 0 | 0 | 0 | 0 | 0 | 1 | Registration request |
| 0 | 1 | 0 | 0 | 0 | 0 | 1 | 0 | Registration accept |
| 0 | 1 | 0 | 0 | 0 | 0 | 1 | 1 | Registration complete |
| 0 | 1 | 0 | 0 | 0 | 1 | 0 | 0 | Registration reject |
| 0 | 1 | 0 | 0 | 0 | 1 | 0 | 1 | Deregistration request (UE originating) |
| 0 | 1 | 0 | 0 | 0 | 1 | 1 | 0 | Deregistration accept (UE originating) |
| 0 | 1 | 0 | 0 | 0 | 1 | 1 | 1 | Deregistration request (UE terminated) |
| 0 | 1 | 0 | 0 | 1 | 0 | 0 | 0 | Deregistration accept (UE terminated) |
| 0 | 1 | 0 | 0 | 1 | 1 | 0 | 0 | Service request |
| 0 | 1 | 0 | 0 | 1 | 1 | 0 | 1 | Service reject |
| 0 | 1 | 0 | 0 | 1 | 1 | 1 | 0 | Service accept |
| 0 | 1 | 0 | 1 | 0 | 1 | 0 | 0 | Configuration update command |
| 0 | 1 | 0 | 1 | 0 | 1 | 0 | 1 | Configuration update complete |
| 0 | 1 | 0 | 1 | 0 | 1 | 1 | 0 | Authentication request |
| 0 | 1 | 0 | 1 | 0 | 1 | 1 | 1 | Authentication response |
| 0 | 1 | 0 | 1 | 1 | 0 | 0 | 0 | Authentication reject |
| 0 | 1 | 0 | 1 | 1 | 0 | 0 | 1 | Authentication failure |
| 0 | 1 | 0 | 1 | 1 | 0 | 1 | 0 | Authentication result |
| 0 | 1 | 0 | 1 | 1 | 0 | 1 | 1 | Identity request |
| 0 | 1 | 0 | 1 | 1 | 1 | 0 | 0 | Identity response |
| 0 | 1 | 0 | 1 | 1 | 1 | 0 | 1 | Security mode command |
| 0 | 1 | 0 | 1 | 1 | 1 | 1 | 0 | Security mode complete |
| 0 | 1 | 0 | 1 | 1 | 1 | 1 | 1 | Security mode reject |
| 0 | 1 | 1 | 0 | 0 | 1 | 0 | 0 | 5GMM status |
| 0 | 1 | 1 | 0 | 0 | 1 | 0 | 1 | Notification |
| 0 | 1 | 1 | 0 | 0 | 1 | 1 | 0 | Notification response |
| 0 | 1 | 1 | 0 | 0 | 1 | 1 | 1 | UL NAS transport |
| 0 | 1 | 1 | 0 | 1 | 0 | 0 | 0 | DL NAS transport |

In addition to the message type IE, the other information elements (e.g., octets 4 to N in the NAS message of table 4) may include various 5GMM IEs. For example, the registration request message of operation 401 of FIG. 4 can include, inter alia, a registration type IE and an LADN indication IE. The purpose of the 5GS registration type IE is to indicate the type of the requested registration. The 5GS registration type is a type 1 information element with a length of 1 octet. The registration type IE is coded as shown by tables 6.1 and 6.2.

TABLE 6.1

5GS registration type information element

| 8 | 7 | 6 | 5 | 4 | 3 | 2 | 1 | |
|---|---|---|---|---|---|---|---|---|
| 5GS registration type IEI | | | | FOR | 5GS registration type value | | | octet 1 |

TABLE 6.2

5GS registration type information element

5GS registration type value (octet 1, bits 1 to 3)

| Bits | | | |
|---|---|---|---|
| 3 | 2 | 1 | |
| 0 | 0 | 1 | initial registration |
| 0 | 1 | 0 | mobility registration updating |
| 0 | 1 | 1 | periodic registration updating |
| 1 | 0 | 0 | emergency registration |
| 1 | 1 | 1 | reserved |

All other values are unused and shall be interpreted as "initial registration", if received by the network.
Follow-on request bit (FOR) (octet 1, bit 4)

| Bit 4 | |
|---|---|
| 0 | No follow-on request pending |
| 1 | Follow-on request pending |

The purpose of the LADN indication IE is to request the network for LADN information for specific LADN DNN(s) or to indicate a request for LADN information. The LADN indication is a type 6 information element with a minimum length of 3 octets and a maximum length of 811 octets. The LADN indication information element can contain a minimum of 0 and a maximum of 8 different LADN DNN values. The LADN indication information element is coded as shown by table 7.

TABLE 7

LADN indication information element

| 8 | 7 | 6 | 5 | 4 | 3 | 2 | 1 | |
|---|---|---|---|---|---|---|---|---|
| LADN indication IEI | | | | | | | | octet 1 |
| Length of LADN indication contents | | | | | | | | octet 2 |
| | | | | | | | | octet 3 |
| LADN DNN value 1 | | | | | | | | octet 4* |
| | | | | | | | | octet a* |
| LADN DNN value 2 | | | | | | | | octet a + 1* |
| | | | | | | | | octet b* |
| . . . | | | | | | | | octet b + 1* |
| | | | | | | | | octet g* |
| LADN DNN value n | | | | | | | | octet g + 1* |
| | | | | | | | | octet h* |

The value part of the LADN indication IE (e.g., octet 4 to h) includes zero or more LADN DNN values. If the LADN indication IE conveys more than 8 LADN DNN values in this IE, the network considers the first 8 LADN DNN values and ignores the remaining octets of the IE. LADN DNN value is coded as the length and value part of DNN IE starting with the second octet.

In another example, the other information elements (e.g., octets 4 to N in the NAS message of table 4) may include IEs for the registration accept message of operation 421 of FIG. 4, which may include, inter alia, an LADN indication IE.

The purpose of the LADN information IE is to provide the UE 301 with the LADN service area for each available LADN in the current registration area or to delete the LADN information at the UE 301. The LADN information is a type 6 information element with a minimum length of 3 octets and a maximum length of 1715 octets. The LADN information IE can contain a minimum of 0 and a maximum of 8 different LADNs each including a DNN and a 5GS tracking area identity list. The LADN indicator IE is coded as shown by tables 8.1 and 8.2.

TABLE 8.1

LADN information IE

| 8 | 7 | 6 | 5 | 4 | 3 | 2 | 1 | |
|---|---|---|---|---|---|---|---|---|
| LADN information IEI | | | | | | | | octet 1 |
| Length of LADN information contents | | | | | | | | octet 2 |
| | | | | | | | | octet 3 |
| LADN 1 | | | | | | | | octet 4 |
| | | | | | | | | octet a |
| LADN 2 | | | | | | | | octet a + 1* |
| | | | | | | | | octet b* |
| ... | | | | | | | | octet b + 1* |
| | | | | | | | | octet g* |
| LADN n | | | | | | | | octet g + 1* |
| | | | | | | | | octet h* |

TABLE 8.2

LADN IE

| 8 | 7 | 6 | 5 | 4 | 3 | 2 | 1 | |
|---|---|---|---|---|---|---|---|---|
| Length of DNN value | | | | | | | | octet 4 |
| DNN value | | | | | | | | octet 5 |
| | | | | | | | | octet m |
| 5GS tracking area identity list | | | | | | | | octet m + 1 |
| | | | | | | | | octet a |

The value part of the LADN information IE (e.g., octet 4 to octet h) includes one or several LADNs. Each LADN (e.g., octet 4 to octet a) includes one DNN value and one 5GS tracking area identity list. The length of each LADN is determined by the length of the DNN value field and the length of the 5GS tracking area identity list field. The UE 301 stores the complete list as received. If more than 8 LADNs are included in this IE, the UE 301 stores the first 8 LADNs and ignores the remaining octets of the IE. The DNN value field (e.g., octet 5 to octet m) is coded as DNN value part of a DNN IE starting with the third octet. The 5GS tracking area identity list field (octet m+1 to octet a) is coded as the length and the value part of the 5GS Tracking area identity list IE starting with the second octet.

The purpose of the DNN IE is to identify the data network (e.g., DN 303 of FIG. 3). The DNN is a type 4 information element with a minimum length of 3 octets and a maximum length of 102 octets. A DNN value field contains an APN as discussed previously. The APN is encoded using a suitable syntax, such as the Name Syntax defined in RFC 2181, RFC 1035, and/or RFC 1123. The APN/DNN comprises one or more labels, where each label is coded as a one octet length field followed by that number of octets coded as 8 bit ASCII characters. The labels include alphabetic characters (A-Z and a-z), digits (0-9), and/or a hyphen (-), but begins and ends with either an alphabetic character or a digit. A length byte of zero is added by the SGSN 225 and/or the MME 221 (or the AMF 321) at the end of the APN before interrogating a DNS server. The wild card APN/DNN is coded as an APN with "*" as its single label, (i.e. a length octet with value one, followed by the ASCII code for the asterisk). The DNN information element is coded as shown by table 9.

TABLE 9

DNN IE

| 8 | 7 | 6 | 5 | 4 | 3 | 2 | 1 | |
|---|---|---|---|---|---|---|---|---|
| DNN IEI | | | | | | | | octet 1 |
| Length of DNN contents | | | | | | | | octet 2 |
| DNN value | | | | | | | | octet 3 |
| | | | | | | | | octet n |

The purpose of the 5GS Tracking area identity list IE is to transfer a list of tracking areas from the network to the UE. The coding of the 5GS Tracking area identity list IE allows combining different types of lists. The lists of type "00" and "01" allow a more compact encoding, when the different TAIs are sharing the PLMN identity. The 5GS tracking area identity list is a type 4 information element, with a minimum length of 9 octets and a maximum length of 114 octets. The list can contain a maximum of 16 different tracking area identities. The 5GS tracking area identity list IE is coded as shown by tables NAS-6.1, NAS-6.2, NAS-6.3, NAS-6.4 and NAS-6.5.

TABLE 10.1

5GS tracking area identity list information element

| 8 | 7 | 6 | 5 | 4 | 3 | 2 | 1 | |
|---|---|---|---|---|---|---|---|---|
| 5GS tracking area identity list IEI | | | | | | | | octet 1 |
| Length of 5GS tracking area identity list contents | | | | | | | | octet 2 |
| Partial tracking area identity list 1 | | | | | | | | octet 3 |
| | | | | | | | | octet i |
| Partial tracking area identity list 2 | | | | | | | | octet i + 1* |
| | | | | | | | | octet l* |
| ... | | | | | | | | octet l + 1* |
| | | | | | | | | octet m* |
| Partial tracking area identity list p | | | | | | | | octet m + 1* |
| | | | | | | | | octet n* |

TABLE 10.2

Partial tracking area identity list - type of list = "00"

| 8 | 7 | 6 | 5 | 4 | 3 | 2 | 1 | |
|---|---|---|---|---|---|---|---|---|
| 0 Spare | Type of list | | Number of elements | | | | | octet 1 |
| MCC digit 2 | | | | MCC digit 1 | | | | octet 2 |
| MNC digit 3 | | | | MCC digit 3 | | | | octet 3 |
| MNC digit 2 | | | | MNC digit 1 | | | | octet 4 |
| TAC 1 | | | | | | | | octet 5 |
| TAC 1 (continued) | | | | | | | | octet 6 |
| TAC 1 (continued) | | | | | | | | octet 7 |
| ... | | | | | | | | ... |
| TAC k | | | | | | | | octet 3k + 2* |
| TAC k (continued) | | | | | | | | octet 3k + 3* |
| TAC k (continued) | | | | | | | | octet 3k + 4* |

TABLE 10.3

Partial tracking area identity list - type of list = "01"

| 8 | 7 | 6 | 5 | 4 | 3 | 2 | 1 | |
|---|---|---|---|---|---|---|---|---|
| 0 Spare | Type of list | | Number of elements | | | | | octet 1 |
| MCC digit 2 | | | | MCC digit 1 | | | | octet 2 |
| MNC digit 3 | | | | MCC digit 3 | | | | octet 3 |
| MNC digit 2 | | | | MNC digit 1 | | | | octet 4 |
| TAC 1 | | | | | | | | octet 5 |
| TAC 1 (continued) | | | | | | | | octet 6 |
| TAC 1 (continued) | | | | | | | | octet 7 |

TABLE 10.4

Partial tracking area identity list - type of list = "10"

| 8 | 7 | 6 | 5 | 4 | 3 | 2 | 1 | |
|---|---|---|---|---|---|---|---|---|
| 0 Spare | Type of list | | Number of elements | | | | | octet 1 |
| MCC digit 2 | | | | MCC digit 1 | | | | octet 2 |
| MNC digit 3 | | | | MCC digit 3 | | | | octet 3 |
| MNC digit 2 | | | | MNC digit 1 | | | | octet 4 |
| TAC 1 | | | | | | | | octet 5 |
| TAC 1 (continued) | | | | | | | | octet 6 |
| TAC 1 (continued) | | | | | | | | octet 7 |
| MCC digit 2 | | | | MCC digit 1 | | | | octet 8* |
| MNC digit 3 | | | | MCC digit 3 | | | | octet 9* |
| MNC digit 2 | | | | MNC digit 1 | | | | octet 10* |
| TAC 2 | | | | | | | | octet 11* |
| TAC 2 (continued) | | | | | | | | octet 12* |
| TAC 2 (continued) | | | | | | | | octet 13* |
| ... | | | | | | | | |
| MCC digit 2 | | | | MCC digit 1 | | | | octet 6k − 4* |
| MNC digit 3 | | | | MCC digit 3 | | | | octet 6k − 3* |
| MNC digit 2 | | | | MNC digit 1 | | | | octet 6k − 2* |
| TAC k | | | | | | | | octet 6k − 1* |
| TAC k (continued) | | | | | | | | octet 6k* |
| TAC k (continued) | | | | | | | | octet 6k + 1* |

TABLE 10.5

Tracking area identity list IE
Value part of the Tracking area identity list information element (octets 3 to n)
The value part of the Tracking area identity list information element includes one or several partial tracking area identity lists. The length of each partial tracking area identity list can be determined from the 'type of list' field and the 'number of elements' field in the first octet of the partial tracking area identity list.
The UE stores the complete list received. If more than 16 TAIs are included in this information element, the UE shall store the first 16 TAIs and ignore the remaining octets of the information element.

Partial tracking area identity list:
Type of list (octet 1)

| Bits | | |
|---|---|---|
| 7 | 6 | |
| 0 | 0 | list of TACs belonging to one PLMN, with non-consecutive TAC values |
| 0 | 1 | list of TACs belonging to one PLMN, with consecutive TAC values |
| 1 | 0 | list of TAIs belonging to different PLMNs (see NOTE) |

All other values are reserved.
Number of elements (octet 1)

| Bits | | | | | |
|---|---|---|---|---|---|
| 5 | 4 | 3 | 2 | 1 | |
| 0 | 0 | 0 | 0 | 0 | 1 element |
| 0 | 0 | 0 | 0 | 1 | 2 elements |
| 0 | 0 | 0 | 1 | 0 | 3 elements |
| ... | | | | | |
| 0 | 1 | 1 | 0 | 1 | 14 elements |
| 0 | 1 | 1 | 1 | 0 | 15 elements |
| 0 | 1 | 1 | 1 | 1 | 16 elements |

All other values are unused and shall be interpreted as 16, if received by the UE.
Bit 8 of octet 1 is spare and shall be coded as zero.
For type of list = "00" and number of elements = k:
octet 2 to 4 contain the MCC + MNC, and for j = 1, . . . , k:
octets 3j + 2 to 3j + 4 contain the TAC of the j-th TAI belonging to the partial list,
For type of list = "01" and number of elements = k:
octet 2 to 4 contain the MCC + MNC, and octets 5 to 7 contain the TAC of the first TAI belonging to the partial list.
The TAC values of the other k − 1 TAIs are TAC + 1, TAC + 2 TAC + k − 1.
For type of list = "10" and number of elements = k:
for j = 1, . . . , k.
octets 6j − 4 to 6j − 2 contain the MCC + MNC, and
octets 6j − 1 to 6j + 1 contain the TAC of the j-th TAI belonging to the partial list.

TABLE 10.5-continued

Tracking area identity list IE
Value part of the Tracking area identity list information element (octets 3 to n)
The value part of the Tracking area identity list information element includes
one or several partial tracking area identity lists. The length of each partial
tracking area identity list can be determined from the 'type of list' field and
the 'number of elements' field in the first octet of the partial tracking area
identity list.
The UE stores the complete list received. If more than 16 TAIs
are included in this information element, the UE shall store the first 16 TAIs
and ignore the remaining octets of the information element.

MCC, Mobile country code
The MCC field is coded as in ITU-T Recommendation E.212 [42], annex A.
MNC, Mobile network code
The coding of this field is the responsibility of each administration but BCD coding shall be used. The MNC shall consist of 2 or 3 digits. If a network operator decides to use only two digits in the MNC, MNC digit 3 shall be coded as "1111".
TAC, Tracking area code
In the TAC field bit 8 of the first octet is the most significant bit and bit 1 of third octet the least significant bit.
The coding of the tracking area code is the responsibility of each administration. Coding using full hexadecimal representation may be used. The tracking area code consists of 3 octets.
NOTE:
If the "list of TAIs belonging to different PLMNs" is used, the PLMNs included in the list need to be present in the list of "equivalent PLMNs".

According to various embodiments, one or more protocol entities of arrangement 900 may be implemented in UEs 101, RAN nodes 111, AMF 321 in NR implementations or MME 221 in LTE implementations, UPF 302 in NR implementations or S-GW 222 and P-GW 223 in LTE implementations, or the like to be used for control plane or user plane communications protocol stack between the aforementioned devices. In such embodiments, one or more protocol entities that may be implemented in one or more of UE 101, gNB 111, AMF 321, etc. may communicate with a respective peer protocol entity that may be implemented in or on another device using the services of respective lower layer protocol entities to perform such communication. In some embodiments, a gNB-CU of the gNB 111 may host the RRC 955, SDAP 947, and PDCP 940 of the gNB that controls the operation of one or more gNB-DUs, and the gNB-DUs of the gNB 111 may each host the RLC 930, MAC 920, and PHY 810 of the gNB 111.

In a first example, a control plane protocol stack may comprise, in order from highest layer to lowest layer, NAS 957, RRC 955, PDCP 940, RLC 930, MAC 920, and PHY 910. In this example, upper layers 960 may be built on top of the NAS 857, which includes an IP layer 961, an SCTP 962, and an application layer signaling protocol (AP) 963.

In NR implementations, the AP 963 may be an NG application protocol layer (NGAP or NG-AP) 963 for the NG interface 113 defined between the NG-RAN node 111 and the AMF 321, or the AP 963 may be an Xn application protocol layer (XnAP or Xn-AP) 963 for the Xn interface 112 that is defined between two or more RAN nodes 111.

The NG-AP 963 may support the functions of the NG interface 113 and may comprise Elementary Procedures (EPs). An NG-AP EP may be a unit of interaction between the NG-RAN node 111 and the AMF 321. The NG-AP 963 services may comprise two groups: UE-associated services (e.g., services related to a UE 101) and non-UE-associated services (e.g., services related to the whole NG interface instance between the NG-RAN node 111 and AMF 321). These services may include functions including, but not limited to: a paging function for the sending of paging requests to NG-RAN nodes 111 involved in a particular paging area; a UE context management function for allowing the AMF 321 to establish, modify, and/or release a UE context in the AMF 321 and the NG-RAN node 111; a mobility function for UEs 101 in ECM-CONNECTED mode for intra-system HOs to support mobility within NG-RAN and inter-system HOs to support mobility from/to EPS systems; a NAS Signaling Transport function for transporting or rerouting NAS messages between UE 101 and AMF 321; a NAS node selection function for determining an association between the AMF 321 and the UE 101; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 111 via CN 120; and/or other like functions.

The XnAP 963 may support the functions of the Xn interface 112 and may comprise XnAP basic mobility procedures and XnAP global procedures. The XnAP basic mobility procedures may comprise procedures used to handle UE mobility within the NG RAN 111 (or E-UTRAN 210), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 101, such as Xn interface setup and reset procedures, NG-RAN update procedures, cell activation procedures, and the like.

In LTE implementations, the AP 963 may be an S1 Application Protocol layer (S1-AP) 963 for the S1 interface 113 defined between an E-UTRAN node 111 and an MME, or the AP 963 may be an X2 application protocol layer (X2AP or X2-AP) 963 for the X2 interface 112 that is defined between two or more E-UTRAN nodes 111.

The S1 Application Protocol layer (S1-AP) 963 may support the functions of the S1 interface, and similar to the NG-AP discussed previously, the S1-AP may comprise S1-AP EPs. An S1-AP EP may be a unit of interaction between the E-UTRAN node 111 and an MME 221 within an LTE CN 120. The S1-AP 963 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 963 may support the functions of the X2 interface 112 and may comprise X2AP basic mobility procedures and X2AP global procedures. The X2AP basic mobility procedures may comprise procedures used to handle UE mobility within the E-UTRAN 120, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 101, such as X2 interface setup and reset procedures, load indication procedures, error indication procedures, cell activation procedures, and the like.

The SCTP layer (alternatively referred to as the SCTP/IP layer) 962 may provide guaranteed delivery of application layer messages (e.g., NGAP or XnAP messages in NR implementations, or S1-AP or X2AP messages in LTE implementations). The SCTP 962 may ensure reliable delivery of signaling messages between the RAN node 111 and the AMF 321/MME 221 based, in part, on the IP protocol, supported by the IP 961. The Internet Protocol layer (IP) 961 may be used to perform packet addressing and routing functionality. In some implementations the IP layer 961 may use point-to-point transmission to deliver and convey PDUs. In this regard, the RAN node 111 may comprise L2 and L1 layer communication links (e.g., wired or wireless) with the MME/AMF to exchange information.

In a second example, a user plane protocol stack may comprise, in order from highest layer to lowest layer, SDAP 947, PDCP 940, RLC 930, MAC 820, and PHY 810. The user plane protocol stack may be used for communication between the UE 101, the RAN node 111, and UPF 302 in NR implementations or an S-GW 222 and P-GW 223 in LTE implementations. In this example, upper layers 951 may be built on top of the SDAP 947, and may include a user datagram protocol (UDP) and IP security layer (UDP/IP) 952, a General Packet Radio Service (GPRS) Tunneling Protocol for the user plane layer (GTP-U) 953, and a User Plane PDU layer (UP PDU) 963.

The transport network layer 954 (also referred to as a "transport layer") may be built on IP transport, and the GTP-U 953 may be used on top of the UDP/IP layer 952 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 953 may be used for carrying user data within the GPRS core network and between the radio access network and the core network. The user data transported can be packets in any of IPv4, IPv6, or PPP formats, for example. The UDP/IP 952 may provide checksums for data integrity, port numbers for addressing different functions at the source and destination, and encryption and authentication on the selected data flows. The RAN node 111 and the S-GW 222 may utilize an S1-U interface to exchange user plane data via a protocol stack comprising an L1 layer (e.g., PHY 910), an L2 layer (e.g., MAC 920, RLC 930, PDCP 940, and/or SDAP 947), the UDP/IP layer 952, and the GTP-U 953. The S-GW 222 and the P-GW 223 may utilize an S5/S8a interface to exchange user plane data via a protocol stack comprising an L1 layer, an L2 layer, the UDP/IP layer 952, and the GTP-U 953. As discussed previously, NAS protocols may support the mobility of the UE 101 and the session management procedures to establish and maintain IP connectivity between the UE 101 and the P-GW 223.

Moreover, although not shown by FIG. 9, an application layer may be present above the AP 963 and/or the transport network layer 954. The application layer may be a layer in which a user of the UE 101, RAN node 111, or other network element interacts with software applications being executed, for example, by application circuitry 505 or application circuitry 605, respectively. The application layer may also provide one or more interfaces for software applications to interact with communications systems of the UE 101 or RAN node 111, such as the baseband circuitry 810. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

FIGS. 10-12 show example procedures 1000-1200, respectively, in accordance with various embodiments. For illustrative purposes, the various operations of processes 1000-1200 is described as being performed by a UE 101 of FIG. 1 or elements thereof (e.g., components discussed with regard to platform 600 of FIG. 6), a RAN node 111 of FIG. 1 or elements thereof (e.g., components discussed with regard to infrastructure equipment 500 of FIG. 5), and an AMF 321 of FIG. 3 or elements thereof (e.g., components discussed with regard to infrastructure equipment 500 of FIG. 5). Additionally, the various messages/signaling communicated between the UE 101, RAN node 111, and AMF 321 may be sent/received over the various interfaces discussed herein with respect to FIGS. 1-9, and using the various mechanisms discussed herein including those discussed herein with respect to FIGS. 1-9. While particular examples and orders of operations are illustrated FIGS. 10-12, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

FIG. 10 depicts an example LADN indication procedure 1000 according to various embodiments. Process 1000 may be performed by the UE 101. Process 1000 begins at operation 1005 where baseband circuitry 610 of the UE 101 generates a registration request message to include either the LADN DNN(s) configured for the UE 101 or an indication of requesting LADN information. The registration request message may be generated during an initial registration procedure, a mobility registration update procedure, a periodic registration update procedure, or an emergency registration procedure. The registration request message may be a NAS message including one or more IEs, such as those discussed previously. The NAS message may be encapsulated or otherwise included in an RRC message. At operation 1010, the baseband circuitry 610 of the UE 101 controls transmission of the registration request message, such as by controlling radiofrequency (RF) circuitry (e.g., RFEM 615) to transmit the RRC message including the NAS registration request message. The registration request message may be sent to a RAN node 111, and the RAN node 111 may select an appropriate AMF 321 using an AMF selection function, and then provide the NAS registration request message to the selected AMF 321. At operation 1015, the UE 101 (e.g., the RF circuitry or RFEM 615 of the UE 101) receives a registration accept message from the AMF 321, where the registration accept message includes or indicates LADN information. The LADN information may indicate one or more LADN DNN(s) to which the UE 101 is subscribed. After operation 1015, process 1000 may end or repeat as necessary.

FIG. 11 shows an example registration process 1100 according to various embodiments. Process 1100 may be performed by the RAN node 111. Process 1100 begins at operation 1105 where the RF circuitry (e.g., RFEM 515) of the RAN node 111 receives a registration request message from the UE 101, where the registration request message includes either the LADN DNN(s) configured for the UE 101 or an indication of requesting LADN information. The registration request message may be the same or similar to the registration request message discussed previously. At operation 1110, the baseband circuitry 510 and/or the application circuitry 505 of the RAN node 111 selects an AMF 321 (e.g., using an AMF selection function), and sends the registration request message to the selected AMF 321. At operation 1115, network interface circuitry of the RAN node 111 (e.g., network controller circuitry 535) receives a registration accept message from the AMF 321 (e.g., over an N2 interface or reference point), and at operation 1120, the RF circuitry (e.g., RFEM 515) of the RAN node 111 transmits the registration accept message to the UE 101. In embodiments, the RAN node 111 may be a transparent relay over which the UE 101 and AMF 321 communicate (e.g., using NAS signaling over an N1 interface/reference point). After operation 1120, process 1100 may end or repeat as necessary.

FIG. 12 depicts an example LADN information process 1200 according to various embodiments. Process 1200 may be performed by the UE 101. Process 1200 may be performed by an AMF 321. Process 1200 begins at operation 1205 where network interface circuitry of the AMF 321 (e.g., network controller circuitry 535) receives a registration request message from a UE 101 via a RAN node 111, where the registration request message includes either the LADN DNN(s) configured for the UE 101 or an indication of requesting LADN information. The registration request message may be the same or similar to the registration request message discussed previously. At operation 1210, the application circuitry 505 of the AMF 321 selects a UDM 327, and the network interface circuitry of the AMF 321 (e.g., network controller circuitry 535) receives subscription information related to the UE 101. The subscription information may include, inter alia, a subscribed DNN list, which is a list of the subscribed DNNs for the UE 101. At operation 1215, the application circuitry 505 of the AMF 321 determines or identifies a list of LADNs available to the UE 101 using the subscribed DNN list obtained at operation 1210, and generates a registration accept message to include the list of LADNs available to the UE 101. The registration request message may be a NAS message including one or more IEs, such as those discussed previously. At operation 1220, the network interface circuitry of the AMF 321 (e.g., network controller circuitry 535) sends the registration accept message to the UE 101, for example, over an N1 interface using NAS signaling. In some embodiments, the NAS registration accept message may be sent to the RAN node 111, and the RAN node 11 may encapsulated or otherwise include the NAS registration accept message in an RRC message. After operation 1220, process 1200 may end or repeat as necessary.

Some non-limiting examples are as follows. The following examples pertain to further embodiments, and specifics in the examples may be used anywhere in one or more embodiments discussed previously. Any of the following examples may be combined with any other example or any embodiment discussed herein.

Example 1 includes one or more computer-readable storage media (CRSM) comprising instructions, wherein execution of the instructions by one or more processors of a user equipment (UE) is to cause the UE to: generate a registration request message to include one or more local area data network (LADN) data network names (DNNs); and control transmission of the registration request message to a radio access network (RAN) node.

Example 2 includes the one or more CRSM of example 1 and/or some other examples herein, wherein execution of the instructions is to cause the UE to: generate the registration request message during an initial registration procedure, a mobility registration update procedure, a periodic registration update procedure, or an emergency registration procedure.

Example 3 includes the one or more CRSM of examples 1-2 and/or some other examples herein, wherein execution of the instructions is to cause the UE to: detect a change to the one or more LADN DNNs; and generate the registration request message to include the one or more LADN DNNs to indicate the change.

Example 4 includes the one or more CRSM of examples 1-3 and/or some other examples herein, wherein execution of the instructions is to cause the UE to: receive, over an N1 interface, a registration accept message from an Access and Mobility Management Function (AMF), the registration accept message to include LADN information for a list of one or more LADNs available to be used by the UE in a registration area.

Example 5 includes the one or more CRSM of example 4 and/or some other examples herein, wherein the list of one or more LADNs includes at least one LADN DNN of the one or more LADN DNN(s) to which the UE is subscribed.

Example 6 includes the one or more CRSM of examples 4-5 and/or some other examples herein, wherein the list of one or more LADNs includes LADN service area information and an LADN DNN for each of the one or more LADNs.

Example 7 includes the one or more CRSM of examples 1-6 and/or some other examples herein, wherein execution of the instructions is to cause the UE to: generate the registration message to include a registration type information element (IE) and an LADN indication IE, the registration type IE to include a value to indicate a type of the registration request message and the LADN indication IE to include the LADN DNN(s).

Example 8 includes integrated circuitry (IC) to be implemented as an Access and Mobility Management Function (AMF), the IC comprising: processor circuitry arranged to generate a registration accept message to include local area data network (LADN) information based on one or more LADN data network names (DNNs) or a request for LADN information included in a registration request message, the LADN information to include a list of available LADNs; and interface circuitry communicatively coupled with the processor circuitry, the interface circuitry arranged to obtain the registration request message from a user equipment (UE)

via a radio access network (RAN) node, and send the registration accept message to the UE.

Example 9 includes the IC of example 8 and/or some other examples herein, wherein the registration request message is to indicate a type of the registration request message, the type of the registration request message including one of an initial registration message, a mobility registration update message, a periodic registration update message, or an emergency registration message.

Example 10 includes the IC of examples 8-9 and/or some other examples herein, wherein the interface circuitry is arranged to obtain, from a Unified Data Management (UDM) entity, subscription data related to the UE, the subscription data to include a subscribed DNN list, the subscribed DNN list to indicate one or more DNNs to which the UE is subscribed.

Example 11 includes the IC of example 10 and/or some other examples herein, wherein, when the registration request message includes the one or more LADN DNNs, the processor circuitry is arranged to generate the list of available LADNs to include one or more LADNs available to the UE based on the subscribed DNN list.

Example 12 includes the IC of examples 10-11 and/or some other examples herein, wherein, when the registration request message includes the request for LADN information, the processor circuitry is arranged to generate the list of available LADNs to include all DNNs configured in the AMF or one or more LADN DNN(s) indicated by the subscribed DNN list.

Example 13 includes the IC of examples 8-12 and/or some other examples herein, wherein the interface circuitry is arranged to send the registration accept message to the UE over an N1 reference point.

Example 14 includes the IC of example 13 and/or some other examples herein, wherein the interface circuitry is arranged to receive the registration request message from the RAN node over an N2 reference point.

Example 15 includes the IC of examples 8-14 and/or some other examples herein, wherein the list of available LADNs is to indicate an LADN service area for each an LADN DNN in the list of available LADNs.

Example 16 includes the IC of examples 8-15 and/or some other examples herein, wherein the processor circuitry is arranged to generate the registration accept message to include an LADN information, information element (IE), the LADN information IE to include the list of available LADNs.

Example 17 includes the IC of examples 8-16 and/or some other examples herein, wherein the IC is a system-on-chip (SoC) or a multi-chip package (MCP).

Example 18 includes a computing system to be implemented as a radio access network (RAN) node, the computing system comprising: processor circuitry arranged to obtain a radio resource control (RRC) message from a user equipment (UE) via radiofrequency (RF) circuitry, the RRC message to include a registration request message, the a registration request message to include one or more local area data network (LADN) data network names (DNNs) or a request for LADN information; and network interface circuitry communicatively coupled with the processor circuitry, the network interface circuitry arranged to: send the registration request message to from an Access and Mobility Management Function (AMF), and obtain a registration accept message from the AMF, the registration accept message to include LADN information based on the registration request message, the LADN information to include a list of available LADNs, and the list of available LADNs is to indicate an LADN service area for each LADN DNN in the list of available LADNs.

Example 19 includes the computing system of example 18 and/or some other examples herein, wherein the registration request message is to indicate a type of the registration request message, the type of the registration request message including one of an initial registration message, a mobility registration update message, a periodic registration update message, or an emergency registration message.

Example 20 includes the computing system of examples 18-19 and/or some other examples herein, wherein the network interface circuitry is arranged to provide the registration accept message to RF circuitry for transmission to the UE.

Example 21 includes the computing system of examples 18-20 and/or some other examples herein, wherein, when the registration request message includes the one or more LADN DNNs, the list of available LADNs is to include one or more LADNs available to the UE based on subscription information associated with the UE.

Example 22 includes the computing system of examples 18-21 and/or some other examples herein, wherein, when the registration request message includes the request for LADN information, the list of available LADNs is to include all DNNs configured in the AMF or one or more LADN DNN(s) available to the UE based on subscription information associated with the UE.

Example 23 includes the computing system of examples 18-22 and/or some other examples herein, wherein the network interface circuitry is arranged to, with the RF circuitry, convey the registration accept message from the AMF to the UE over an N1 interface using non-access stratum (NAS) signaling.

Example 24 includes the computing system of examples 18-23 and/or some other examples herein, wherein the network interface circuitry is arranged to send the registration request message to the AMF over an N2 interface.

Example 25 includes the computing system of examples 18-24 and/or some other examples herein, wherein the RAN node is communicatively coupled with one or more radio front end modules (RFEMs) via the network interface circuitry, wherein the one or more RFEMs include the RF circuitry.

Example 26 includes the computing system of examples 18-25 and/or some other examples herein, wherein the RAN node comprises the RF circuitry, and the RF circuitry is communicatively coupled with the processor circuitry and the network interface circuitry.

Example 27 includes a System-on-Chip (SoC) to be implemented in a user equipment (UE), the SoC comprising: baseband circuitry arranged to generate a registration request message to include one or more local area data network (LADN) data network names (DNNs) or a request for LADN information; and interface circuitry coupled with the baseband circuitry, the interface circuitry arranged to provide the registration request message to radiofrequency (RF) circuitry for transmission to a radio access network (RAN) node.

Example 28 includes the SoC of example 27 and/or some other examples herein, wherein the baseband circuitry is arranged to generate the registration request message during an initial registration procedure, a mobility registration update procedure, a periodic registration update procedure, or an emergency registration procedure.

Example 29 includes the SoC of examples 27-28 and/or some other examples herein, wherein the baseband circuitry is arranged to: detect a change to the LADN DNN; and generate the registration request message to include the change to the LADN DNN.

Example 30 includes the SoC of examples 27-29 and/or some other examples herein, wherein the baseband circuitry is arranged to: identify LADN information in a registration accept message obtained from an Access and Mobility Management Function (AMF) via the RF circuitry and the interface circuitry, the registration accept message to include LADN information, the LADN information to include a list of LADNs available to be used by the UE in a registration area.

Example 31 includes the SoC of example 30 and/or some other examples herein, wherein, when the registration request message includes the one or more LADN DNNs, the list of LADNs includes one or more LADN DNNs to which the UE is subscribed.

Example 32 includes the SoC of examples 30-31 and/or some other examples herein, wherein, when the registration request message includes the request for LADN information, the list of LADNs includes all LADN DNNs configured in the AMF or one or more LADN DNNs to which the UE is subscribed.

Example 33 includes the SoC of examples 30-32 and/or some other examples herein, wherein the list of LADNs is to indicate an LADN service area corresponding to each LADN DNN listed in the list of LADNs.

Example 34 includes the SoC of examples 30-33 and/or some other examples herein, wherein the registration accept message is a non-access stratum (NAS) message encapsulated in a radio resource control (RRC) message.

Example 35 includes the SoC of examples 27-34 and/or some other examples herein, wherein the registration request message is a NAS message, and the baseband circuitry is arranged to encapsulate the registration request message in an RRC message for transmission to the RAN node.

Example 36 includes the SoC of examples 27-35 and/or some other examples herein, wherein the baseband circuitry is arranged to generate the registration message to include a registration type information element (IE) and an LADN indication IE, the registration type IE to include a value to indicate a registration type of the registration request message and the LADN indication IE to include the LADN DNN(s) or an indicator for the request for LADN information.

Example 37 includes a method to be performed by a user equipment (UE), the method comprising: generating or causing to generate a registration request message to include one or more local area data network (LADN) data network names (DNNs); and transmitting or causing to transmit the registration request message to a radio access network (RAN) node.

Example 38 includes the method of example 37 and/or some other examples herein, wherein the method comprises: generating or causing to generate the registration request message during an initial registration procedure, a mobility registration update procedure, a periodic registration update procedure, or an emergency registration procedure.

Example 39 includes the method of examples 37-38 and/or some other examples herein, wherein the method comprises: detecting or causing to detect a change to the one or more LADN DNNs; and generating or causing to generate the registration request message to include the one or more LADN DNNs to indicate the change.

Example 40 includes the method of examples 37-39 and/or some other examples herein, wherein the method comprises: receiving, over an N1 interface, a registration accept message from an Access and Mobility Management Function (AMF), the registration accept message to include LADN information for a list of one or more LADNs available to be used by the UE in a registration area.

Example 41 includes the method of example 40 and/or some other examples herein, wherein the list of one or more LADNs includes at least one LADN DNN of the one or more LADN DNN(s) to which the UE is subscribed.

Example 42 includes the method of examples 40-41 and/or some other examples herein, wherein the list of one or more LADNs includes LADN service area information and an LADN DNN for each of the one or more LADNs.

Example 43 includes the method of examples 37-42 and/or some other examples herein, wherein the method comprises: generating or causing to generate the registration message to include a registration type information element (IE) and an LADN indication IE, the registration type IE to include a value to indicate a type of the registration request message and the LADN indication IE to include the LADN DNN(s).

Example 44 includes a method to be performed by an Access and Mobility Management Function (AMF), the method comprising: obtaining or causing to obtain a registration request message from a user equipment (UE) via a radio access network (RAN) node; generating or causing to generate a registration accept message to include local area data network (LADN) information based on one or more LADN data network names (DNNs) or a request for LADN information included in a registration request message, the LADN information to include a list of available LADNs; and sending or causing to send the registration accept message to the UE.

Example 45 includes the method of example 44 and/or some other examples herein, wherein the registration request message is to indicate a type of the registration request message, the type of the registration request message including one of an initial registration message, a mobility registration update message, a periodic registration update message, or an emergency registration message.

Example 46 includes the method of examples 44-45 and/or some other examples herein, wherein the method comprises obtaining or causing to obtain a registration request message from a user equipment (UE) via a radio access network (RAN) node obtain, from a Unified Data Management (UDM) entity, subscription data related to the UE, the subscription data to include a subscribed DNN list, the subscribed DNN list to indicate one or more DNNs to which the UE is subscribed.

Example 47 includes the method of example 46 and/or some other examples herein, wherein, when the registration request message includes the one or more LADN DNNs, the method comprises generating or causing to generate the list of available LADNs to include one or more LADNs available to the UE based on the subscribed DNN list.

Example 48 includes the method of examples 46-47 and/or some other examples herein, wherein, when the registration request message includes the request for LADN information, the method comprises generating or causing to generate the list of available LADNs to include all DNNs configured in the AMF or one or more LADN DNN(s) indicated by the subscribed DNN list.

Example 49 includes the method of examples 44-48 and/or some other examples herein, wherein the interface circuitry is arranged to send the registration accept message to the UE over an N1 reference point.

Example 50 includes the method of example 49 and/or some other examples herein, wherein the interface circuitry is arranged to receive the registration request message from the RAN node over an N2 reference point.

Example 51 includes the method of examples 44-50 and/or some other examples herein, wherein the list of available LADNs is to indicate an LADN service area for each an LADN DNN in the list of available LADNs.

Example 52 includes the method of examples 44-51 and/or some other examples herein, wherein the method comprises generating or causing to generate the registration accept message to include an LADN information, information element (IE), the LADN information IE to include the list of available LADNs.

Example 53 includes a method to be performed by a radio access network (RAN) node, the method comprising: obtaining or causing to obtain a radio resource control (RRC) message from a user equipment (UE), the RRC message to include a registration request message, the a registration request message to include one or more local area data network (LADN) data network names (DNNs) or a request for LADN information; sending or causing to send the registration request message to from an Access and Mobility Management Function (AMF); and obtaining or causing to obtain a registration accept message from the AMF, the registration accept message to include LADN information based on the registration request message, the LADN information to include a list of available LADNs, and the list of available LADNs is to indicate an LADN service area for each LADN DNN in the list of available LADNs.

Example 54 includes the computing system of example 53 and/or some other examples herein, wherein the registration request message is to indicate a type of the registration request message, the type of the registration request message including one of an initial registration message, a mobility registration update message, a periodic registration update message, or an emergency registration message.

Example 55 includes the computing system of examples 53-54 and/or some other examples herein, wherein the method comprises providing or causing to provide the registration accept message for transmission to the UE.

Example 56 includes the computing system of examples 53-55 and/or some other examples herein, wherein, when the registration request message includes the one or more LADN DNNs, the list of available LADNs is to include one or more LADNs available to the UE based on subscription information associated with the UE.

Example 57 includes the computing system of examples 53-56 and/or some other examples herein, wherein, when the registration request message includes the request for LADN information, the list of available LADNs is to include all DNNs configured in the AMF or one or more LADN DNN(s) available to the UE based on subscription information associated with the UE.

Example 58 includes the computing system of examples 53-57 and/or some other examples herein, wherein the method comprises conveying or causing to convey the registration accept message from the AMF to the UE over an N1 interface using non-access stratum (NAS) signaling.

Example 59 includes the computing system of examples 53-58 and/or some other examples herein, wherein the method comprises sending or causing to send the registration request message to the AMF over an N2 interface.

Example 60 may include an apparatus comprising means to perform one or more elements of a method described in or related to any of examples 1-59, or any other method or process described herein.

Example 61 may include one or more non-transitory computer-readable media comprising instructions to cause an electronic device, upon execution of the instructions by one or more processors of the electronic device, to perform one or more elements of a method described in or related to any of examples 1-59, or any other method or process described herein.

Example 62 may include an apparatus comprising logic, modules, or circuitry to perform one or more elements of a method described in or related to any of examples 1-59, or any other method or process described herein.

Example 63 may include a method, technique, or process as described in or related to any of examples 1-59, or portions or parts thereof.

Example 64 may include an apparatus comprising: one or more processors and one or more computer-readable media comprising instructions that, when executed by the one or more processors, cause the one or more processors to perform the method, techniques, or process as described in or related to any of examples 1-59, or portions thereof.

Example 65 may include a signal as described in or related to any of examples 1-59, or portions or parts thereof.

Example 66 includes a packet, frame, segment, protocol data unit (PDU), or message as described in or related to any of examples 1-59, or portions or parts thereof, or otherwise described in the present disclosure Example 67 may include a signal in a wireless network as shown and described herein.

Example 68 may include a method of communicating in a wireless network as shown and described herein.

Example 69 may include a system for providing wireless communication as shown and described herein.

Example 70 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The present disclosure has been described with reference to flowchart illustrations and/or block diagrams of methods, apparatus (systems), and/or computer program products according to embodiments of the present disclosure. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

As used herein, the term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), ASICs, FPDs (e.g., FPGAs, PLDs, CPLDs, HCPLDs, a structured ASICs, or a programmable SoCs, DSPs, etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

As used herein, the term "processor circuitry" refers to, is part of, or includes circuitry capable of sequentially and automatically carrying out a sequence of arithmetic or logical operations, or recording, storing, and/or transferring digital data. and/or any other device capable of executing or otherwise operating computer-executable instructions, such as program code, software modules, and/or functional processes.

As used herein, the term "module" refers to one or more independent electronic circuits packaged onto a circuit board, SoC, SiP, etc., configured to provide a basic function within a computer system.

As used herein, the term "module" refers to, be part of, or include an FPD, ASIC, a processor (shared, dedicated, or group) and/or memory (shared, dedicated, or group), etc., that execute one or more software or firmware programs, a combinational logic circuit, and/or other suitable components that provide the described functionality.

As used herein, the term "interface circuitry" refers to, is part of, or includes circuitry providing for the exchange of information between two or more components or devices. The term "interface circuitry" refers to one or more hardware interfaces, for example, buses, input/output (I/O) interfaces, peripheral component interfaces, network interface cards, and/or the like.

As used herein, the term "device" refers to a physical entity embedded inside, or attached to, another physical entity in its vicinity, with capabilities to convey digital information from or to that physical entity. As used herein, the term "element" refers to a unit that is indivisible at a given level of abstraction and has a clearly defined boundary, wherein an element may be any type of entity. As used herein, the term "controller" refers to an element or entity that has the capability to affect a physical entity, such as by changing its state or causing the physical entity to move. As used herein, the term "entity" refers to (1) a distinct component of an architecture or device, or (2) information transferred as a payload. The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

As used herein, the term "computer system" refers to any type interconnected electronic devices, computer devices, or components thereof. Additionally, the term "computer system" and/or "system" refers to various components of a computer that are communicatively coupled with one another, or otherwise organized to accomplish one or more functions. Furthermore, the term "computer system" and/or "system" refers to multiple computer devices and/or multiple computing systems that are communicatively coupled with one another and configured to share computing and/or networking resources.

As used herein, the term "architecture" refers to a fundamental organization of a system embodied in its components, their relationships to one another, and to an environment, as well as to the principles guiding its design and evolution.

As used herein, the term "appliance," "computer appliance," or the like, refers to a discrete hardware device with integrated program code (e.g., software or firmware) that is specifically or specially designed to provide a specific computing resource. A "virtual appliance" is a virtual machine image to be implemented by a hypervisor-equipped device that virtualizes or emulates a computer appliance or otherwise is dedicated to provide a specific computing resource.

As used herein, the term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

As used herein, the term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

As used herein, the terms "instantiate," "instantiation," and the like refers to the creation of an instance, and an "instance" refers to a concrete occurrence of an object, which may occur, for example, during execution of program code.

As used herein, a "database object", "data object", or the like refers to any representation of information in a database that is in the form of an object, attribute-value pair (AVP), key-value pair (KVP), tuple, etc., and may include variables, data structures, functions, methods, classes, database records, database fields, database entities, associations between data and database entities (also referred to as a "relation"), and the like.

As used herein, the term "resource" refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. The term "network resource" refers to a resource hosted by a remote entity (e.g., a cloud computing service) and accessible over a network. The term "on-device resource" refers to a resource hosted inside a device and enabling access to the device, and thus, to the related physical entity. System resources may be considered as a set of coherent functions, network data objects or services, accessible through a server where such system resources reside on a single host or multiple hosts and are clearly identifiable. Additionally, a "virtualized resource" refers to compute, storage, and/or network resources provided by virtualization infrastructure to an application, such as a multi-access edge applications. The term "information element" refers to a structural element containing one or more fields. The term "field" refers to individual contents of an information element, or a data element that contains content.

For the purposes of the present document, the abbreviations listed in table 11 may apply to the examples and embodiments discussed herein.

TABLE 11

| | |
|---|---|
| 3GPP | Third Generation Partnership Project |
| 4G | Fourth Generation |
| 5G | Fifth Generation |
| 5GC | 5G Core Network |
| 5G-S-TMSI | 5G-SAE Temporary Mobile Station Identifier |
| ACK | Acknowledgement |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbor Relation |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASN.1 | Abstract Syntax Notation One |
| AUSF | Authentication Server Function |
| AWGN | Additive White Gaussian Noise |
| BCH | Broadcast Channel |
| BER | Bit Error Ratio |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |

TABLE 11-continued

| | |
|---|---|
| CCE | Control Channel Element |
| CCCH | Common Control Channel |
| CE | Coverage Enhancement |
| CDM | Content Delivery Network |
| CDMA | Code-Division Multiple Access |
| CFRA | Contention Free Random Access |
| CG | Cell Group |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | enhanced Mobile Broadband |
| eMBMS | Evolved MBMS |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |

TABLE 11-continued

| | |
|---|---|
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-U | GPRS Tunnelling Protocol for User Plane |
| GUMMEI | Globally Unique MME Identifier |
| GUTI | Globally Unique Temporary UE Identity |
| GUAMI | Globally Unique AMF Identifier |
| HARQ | Hybrid ARQ, Hybrid Automatic Repeat Request |
| HANDO, HO | Handover |
| HFN | HyperFrame Number |
| HHO | Hard Handover |
| HLR | Home Location Register |
| HN | Home Network |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, e.g., port 443) |
| I-Block | Information Block |
| ICCID | Integrated Circuit Card Identification |
| ICIC | Inter-Cell Interference Coordination |
| ID | Identity, identifier |
| IDFT | Inverse Discrete Fourier Transform |
| IE | Information element |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |

TABLE 11-continued

| | |
|---|---|
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN |
| K | Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LBT | Listen Before Talk |
| LCM | LifeCycle Management |
| LCR | Low Chip Rate |
| LCS | Location Services |
| LI | Layer Indicator |
| LLC | Logical Link Control, Low Layer Compatibility |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-I | MAC used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MCX | Mission Critical Services |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MICO | Mobile Initiated Connection Only |
| MIMO | Multiple Input Multiple Output |
| MLC | Mobile Location Centre |
| MM | Mobility Management |
| MME | Mobility Management Entity |
| MN | Master Node |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |

TABLE 11-continued

| | |
|---|---|
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |
| MWUS | MTC wake-up signal, MTC WUS |
| N3GPP | Non-3GPP, Non-Third Generation Partnership Project |
| N3IWF | Non-3GPP InterWorking Function |
| NACK | Negative Acknowledgement |
| NAI | Network Access Identifier |
| NAS | Non-Access Stratum, Non-Access Stratum layer |
| NCT | Network Connectivity Topology |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | `Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |

TABLE 11-continued

| | |
|---|---|
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |

TABLE 11-continued

| | |
|---|---|
| S1-U | S1 for the user plane |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Service Discovery Protocol (Bluetooth related) |
| SDSF | Structured Data Storage Function |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block, SS/PBCH Block |
| SSBRI | SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SST | Slice/Service Types |
| SU-MIMO | Single User MIMO |
| SUL | Supplementary Uplink |
| SUCI | Subscription Concealed Identifier |
| SUPI | Subscription Permanent Identifier |
| TA | Timing Advance, Tracking Area |
| TAC | Tracking Area Code |
| TAG | Timing Advance Group |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |

TABLE 11-continued

| | |
|---|---|
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| 3ES | EXpected user RESponse |
| XOR | eXclusive OR |
| ZC | Zadoff-Chu |
| ZP | Zero Power |

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiments were chosen and described in order to best explain the principles of the disclosure and the practical application, and to enable others of ordinary skill in the art to understand the disclosure for embodiments with various modifications as are suited to the particular use contemplated.

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

The invention claimed is:

1. One or more non-transitory computer-readable storage media (NTCRSM) comprising instructions, wherein execution of the instructions by one or more processors of a user equipment (UE) is to cause the UE to:
generate a registration request message to include one or more configured local area data network (LADN) data network names (DNNs) for retrieval of LADN Information for the indicated one or more LADN DNNs by an Access and Mobility Management Function (AMF);
send the registration request message to a radio access network (RAN) node for delivery to the AMF; and
receive, over an N1 interface, a registration accept message from the AMF, the registration accept message to include the LADN Information for a list of LADN that are available to be used by the UE within a Registration Area determined by the AMF for the UE, the list of LADN including ones of the indicated one or more LADN DNNs.

2. The one or more NTCRSM of claim 1, wherein execution of the instructions is to cause the UE to:
generate the registration request message during an initial registration procedure, a mobility registration update procedure, a periodic registration update procedure, or an emergency registration procedure.

3. The one or more NTCRSM of claim 1, wherein execution of the instructions is to cause the UE to:
detect a change to at least one LADN DNN of the one or more LADN DNNs; and
generate the registration request message to include the at least one LADN DNN to indicate the change.

4. The one or more NTCRSM of claim 1, wherein the registration accept message includes LADN Service Area Information, the LADN Service Area Information including a set of Tracking Areas that belong to the Registration Area that the AMF assigns to the UE.

5. The one or more NTCRSM of claim 4, wherein the list of LADN includes at least one LADN DNN of the one or more LADN DNN(s) to which the UE is subscribed.

6. The one or more NTCRSM of claim 4, wherein the list of LADN includes LADN service area information and an LADN DNN for each of the one or more LADNs.

7. The one or more NTCRSM of claim 1, wherein execution of the instructions is to cause the UE to:
generate the registration request message to include a registration type information element (IE) and an LADN indication IE, the registration type IE to include a value to indicate a type of the registration request message and the LADN indication IE to include the LADN DNN(s).

8. Integrated circuitry (IC) to be implemented as an Access and Mobility Management Function (AMF), the IC comprising:
processor circuitry arranged to generate a registration accept message to include local area data network (LADN) information based on one or more configured LADN data network names (DNNs) at a user equipment (UE) included in a registration request message or a request for LADN Information included in the registration request message, the LADN Information to include a list of available LADNs; and
interface circuitry communicatively coupled with the processor circuitry, the interface circuitry arranged to obtain the registration request message from the UE via a radio access network (RAN) node, and send the registration accept message to the UE.

9. The IC of claim 8, wherein the registration request message is to indicate a type of the registration request message, the type of the registration request message including one of an initial registration message, a mobility registration update message, a periodic registration update message, or an emergency registration message.

10. The IC of claim 8, wherein the interface circuitry is arranged to obtain, from a Unified Data Management (UDM) entity, subscription data related to the UE, the subscription data to include a subscribed DNN list, the subscribed DNN list to indicate one or more DNNs to which the UE is subscribed.

11. The IC of claim 10, wherein, when the registration request message includes the one or more LADN DNNs, the processor circuitry is arranged to generate the list of available LADNs to include one or more LADNs available to the UE based on the subscribed DNN list.

12. The IC of claim 10, wherein, when the registration request message includes the request for LADN Information, the processor circuitry is arranged to generate the list of available LADNs to include all DNNs configured in the AMF or one or more LADN DNN(s) indicated by the subscribed DNN list.

13. The IC of claim 8, wherein the request for LADN Information is a request for retrieval of LADN Information for all LADNs available in a current Registration Area.

14. The IC of claim 8, wherein the interface circuitry is arranged to:
receive the registration request message from the RAN node over an N2 reference point, and
send the registration accept message to the UE over an N1 reference point.

15. The IC of claim 8, wherein the list of available LADNs is to indicate an LADN service area for each of an LADN DNN in the list of available LADNs.

16. The IC of claim 8, wherein the processor circuitry is arranged to generate the registration accept message to include an LADN Information, information element (IE), the LADN Information IE to include the list of available LADNs and corresponding LADN service areas.

17. The IC of claim 8, wherein the IC is a system-on-chip (SoC) or a multi-chip package (MCP).

18. A computing system to be implemented as a radio access network (RAN) node, the computing system comprising:
processor circuitry arranged to obtain a radio resource control (RRC) message from a user equipment (UE) via radiofrequency (RF) circuitry, the RRC message to include a registration request message, the registration request message to include one or more configured local area data network (LADN) data network names (DNNs) for retrieval of LADN Information for the indicated one or more LADN DNNs or a request for LADN Information; and
network interface circuitry communicatively coupled with the processor circuitry, the network interface circuitry arranged to:
send the registration request message to an Access and Mobility Management Function (AMF), and obtain a registration accept message from the AMF, the registration accept message to include LADN Information based on the registration request message, the LADN Information to include a list of available LADNs, and the list of available LADNs is to indicate an LADN service area for each LADN DNN in the list of available LADNs.

19. The computing system of claim 18, wherein the registration request message is to indicate a type of the registration request message, the type of the registration request message including one of an initial registration message, a mobility registration update message, a periodic registration update message, or an emergency registration message.

20. The computing system of claim 18, wherein the network interface circuitry is arranged to provide the registration accept message to RF circuitry for transmission to the UE.

21. The computing system of claim 18, wherein, when the registration request message includes the one or more LADN DNNs, the list of available LADNs is to include one or more LADNs available to the UE based on subscription information associated with the UE.

22. The computing system of claim 18, wherein, when the registration request message includes the request for LADN Information, the list of available LADNs is to include all DNNs configured in the AMF or one or more LADN DNN(s) available to the UE based on subscription information associated with the UE.

23. The computing system of claim 18, wherein the network interface circuitry is arranged to, with the RF circuitry, convey the registration accept message from the AMF to the UE over an N1 interface using non-access stratum (NAS) signaling.

24. The computing system of claim 18, wherein the network interface circuitry is arranged to send the registration request message to the AMF over an N2 interface.

25. The computing system of claim 18, wherein the RAN node is communicatively coupled with one or more radio front end modules (RFEMs) via the network interface circuitry, wherein the one or more RFEMs include the RF circuitry.

26. The computing system of claim 18, wherein the RAN node comprises the RF circuitry, and the RF circuitry is communicatively coupled with the processor circuitry and the network interface circuitry.

* * * * *